(12) United States Patent
Oxford

(10) Patent No.: US 7,720,236 B2
(45) Date of Patent: May 18, 2010

(54) UPDATING MODELING INFORMATION BASED ON OFFLINE CALIBRATION EXPERIMENTS

(75) Inventor: William V. Oxford, Austin, TX (US)

(73) Assignee: LifeSize Communications, Inc., Austin, TX (US)

( * ) Notice: Subject to any disclaimer, the term of this patent is extended or adjusted under 35 U.S.C. 154(b) by 1069 days.

(21) Appl. No.: 11/405,667

(22) Filed: Apr. 14, 2006

(65) Prior Publication Data

US 2006/0269074 A1    Nov. 30, 2006

Related U.S. Application Data

(63) Continuation-in-part of application No. 11/108,341, filed on Apr. 18, 2005, and a continuation-in-part of application No. 11/251,084, filed on Oct. 14, 2005.

(60) Provisional application No. 60/676,415, filed on Apr. 29, 2005, provisional application No. 60/619,303, filed on Oct. 15, 2004, provisional application No. 60/634,315, filed on Dec. 8, 2004.

(51) Int. Cl.
*H04R 3/00* (2006.01)
*H04B 3/20* (2006.01)

(52) U.S. Cl. ............................. 381/96; 381/95; 381/98; 381/66; 379/406.12; 379/406.14

(58) Field of Classification Search .................. 381/59, 381/61, 66, 91, 92, 95, 96, 98, 122; 379/406.01, 379/406.02, 406.06, 406.12–406.15
See application file for complete search history.

(56) References Cited

U.S. PATENT DOCUMENTS 3,963,868 A    6/1976    Randmere et al.

(Continued)

FOREIGN PATENT DOCUMENTS

JP    62203432    9/1987

(Continued)

OTHER PUBLICATIONS

"A history of video conferencing (VC) technology" http://web.archive.org/web/20030622161425/http://myhome.hanafos.com/~soonjp/vchx.html (web archive dated Jun. 22, 2003); 5 pages.

(Continued)

*Primary Examiner*—Xu Mei
(74) *Attorney, Agent, or Firm*—Meyertons Hood Kivlin Kowert & Goetzel, P.C.; Jeffrey C. Hood; Mark K. Brightwell

(57) ABSTRACT

A system such as a speakerphone may include a processor, memory, a speaker and a microphone. The processor may be configured (via program instructions stored in the memory) to calibrate the speaker by: outputting a stimulus signal; receiving an input signal corresponding to the stimulus signal; computing a midrange sensitivity and a lowpass sensitivity for a transfer function derived from a spectrum of the input signal and a spectrum of the output signal; subtracting the midrange sensitivity from the lowpass sensitivity to obtain a speaker-related sensitivity; performing an iterative search for current parameters of a speaker model using the input signal spectrum, the stimulus signal spectrum and the speaker-related sensitivity; and updating averages of the speaker model parameters using the current parameter values. The stimulus signal may be transmitted during periods of silence in the external environment. The parameter averages may be used to perform echo cancellation.

20 Claims, 29 Drawing Sheets

U.S. PATENT DOCUMENTS

| | | | |
|---|---|---|---|
| 4,903,247 A | 2/1990 | Van Gerwen et al. | |
| 5,029,162 A | 7/1991 | Epps | |
| 5,034,947 A | 7/1991 | Epps | |
| 5,051,799 A | 9/1991 | Paul et al. | |
| 5,054,021 A | 10/1991 | Epps | |
| 5,121,426 A | 6/1992 | Baumhauer, Jr. et al. | |
| 5,168,525 A | 12/1992 | Muller | |
| 5,263,019 A | 11/1993 | Chu | |
| 5,305,307 A | 4/1994 | Chu | |
| 5,365,583 A | 11/1994 | Huang et al. | |
| 5,390,244 A | 2/1995 | Hinman et al. | |
| 5,396,554 A | 3/1995 | Hirano et al. | |
| 5,506,910 A * | 4/1996 | Miller et al. | 381/103 |
| 5,550,924 A | 8/1996 | Helf et al. | |
| 5,566,167 A | 10/1996 | Duttweiler | |
| 5,581,620 A | 12/1996 | Brandstein et al. | |
| 5,606,642 A | 2/1997 | Stautner et al. | |
| 5,617,539 A | 4/1997 | Ludwig et al. | |
| 5,649,055 A | 7/1997 | Gupta et al. | |
| 5,657,393 A | 8/1997 | Crow | |
| 5,664,021 A | 9/1997 | Chu et al. | |
| 5,689,641 A | 11/1997 | Ludwig et al. | |
| 5,715,319 A | 2/1998 | Chu | |
| 5,737,431 A | 4/1998 | Brandstein et al. | |
| 5,751,338 A | 5/1998 | Ludwig, Jr. | |
| 5,778,082 A | 7/1998 | Chu et al. | |
| 5,787,183 A | 7/1998 | Chu et al. | |
| 5,844,994 A | 12/1998 | Graumann | |
| 5,896,461 A | 4/1999 | Faraci et al. | |
| 5,924,064 A | 7/1999 | Helf | |
| 5,983,192 A | 11/1999 | Botzko et al. | |
| 6,072,522 A | 6/2000 | Ippolito et al. | |
| 6,130,949 A | 10/2000 | Aoki et al. | |
| 6,141,597 A | 10/2000 | Botzko et al. | |
| 6,173,059 B1 | 1/2001 | Huang et al. | |
| 6,243,129 B1 | 6/2001 | Deierling | |
| 6,246,345 B1 | 6/2001 | Davidson et al. | |
| 6,351,238 B1 | 2/2002 | Kishigami et al. | |
| 6,351,731 B1 | 2/2002 | Anderson et al. | |
| 6,363,338 B1 | 3/2002 | Ubale et al. | |
| 6,453,253 B1 * | 9/2002 | Ito | 702/77 |
| 6,453,285 B1 | 9/2002 | Anderson et al. | |
| 6,459,942 B1 | 10/2002 | Markow et al. | |
| 6,535,604 B1 | 3/2003 | Provencal et al. | |
| 6,535,610 B1 | 3/2003 | Stewart | |
| 6,566,960 B1 | 5/2003 | Carver | |
| 6,587,823 B1 | 7/2003 | Kang et al. | |
| 6,590,604 B1 | 7/2003 | Tucker et al. | |
| 6,593,956 B1 | 7/2003 | Potts et al. | |
| 6,594,688 B2 | 7/2003 | Ludwig et al. | |
| 6,615,236 B2 | 9/2003 | Donovan et al. | |
| 6,625,271 B1 | 9/2003 | O'Malley et al. | |
| 6,646,997 B1 | 11/2003 | Baxley et al. | |
| 6,657,975 B1 | 12/2003 | Baxley et al. | |
| 6,697,476 B1 | 2/2004 | O'Malley et al. | |
| 6,721,411 B2 | 4/2004 | O'Malley et al. | |
| 6,731,334 B1 | 5/2004 | Maeng et al. | |
| 6,744,887 B1 | 6/2004 | Berstein et al. | |
| 6,760,415 B2 | 7/2004 | Beecroft | |
| 6,816,904 B1 | 11/2004 | Ludwig et al. | |
| 6,822,507 B2 | 11/2004 | Buchele | |
| 6,831,675 B2 | 12/2004 | Shachar et al. | |
| 6,850,265 B1 | 2/2005 | Strubbe et al. | |
| 6,856,689 B2 | 2/2005 | Sudo et al. | |
| 6,895,094 B1 * | 5/2005 | Scalart et al. | 381/66 |
| 6,912,178 B2 | 6/2005 | Chu et al. | |
| 6,970,568 B1 * | 11/2005 | Freeman et al. | 381/58 |
| 6,980,485 B2 | 12/2005 | McCaskill | |
| 7,012,630 B2 | 3/2006 | Curry et al. | |
| 7,130,428 B2 | 10/2006 | Hirai et al. | |
| 7,133,062 B2 | 11/2006 | Castles et al. | |
| 7,602,925 B2 * | 10/2009 | Kreifeldt et al. | 381/93 |
| 2002/0123895 A1 | 9/2002 | Potekhin et al. | |
| 2003/0194098 A1 * | 10/2003 | Werner et al. | 381/98 |
| 2003/0197316 A1 | 10/2003 | Baumhauer, Jr. et al. | |
| 2004/0001137 A1 | 1/2004 | Cutler et al. | |
| 2004/0010549 A1 | 1/2004 | Matus et al. | |
| 2004/0032487 A1 | 2/2004 | Chu et al. | |
| 2004/0032796 A1 | 2/2004 | Chu et al. | |
| 2004/0183897 A1 | 9/2004 | Kenoyer et al. | |
| 2005/0157866 A1 | 7/2005 | Marton et al. | |
| 2005/0169459 A1 | 8/2005 | Marton et al. | |
| 2005/0212908 A1 | 9/2005 | Rodman et al. | |
| 2005/0262201 A1 | 11/2005 | Rudolph et al. | |
| 2006/0013416 A1 | 1/2006 | Truong et al. | |
| 2006/0034469 A1 | 2/2006 | Tamiya et al. | |
| 2006/0062398 A1 * | 3/2006 | McKee Cooper et al. | 381/58 |
| 2006/0109998 A1 | 5/2006 | Michel | |
| 2006/0165242 A1 | 7/2006 | Miki et al. | |
| 2008/0130907 A1 * | 6/2008 | Sudo et al. | 381/66 |

FOREIGN PATENT DOCUMENTS

| | | |
|---|---|---|
| JP | 07264102 | 3/1994 |
| JP | 07135478 | 5/1995 |
| JP | 07240722 | 9/1995 |
| JP | 09307651 | 11/1997 |
| JP | 10190848 | 7/1998 |
| WO | PCT/US97/17770 | 4/1998 |
| WO | 9922460 | 5/1999 |
| WO | 2005064908 | 7/2005 |

OTHER PUBLICATIONS

"MediaMax Operations Manual"; May 1992; 342 pages; VideoTelecom; Austin, TX.

"MultiMax Operations Manual"; Nov. 1992; 135 pages; VideoTelecom; Austin, TX.

Ross Cutler, Yong Rui, Anoop Gupta, JJ Cadiz, Ivan Tashev, Li-Wei He, Alex Colburn, Zhengyou Zhang, Zicheng Liu and Steve Silverberg; "Distributed Meetings: A Meeting Capture and Broadcasting System", Multimedia '02; Dec. 2002; 10 pages; Microsoft Research; Redmond, WA.

P. H. Down; "Introduction to Videoconferencing"; http://www.video.ja.net/intro/; 2001; 26 pages.

"Polycom Executive Collection"; Jun. 2003; 4 pages; Polycom, Inc.; Pleasanton, CA.

"MacSpeech Certifies Voice Tracker™ Array Microphone"; Apr. 20, 2005; 2 pages; MacSpeech Press.

"The Wainhouse Research Bulletin"; Apr. 12, 2006; 6 pages; vol. 7, #14.

"VCON Videoconferencing"; http://web.archive.org/web/20041012125813/http://www.itc.virginia.edu/netsys/videoconf/midlevel.html; 2004; 6 pages.

M. Berger and F. Grenez; "Performance Comparison of Adaptive Algorithms for Acoustic Echo Cancellation"; European Signal Processing Conference, Signal Processing V: Theories and Applications, 1990; pp. 2003-2006.

C.L. Dolph; "A current distribution for broadside arrays which optimizes the relationship between beam width and side-lobe level". Proceedings of the I.R.E. and Wave and Electrons; Jun. 1946; pp. 335-348; vol. 34.

M. Mohan Sondhi, Dennis R. Morgan and Joseph L. Hall; "Stereophonic Acoustic Echo Cancellation—An Overview of the Fundamental Problem"; IEEE Signal Processing Letters; Aug. 1995; pp. 148-151; vol. 2, No. 8.

Rudi Frenzel and Marcus E. Hennecke; "Using Prewhitening and Stepsize Control to Improve the Performance of the LMS Algorithm for Acoustic Echo Compensation"; IEEE International Symposium on Circuits and Systems; 1992; pp. 1930-1932.

Steven L. Gay and Richard J. Mammone; "Fast converging subband acoustic echo cancellation using RAP on the WE DSP16A"; International Conference on Acoustics, Speech, and Signal Processing; Apr. 1990; pp. 1141-1144.

Andre Gilloire and Martin Vetterli; "Adaptive Filtering in Subbands with Critical Sampling: Analysis, Experiments, and Application to Acoustic Echo Cancellation"; IEEE Transactions on Signal Processing, Aug. 1992; pp. 1862-1875; vol. 40, No. 8.

Andre Gilloire; "Experiments with Sub-band Acoustic Echo Cancellers for Teleconferencing"; IEEE International Conference on Acoustics, Speech, and Signal Processing; Apr. 1987; pp. 2141-2144; vol. 12.

Henry Cox, Robert M. Zeskind and Theo Kooij; "Practical Supergain", IEEE Transactions on Acoustics, Speech, and Signal Processing; Jun. 1986; pp. 393-398.

Walter Kellermann; "Analysis and design of multirate systems for cancellation of acoustical echoes"; International Conference on Acoustics, Speech, and Signal Processing, 1988 pp. 2570-2573; vol. 5.

Lloyd Griffiths and Charles W. Jim; "An Alternative Approach to Linearly Constrained Adaptive Beamforming"; IEEE Transactions on Antennas and Propagation; Jan. 1982; pp. 27-34; vol. AP-30, No. 1.

B. K. Lau and Y. H. Leung; "A Dolph-Chebyshev Approach to the Synthesis of Array Patterns for Uniform Circular Arrays" International Symposium on Circuits and Systems; May 2000; 124-127; vol. 1.

C. M. Tan, P. Fletcher, M. A. Beach, A. R. Nix, M. Landmann and R. S. Thoma; "On the Application of Circular Arrays in Direction Finding Part I: Investigation into the estimation algorithms", 1st Annual COST 273 Workshop, May/Jun. 2002; 8 pages.

Ivan Tashev; Microsoft Array project in MSR: approach and results, http://research.microsoft.com/users/ivantash/Documents/MicArraysInMSR.pdf; Jun. 2004; 49 pages.

Hiroshi Yasukawa, Isao Furukawa and Yasuzou Ishiyama; "Acoustic Echo Control for High Quality Audio Teleconferencing"; International Conference on Acoustics, Speech, and Signal Processing; May 1989; pp. 2041-2044; vol. 3.

Hiroshi Yasukawa and Shoji Shimada; "An Acoustic Echo Canceller Using Subband Sampling and Decorrelation Methods"; IEEE Transactions on Signal Processing; Feb. 1993; pp. 926-930; vol. 41, Issue 2.

"Press Releases"; Retrieved from the Internet: http://www.acousticmagic.com/press/; Mar. 14, 2003-Jun. 12, 2006; 18 pages; Acoustic Magic.

Marc Gayer, Markus Lohwasser and Manfred Lutzky; "Implementing MPEG Advanced Audio Coding and Layer-3 encoders on 32-bit and 16-bit fixed-point processors"; Jun. 25, 2004; 7 pages; Revision 1.11; Fraunhofer Institute for Integrated Circuits IIS; Erlangen, Germany.

Man Mohan Sondhi and Dennis R. Morgan; "Acoustic Echo Cancellation for Stereophonic Teleconferencing"; May 9, 1991; 2 pages; AT&T Bell Laboratories, Murray Hill, NJ.

Vesa, et al., "Automatic Estimation of Reverberation Time from Binaural Signals", IEEE International Conference on Acoustics, Speech, and Signal Processing 2005, Mar. 18-23, 2005, vol. 3, Philadelphia, PA, pp. iii 281-iii/284.

Nomura, et al., "Linearization of Loudspeaker Systems Using Mint and Volterra Filters", IEEE International Conference on Acoustics, Speech, and Signal Processing 2005, Mar. 18-23, 2005, vol. 4, Philadelphia, PA, pp. iv/457-iv/460.

Dandekar, et al., "Smart Antenna Array Calibration Procedure Including Amplitude and Phase Mismatch and Mutual Coupling Effects", IEEE International Conference on Personal Wireless Communications 2000, pp. 293-297.

Wang, et al., "Calibration, Optimization, and DSP Implementation of Microphone Array for Speech Processing", Workshop on VLSI Signal Processing, Oct. 30-Nov. 1, 1996, pp. 221-230.

"DSP in Loudspeakers", Journal of the Audio Engineering Society, vol. 52, No. 4, Apr. 2004, pp. 434-439.

Klippel, Wolfgang, "Diagnosis and Remedy of Nonlinearities in Electrodynamical Transducers", 109th Audio Engineering Society Convention, Sep. 22-25, 2000, Los Angeles, CA, 38 pages.

Kuech, et al., "Nonlinear Acoustic Echo Cancellation Using Adaptive Orthogonalized Power Filters", IEEE International Conference on Acoustics, Speech, and Signal Processing 2005, Mar. 18-23, 2005, vol. 3, pp. iii/105-iii108.

Kuech, et al., "Coefficient-Dependent Step-Size for Adaptive Second-Order Volterra Filters", Telecommunications Laboratory, University of Erlangen-Nuremberg, Erlangen, Germany, 4 pages.

Klippel, Wolfgang, "Dynamical Measurement of Non-Linear Parameters of Electrodynamical Loudspeakers and Their Interpretation", 88th Audio Engineering Society Convention, Mar. 13-16, 1990, 26 pages.

Porat, et al., "Accuracy requirements in off-line array calibration", IEEE Transactions on Aerospace and Electronic Systems, vol. 33, Issue 2, Part 1, Apr. 1997, pp. 545-556.

Greenfield, et al, "Efficient Filter Design for Loudspeaker Equalization", Journal of the Audio Engineering Society 1993, vol. 41, Issue 5, May 1993, pp. 364-366.

Williams, et al., "A Digital Approach to Actively Controlling Inherent Nonlinearities of Low Frequency Loudspeakers", 87th Audio Engineering Society Convention, Oct. 18-21, 1989, New York, 12 pages.

Gao, et al., "Adaptive Linearization of a Loudspeaker", 93rd Audio Engineering Society Convention, Oct. 1-4, 1992, 16 pages.

Hall, David S., "Design Considerations for an Accelerometer-Based Loudspeaker Motional Feedback System", 87th Audio Engineering Society Convention, Oct. 18-21, 1989, New York, 15 pages.

Klippel, Wolfgang, "The Mirror Filter—A New Basis for Linear Equalization and Nonlinear Distortion Reduction of Woofer Systems", 92nd Audio Engineering Society Convention, Mar. 24-27, 1992, 49 pages.

Heed, et al., "Qualitative Analysis of Component Nonlinearities which Cause Low Frequency THD", 100th Audio Engineering Society Convention, May 11-14, 1996, Copenhagen, 35 pages.

Bright, Andrew, "Simplified Loudspeaker Distortion Compensation by DSP", Audio Engineering Society 23rd International Convention, Copenhagen, May 23-25, 2003, 11 pages.

Stahl, Karl Erik, "Synthesis of Loudspeaker Mechanical Parameters by Electrical Means: A new method for controlling low frequency loudspeaker behavior", 61st Audio Engineering Society Convention, Nov. 3-6, 1978, 18 pages.

Hawksford, M.O.J., "System measurement and modeling using pseudo-random filtered noise and music sequences", 114th Audio Engineering Society Convention, Mar. 22-25, 2003, Amsterdam, Holland, 21 pages.

Kaizer, A.J.M., "The Modelling of the Nonlinear Response of an Electrodynamic Loudspeaker by a Volterra Series Expansion", 80th Audio Engineering Society Convention, Mar. 4-7, 1986, Montreux, Switzerland, 23 pages.

Small, Richard H., "Loudspeaker Large-Signal Limitations", 1984 Australian Regional Convention, Sep. 25-27, 1984, Melbourne, 33 pages.

Katayama, et al., "Reduction of Second Order Non-Linear Distortion of a Horn Loudspeaker by a Volterra Filter—Real-Time Implementation", 103rd Audio Engineering Society Convention, Sep. 26-29, 1997, New York, 20 pages.

Merimaa, et al., "Concert Hall Impulse Responses—Pori, Finland: Analysis Results", Helsinki University of Technology, 2005, pp. 1-28.

Muller, et al., "Transfer-Function Measurement with Sweeps", Journal of the Audio Engineering Society 2001, vol. 49, pp. 443-471.

Farina, Angelo, "Simultaneous Measurement of Impulse and Distortion with a Swept-Sine Technique", 108th Audio Engineering Society Convention, Feb. 19-22, 2000, Paris, 25 pages.

* cited by examiner

Diaphragm

Plastic Layer
Metal Layer

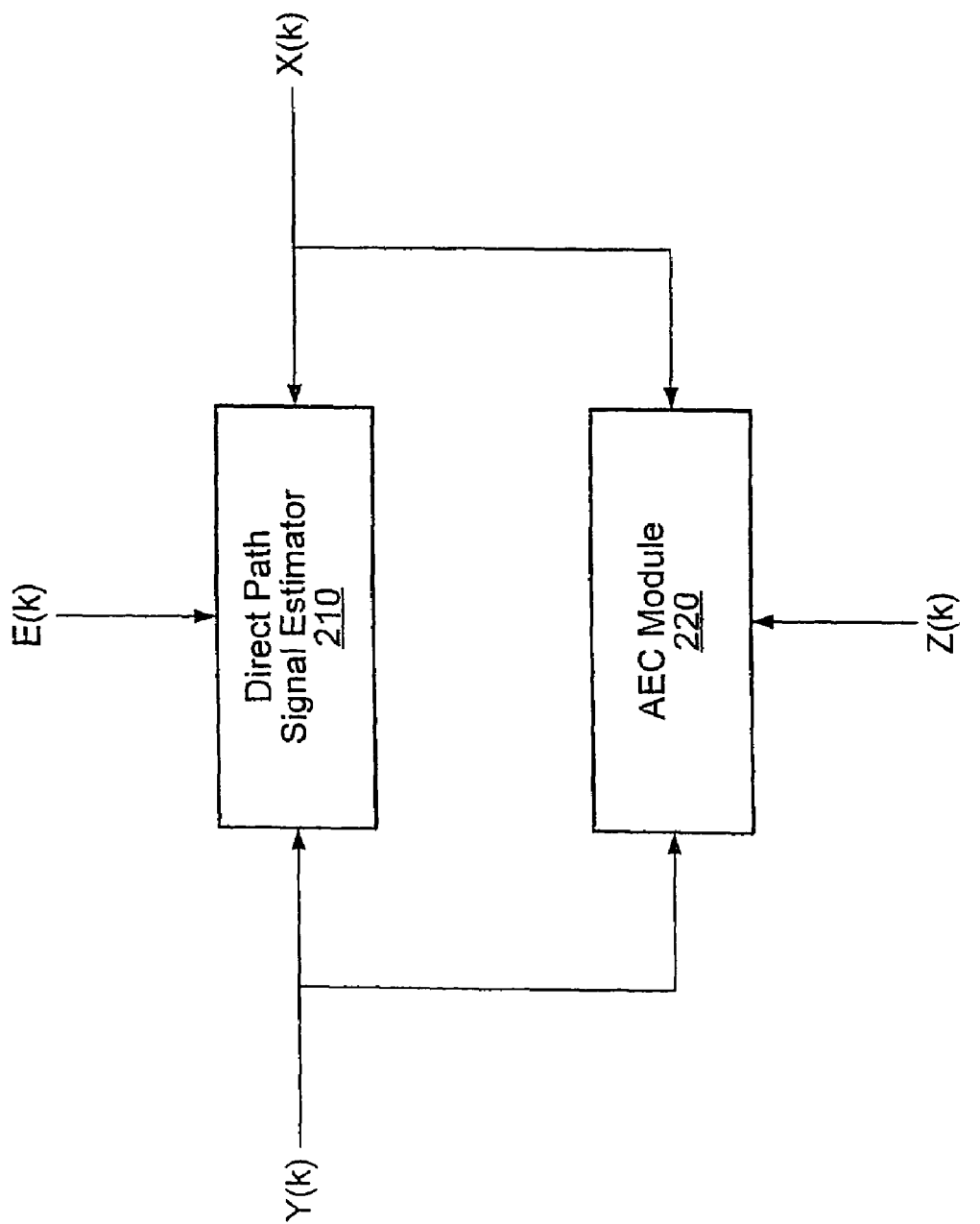

generate a first set of parameters for a first virtual beam based on a first subset of the microphones, where the first virtual beam has an integer-order superdirective structure    1710 compute a plurality of parameter sets for a corresponding plurality of delay-and-sum beams, where the parameter set for each delay-and-sum beam is computed for a corresponding frequency range, where the parameter sets for the delay-and-sum beams are each computed based on a common set of beam constraints, where the frequency ranges for the delay-and-sum beams are above a transition frequency    1715 combine the plurality of parameter sets to obtain a second set of parameters    1720 store the first set of parameters and the second set of parameters in the memory of the system    1725

FIG. 17

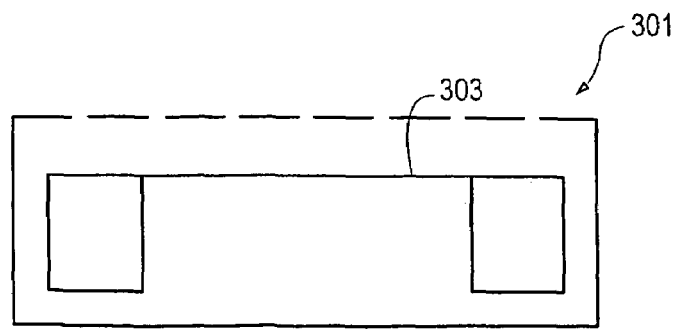

FIG. 18

Sensitivity Pattern for Super-
directive Microphone 530

UPDATING MODELING INFORMATION BASED ON OFFLINE CALIBRATION EXPERIMENTS

PRIORITY CLAIMS

This application claims priority to U.S. Provisional Application No. 60/676,415, filed on Apr. 29, 2005, entitled "Speakerphone Functionality", invented by William V. Oxford, Vijay Varadarajan and Ioannis S. Dedes.

This application is a continuation-in-part of U.S. patent application Ser. No. 11/108,341, filed on Apr. 18, 2005, entitled "Speakerphone Self Calibration and Beam Forming", invented by William V. Oxford and Vijay Varadarajan, which claims priority to U.S. Provisional Application No. 60/619,303 filed Oct. 15, 2004 and to U.S. Provisional Application No. 60/634,315 filed Dec. 8, 2004.

This application is a continuation-in-part of U.S. patent application Ser. No. 11/251,084, filed on Oct. 14, 2005, entitled "Speakerphone", invented by William V. Oxford, which claims priority to U.S. Provisional Application No. 60/619,303 filed Oct. 15, 2004 and to U.S. Provisional Application No. 60/634,315 filed Dec. 8, 2004.

BACKGROUND OF THE INVENTION

1. Field of the Invention

The present invention relates generally to the field of communication devices and, more specifically, to speakerphones.

2. Description of the Related Art

Speakerphones are used in many types of telephone calls, and particularly are used in conference calls where multiple people are located in a single room. A speakerphone may have one or more microphones to pick up voices of in-room participants, and at least one speaker to audibly present voices from offsite participants. While speakerphones may allow several people to participate in a conference call, there are a number of problems associated with the use of speakerphones.

As the microphone and speaker age, their physical properties change, thus compromising the ability to perform high quality acoustic echo cancellation. Thus, there exists a need for a system and method capable of estimating descriptive parameters for the speaker and the microphone as they age.

Furthermore, noise sources such as fans, electrical appliances and air conditioning interfere with the ability to discern the voices of the conference participants. Thus, there exists a need for a system and method capable of "tuning in" on the voices of the conference participants and "tuning out" the noise sources.

SUMMARY

In one set of embodiments, a method for calibrating a system including a speaker may involve the following actions:
 (a) outputting a stimulus signal for transmission from a speaker;
 (b) receiving an input signal from a microphone, wherein the input signal corresponds to the stimulus signal;
 (c) computing a midrange sensitivity and a lowpass sensitivity for a transfer function $H(\omega)$ derived from a spectrum of the input signal and a spectrum of the stimulus signal;
 (d) subtracting the midrange sensitivity from the lowpass sensitivity to obtain a speaker-related sensitivity;
 (e) performing an iterative search for current values of parameters of an input-output model of the speaker using the input signal spectrum, the stimulus signal spectrum, the speaker-related sensitivity; and
 (f) updating averages of the parameters of the speaker input-output model using the current parameter values.

The method may also include monitoring average signal power from the microphone. The action of outputting the stimulus signal may be performed in response to a determination that the average signal power from the microphone has remained less than a power threshold for a predetermined amount of time. Thus, the calibration experiment may be performed when the environment is sufficiently silent.

The parameter averages of the speaker input-output model are usable to perform echo cancellation, e.g., on inputs signals captured during a conversation.

The input-output model of the speaker may be a nonlinear model, e.g., a Volterra series model. Other types of nonlinear models may be used as well.

The stimulus signal may be a noise signal, e.g., a burst of maximum length sequence noise.

In some embodiments, the method may also include applying one or more notch filters to the stimulus signal prior to transmission from the speaker in order to remove one or more frequencies from the stimulus signal. The one or more frequencies may be frequencies that are known to induce resonance in one or more physical structures.

In one embodiment, the method may also include: performing an iterative search for a current transfer function of the microphone using the input signal spectrum, the spectrum of the stimulus signal, and the current parameter values; and updating an average microphone transfer function using the current transfer function. The average microphone transfer function may also be usable to perform echo cancellation.

In one embodiment, the actions (a) through (f) may be performed by one or more processors in a speakerphone.

In another set of embodiments, a method for calibrating a system including a speaker may include the following actions:
 (a) receiving an input signal from a microphone, wherein the input signal corresponds to a transmission of a stimulus signal from a speaker;
 (b) computing a midrange sensitivity and a lowpass sensitivity for a transfer function $H(\omega)$ derived from a spectrum of the input signal and a spectrum of the stimulus signal;
 (c) subtracting the midrange sensitivity from the lowpass sensitivity to obtain a speaker-related sensitivity;
 (d) performing an iterative search for current values of parameters of an input-output model of the speaker using the input signal spectrum, the stimulus signal spectrum, the speaker-related sensitivity; and
 (e) updating averages of the parameters of the speaker input-output model using the current parameter values.

Any of the various method embodiments disclosed herein (or any combinations thereof or portions thereof) may be implemented in terms of program instructions. The program instructions may be stored in (or on) any of various memory media. A memory medium is a medium configured for the storage of information. Examples of memory media include various kinds of magnetic media (e.g., magnetic tape or magnetic disk); various kinds of optical media (e.g., CD-ROM); various kinds of semiconductor RAM and ROM; various media based on the storage of electrical charge or other physical quantities; etc.

Furthermore, various embodiments of a system including a memory and a processor are contemplated, where the memory is configured to store program instructions and the processor is configured to read and execute the program instructions from the memory. In various embodiments, the program instructions encode corresponding ones of the method embodiments described herein (or combinations thereof or portions thereof). For example, in one embodiment, the program instructions are executable to implement:

(a) receiving an input signal from a microphone, wherein the input signal corresponds to a transmission of a stimulus signal from a speaker;

(b) computing a midrange sensitivity and a lowpass sensitivity for a transfer function $H(\omega)$ derived from a spectrum of the input signal and a spectrum of the stimulus signal;

(c) subtracting the midrange sensitivity from the lowpass sensitivity to obtain a speaker-related sensitivity;

(d) performing an iterative search for current values of parameters of an input-output model of the speaker using the input signal spectrum, the stimulus signal spectrum, the speaker-related sensitivity; and (e) updating averages of the parameters of the speaker input-output model using the current parameter values.

The system may also include the speaker and the microphone. For example, embodiments of the system targeted for realization as a speakerphone may include the speaker and the microphone.

BRIEF DESCRIPTION OF THE DRAWINGS

The following detailed description makes reference to the accompanying drawings, which are now briefly described.

FIG. 9 illustrates one embodiment of a software block diagram that may be executed by processor 207.

FIG. 17 illustrates one set of embodiments of a method for configured a system having an array of microphones, a processor and a method.

FIG. 18 illustrates one embodiment of a microphone having a diaphragm 303.

Figure 1A:
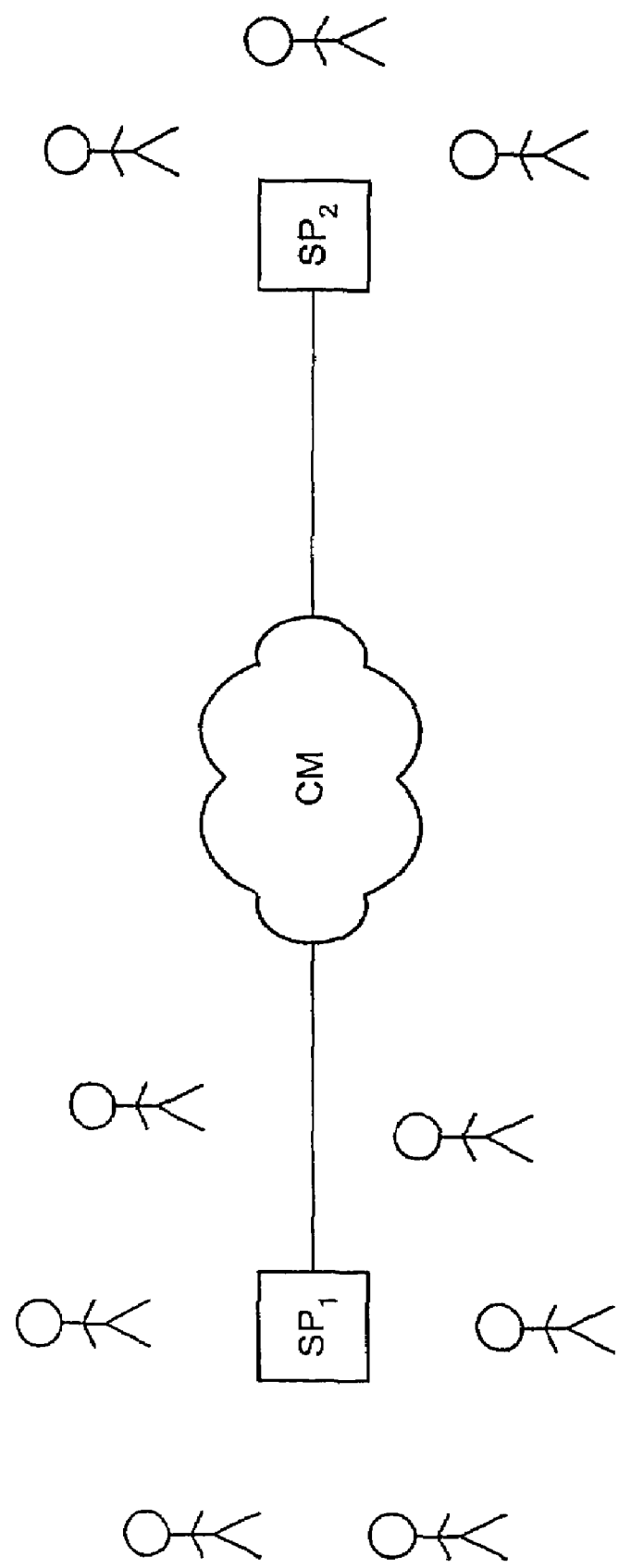
FIG. 1A illustrates communication system including two speakerphones coupled through a communication mechanism.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF THE PREFERRED EMBODIMENTS

U.S. Provisional Application No. 60/676,415, filed on Apr. 29, 2005, entitled "Speakerphone Functionality", invented by William V. Oxford, Vijay Varadarajan and Ioannis S. Dedes, is hereby incorporated by reference in its entirety.

U.S. patent application Ser. No. 11/251,084, filed on Oct. 14, 2005, entitled "Speakerphone", invented by William V. Oxford, is hereby incorporated by reference in its entirety.

U.S. patent application Ser. 11/108,341, filed on Apr. 18, 2005, entitled "Speakerphone Self Calibration and Beam Forming", invented by William V. Oxford and Vijay Varadarajan, is hereby incorporated by reference in its entirety.

U.S. patent application titled "Videoconferencing System Transcoder", Ser. No. 11/252,238, which was filed Oct. 17, 2005, whose inventors are Michael L. Kenoyer and Michael V. Jenkins, is hereby incorporated by reference in its entirety as though fully and completely set forth herein.

U.S. patent application titled "Speakerphone Supporting Video and Audio Features", Ser. No. 11/251,086, which was filed Oct. 14, 2005, whose inventors are Michael L. Kenoyer, Craig B. Malloy and Wayne E. Mock is hereby incorporated by reference in its entirety as though fully and completely set forth herein.

U.S. patent application titled "High Definition Camera Pan Tilt Mechanism", Ser. No. 11/251,083, which was filed Oct. 14, 2005, whose inventors are Michael L. Kenoyer, William V. Oxford, Patrick D. Vanderwilt, Hans-Christoph Haenlein, Branko Lukic and Jonathan I. Kaplan, is hereby incorporated by reference in its entirety as though fully and completely set forth herein.

U.S. Provisional Patent Application titled "Video Conferencing Speakerphone", Ser. No. 60/619,212, which was filed Oct. 15, 2004, whose inventors are Michael L. Kenoyer, Craig B. Malloy, and Wayne E. Mock is hereby incorporated by reference in its entirety.

U.S. Provisional Patent Application titled "Video Conference Call System", Ser. No. 60/619,210, which was filed Oct. 15, 2004, whose inventors are Michael J. Burkett, Ashish Goyal, Michael V. Jenkins, Michael L. Kenoyer, Craig B. Malloy, and Jonathan W. Tracey is hereby incorporated by reference in its entirety.

U.S. Provisional Patent Application titled "High Definition Camera and Mount", Ser. No. 60/619,227, which was filed Oct. 15, 2004, whose inventors are Michael L. Kenoyer, Patrick D. Vanderwilt, Paul D. Frey, Paul Leslie Howard, Jonathan I. Kaplan, and Branko Lukic, is hereby incorporated by reference in its entirety.

List of Acronyms Used Herein

DDR SDRAM=Double-Data-Rate Synchronous Dynamic RAM
DRAM=Dynamic RAM
FIFO=First-In First-Out Buffer
FIR=Finite Impulse Response
FFT=Fast Fourier Transform
Hz=Hertz
IIR=Infinite Impulse Response
ISDN=Integrated Services Digital Network
kHz=kiloHertz
PSTN=Public Switched Telephone Network
RAM=Random Access Memory
RDRAM=Rambus Dynamic RAM
ROM=Read Only Memory
SDRAM=Synchronous Dynamic Random Access Memory
SRAM=Static RAM A communication system may be configured to facilitate voice communication between participants (or groups of participants) who are physically separated as suggested by FIG. 1A. The communication system may include a first speakerphone $SP_1$ and a second speakerphone $SP_2$ coupled through a communication mechanism CM. The communication mechanism CM may be realized by any of a wide variety of well known communication technologies. For example, communication mechanism CM may be the PSTN (public switched telephone network) or a computer network such as the Internet.

Speakerphone Block Diagram

Figure 1B:
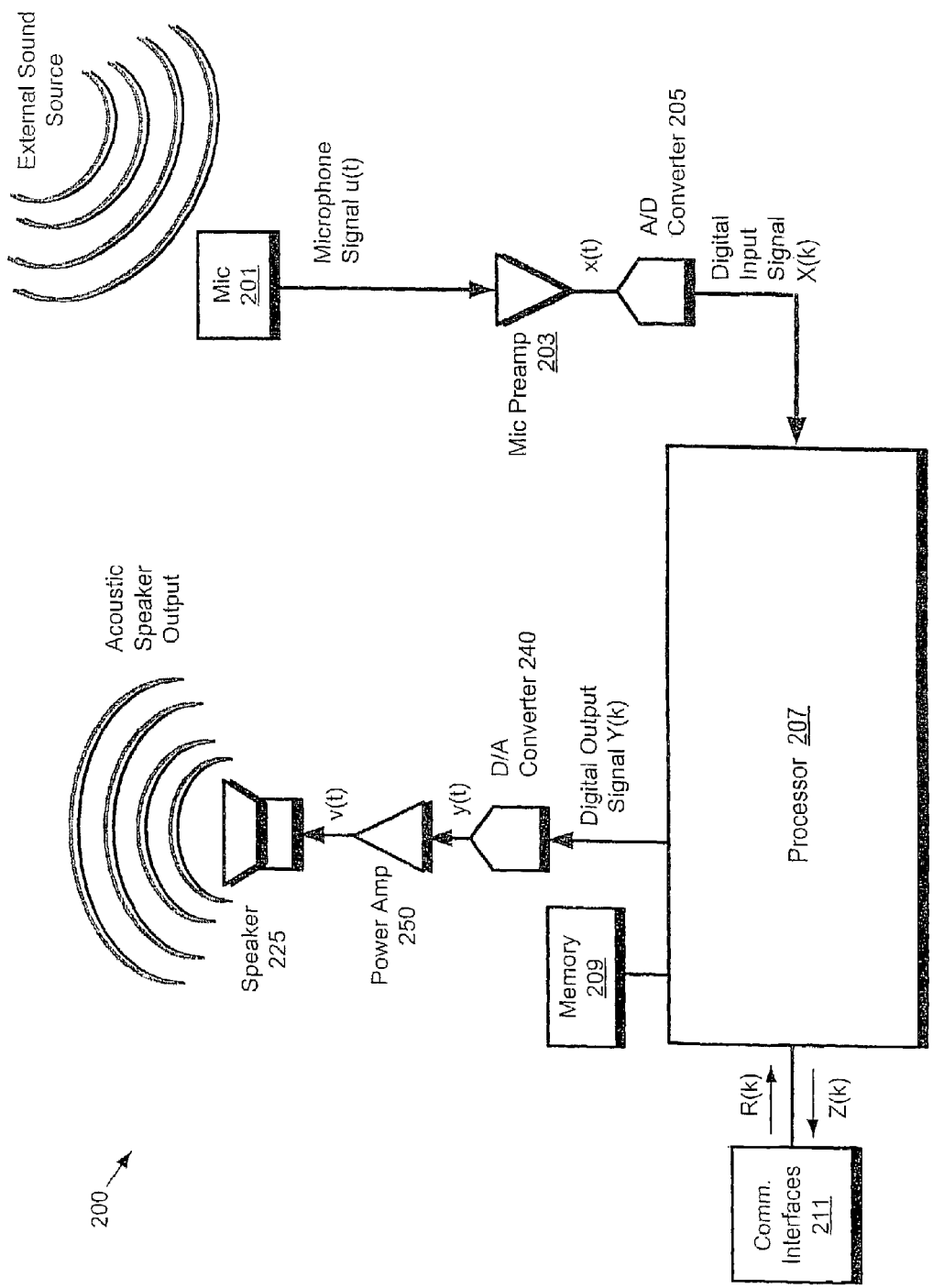
FIG. 1B illustrates one set of embodiments of a speakerphone system 200.

FIG. 1B illustrates a speakerphone 200 according to one set of embodiments. The speakerphone 200 may include a processor 207 (or a set of processors), memory 209, a set 211 of one or more communication interfaces, an input subsystem and an output subsystem.

The processor 207 is configured to read program instructions which have been stored in memory 209 and to execute the program instructions in order to enact any of the various methods described herein.

Memory 209 may include any of various kinds of semiconductor memory or combinations thereof. For example, in one embodiment, memory 209 may include a combination of Flash ROM and DDR SDRAM.

The input subsystem may include a microphone 201 (e.g., an electret microphone), a microphone preamplifier 203 and an analog-to-digital (A/D) converter 205. The microphone 201 receives an acoustic signal A(t) from the environment and converts the acoustic signal into an electrical signal u(t). (The variable t denotes time.) The microphone preamplifier 203 amplifies the electrical signal u(t) to produce an amplified signal x(t). The A/D converter samples the amplified signal x(t) to generate digital input signal X(k). The digital input signal X(k) is provided to processor 207.

In some embodiments, the A/D converter may be configured to sample the amplified signal x(t) at least at the Nyquist rate for speech signals. In other embodiments, the A/D converter may be configured to sample the amplified signal x(t) at least at the Nyquist rate for audio signals.

Processor 207 may operate on the digital input signal X(k) to remove various sources of noise, and thus, generate a corrected microphone signal Z(k). The processor 207 may send the corrected microphone signal Z(k) to one or more remote devices (e.g., a remote speakerphone) through one or more of the set 211 of communication interfaces.

The set 211 of communication interfaces may include a number of interfaces for communicating with other devices (e.g., computers or other speakerphones) through well-known communication media. For example, in various embodiments, the set 211 includes a network interface (e.g., an Ethernet bridge), an ISDN interface, a PSTN interface, or, any combination of these interfaces.

The speakerphone 200 may be configured to communicate with other speakerphones over a network (e.g., an Internet Protocol based network) using the network interface. In one embodiment, the speakerphone 200 is configured so multiple speakerphones, including speakerphone 200, may be coupled together in a daisy chain configuration.

The output subsystem may include a digital-to-analog (D/A) converter 240, a power amplifier 250 and a speaker 225. The processor 207 may provide a digital output signal Y(k) to the D/A converter 240. The D/A converter 240 converts the digital output signal Y(k) to an analog signal y(t). The power amplifier 250 amplifies the analog signal y(t) to generate an amplified signal v(t). The amplified signal v(t)

drives the speaker 225. The speaker 225 generates an acoustic output signal in response to the amplified signal v(t).

Processor 207 may receive a remote audio signal R(k) from a remote speakerphone through one of the communication interfaces and mix the remote audio signal R(k) with any locally generated signals (e.g., beeps or tones) in order to generate the digital output signal Y(k). Thus, the acoustic signal radiated by speaker 225 may be a replica of the acoustic signals (e.g., voice signals) produced by remote conference participants situated near the remote speakerphone.

In one alternative embodiment, the speakerphone may include circuitry external to the processor 207 to perform the mixing of the remote audio signal R(k) with any locally generated signals.

In general, the digital input signal X(k) represents a superposition of contributions due to:
- acoustic signals (e.g., voice signals) generated by one or more persons (e.g., conference participants) in the environment of the speakerphone 200, and reflections of these acoustic signals off of acoustically reflective surfaces in the environment;
- acoustic signals generated by one or more noise sources (such as fans and motors, automobile traffic and fluorescent light fixtures) and reflections of these acoustic signals off of acoustically reflective surfaces in the environment; and
- the acoustic signal generated by the speaker 225 and the reflections of this acoustic signal off of acoustically reflective surfaces in the environment.

Processor 207 may be configured to execute software including an acoustic echo cancellation (AEC) module. The AEC module attempts to estimate the sum C(k) of the contributions to the digital input signal X(k) due to the acoustic signal generated by the speaker and a number of its reflections, and, to subtract this sum C(k) from the digital input signal X(k) so that the corrected microphone signal Z(k) may be a higher quality representation of the acoustic signals generated by the local conference participants.

In one set of embodiments, the AEC module may be configured to perform many (or all) of its operations in the frequency domain instead of in the time domain. Thus, the AEC module may:
- estimate the Fourier spectrum $C(\omega)$ of the signal C(k) instead of the signal C(k) itself, and
- subtract the spectrum $C(\omega)$ from the spectrum $X(\omega)$ of the input signal X(k) in order to obtain a spectrum $Z(\omega)$.

An inverse Fourier transform may be performed on the spectrum $Z(\omega)$ to obtain the corrected microphone signal Z(k). As used herein, the "spectrum" of a signal is the Fourier transform (e.g., the FFT) of the signal.

In order to estimate the spectrum $C(\omega)$, the acoustic echo cancellation module may utilize:
- the spectrum $Y(\omega)$ of a set of samples of the output signal Y(k), and
- modeling information $I_M$ describing the input-output behavior of the system elements (or combinations of system elements) between the circuit nodes corresponding to signals Y(k) and X(k).

For example, in one set of embodiments, the modeling information $I_M$ may include:
(a) a gain of the D/A converter 240;
(b) a gain of the power amplifier 250;
(c) an input-output model for the speaker 225;
(d) parameters characterizing a transfer function for the direct path and reflected path transmissions between the output of speaker 225 and the input of microphone 201;
(e) a transfer function of the microphone 201;
(f) a gain of the preamplifier 203;
(g) a gain of the A/D converter 205.

Figure 2:
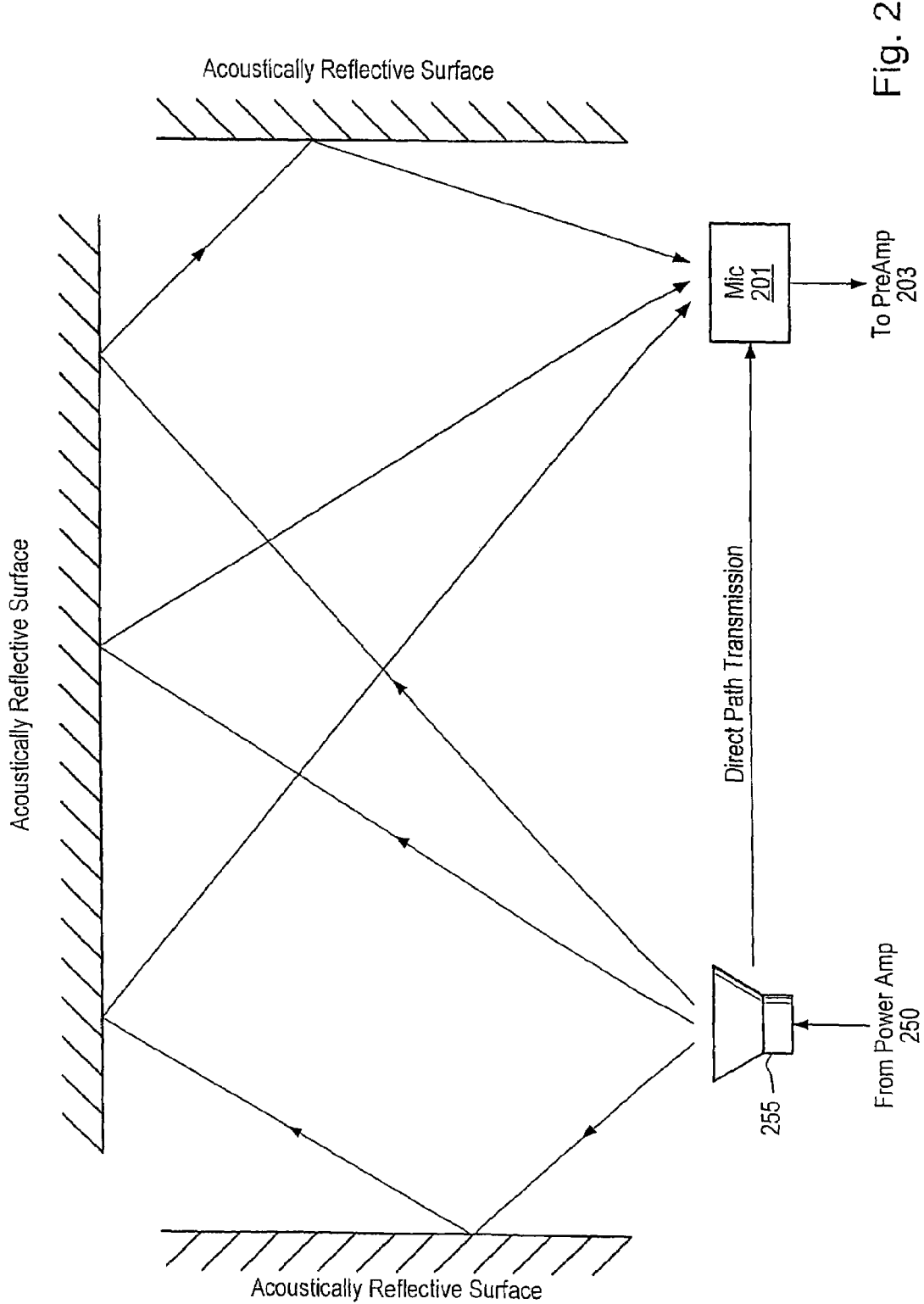
FIG. 2 illustrates a direct path transmission and three examples of reflected path transmissions between the speaker 255 and microphone 201.

The parameters (d) may include attenuation coefficients and propagation delay times for the direct path transmission and a set of the reflected path transmissions between the output of speaker 225 and the input of microphone 201. FIG. 2 illustrates the direct path transmission and three reflected path transmission examples.

In some embodiments, the input-output model for the speaker may be (or may include) a nonlinear Volterra series model, e.g., a Volterra series model of the form:

$$f_S(k) = \sum_{i=0}^{N_a-1} a_i v(k-i) + \sum_{i=0}^{N_b-1} \sum_{j=0}^{M_b-1} b_{ij} v(k-i) \cdot v(k-j), \quad (1)$$

where v(k) represents a discrete-time version of the speaker's input signal, where $f_S(k)$ represents a discrete-time version of the speaker's acoustic output signal, where $N_a$, $N_b$ and $M_b$ are positive integers. For example, in one embodiment, $N_a=8$, $N_b=3$ and $M_b=2$. Expression (1) has the form of a quadratic polynomial. Other embodiments using higher order polynomials are contemplated.

In alternative embodiments, the input-output model for the speaker is a transfer function (or equivalently, an impulse response).

In one embodiment, the AEC module may compute the compensation spectrum $C(\omega)$ using the output spectrum $Y(\omega)$ and the modeling information $I_M$ (including previously estimated values of the parameters (d)). Furthermore, the AEC module may compute an update for the parameters (d) using the output spectrum $Y(\omega)$, the input spectrum $X(\omega)$, and at least a subset of the modeling information $I_M$ (possibly including the previously estimated values of the parameters (d)).

In another embodiment, the AEC module may update the parameters (d) before computing the compensation spectrum $C(\omega)$.

In those embodiments where the speaker input-output model is a nonlinear model (such as a Volterra series model), the AEC module may be able to converge more quickly and/or achieve greater accuracy in its estimation of the attenuation coefficients and delay times (of the direct path and reflected paths) because it will have access to a more accurate representation of the actual acoustic output of the speaker than in those embodiments where a linear model (e.g., a transfer function) is used to model the speaker.

In some embodiments, the AEC module may employ one or more computational algorithms that are well known in the field of echo cancellation.

The modeling information $I_M$ (or certain portions of the modeling information $I_M$) may be initially determined by measurements performed at a testing facility prior to sale or distribution of the speakerphone 200. Furthermore, certain portions of the modeling information $I_M$ (e.g., those portions that are likely to change over time) may be repeatedly updated based on operations performed during the lifetime of the speakerphone 200.

In one embodiment, an update to the modeling information $I_M$ may be based on samples of the input signal X(k) and samples of the output signal Y(k) captured during periods of time when the speakerphone is not being used to conduct a conversation.

In another embodiment, an update to the modeling information $I_M$ may be based on samples of the input signal X(k) and samples of the output signal Y(k) captured while the speakerphone 200 is being used to conduct a conversation.

In yet another embodiment, both kinds of updates to the modeling information $I_M$ may be performed.

Updating Modeling Information Based on Offline Calibration Experiments

In one set of embodiments, the processor 207 may be programmed to update the modeling information $I_M$ during a period of time when the speakerphone 200 is not being used to conduct a conversation.

The processor 207 may wait for a period of relative silence in the acoustic environment. For example, if the average power in the input signal X(k) stays below a certain threshold for a certain minimum amount of time, the processor 207 may reckon that the acoustic environment is sufficiently silent for a calibration experiment. The calibration experiment may be performed as follows.

The processor 207 may output a known noise signal as the digital output signal Y(k). In some embodiments, the noise signal may be a burst of maximum-length-sequence noise, followed by a period of silence. For example, in one embodiment, the noise signal burst may be approximately 2-2.5 seconds long and the following silence period may be approximately 5 seconds long. In some embodiments, the noise signal may be submitted to one or more notch filters (e.g., sharp notch filters), in order to null out one or more frequencies known to causes resonances of structures in the speakerphone, prior to transmission from the speaker.

The processor 207 may capture a block $B_X$ of samples of the digital input signal X(k) in response to the noise signal transmission. The block $B_X$ may be sufficiently large to capture the response to the noise signal and a sufficient number of its reflections for a maximum expected room size. For example, in one embodiment, the block $B_X$ may be sufficiently large to capture the response to the noise signal and a full reverb tail corresponding to the noise signal for a maximum expected room size.

The block $B_X$ of samples may be stored into a temporary buffer, e.g., a buffer which has been allocated in memory 209.

The processor 207 computes a Fast Fourier Transform (FFT) of the captured block $B_X$ of input signal samples X(k) and an FFT of a corresponding block $B_Y$ of samples of the known noise signal Y(k), and computes an overall transfer function H(ω) for the current experiment according to the relation $$H(\omega)=FFT(B_X)/FFT(B_Y), \quad (2)$$

where ω denotes angular frequency. The processor may make special provisions to avoid division by zero.

The processor 207 may operate on the overall transfer function H(ω) to obtain a midrange sensitivity value $s_1$ as follows.

The midrange sensitivity value $s_1$ may be determined by computing an A-weighted average of the magnitude of the overall transfer function H(ω):

$$s_1=\text{SUM}[|H(\omega)|A(\omega), \omega \text{ ranging from zero to } \pi]. \quad (3)$$

In some embodiments, the weighting function A(ω) may be designed so as to have low amplitudes:

at low frequencies where changes in the overall transfer function due to changes in the properties of the speaker are likely to be expressed, and at high frequencies where changes in the overall transfer function due to material accumulation on the microphone diaphragm are likely to be expressed.

Figure 3:
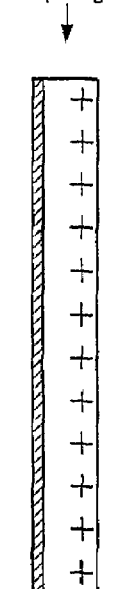
FIG. 3 illustrates a diaphragm of an electret microphone.

The diaphragm of an electret microphone is made of a flexible and electrically non-conductive material such as plastic (e.g., Mylar) as suggested in FIG. 3. Charge (e.g., positive charge) is deposited on one side of the diaphragm at the time of manufacture. A layer of metal may be deposited on the other side of the diaphragm.

Figure 4A:
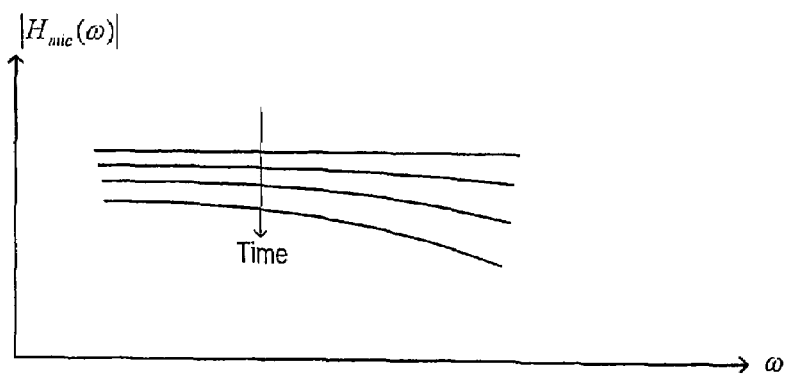
FIG. 4A illustrates the change over time of a microphone transfer function.

As the microphone ages, the deposited charge slowly dissipates, resulting in a gradual loss of sensitivity over all frequencies. Furthermore, as the microphone ages material such as dust and smoke accumulates on the diaphragm, making it gradually less sensitive at high frequencies. The summation of the two effects implies that the amplitude of the microphone transfer function $|H_{mic}(\omega)|$ decreases at all frequencies, but decreases faster at high frequencies as suggested by FIG. 4A. If the speaker were ideal (i.e., did not change its properties over time), the overall transfer function H(ω) would manifest the same kind of changes over time.

Figure 4B:
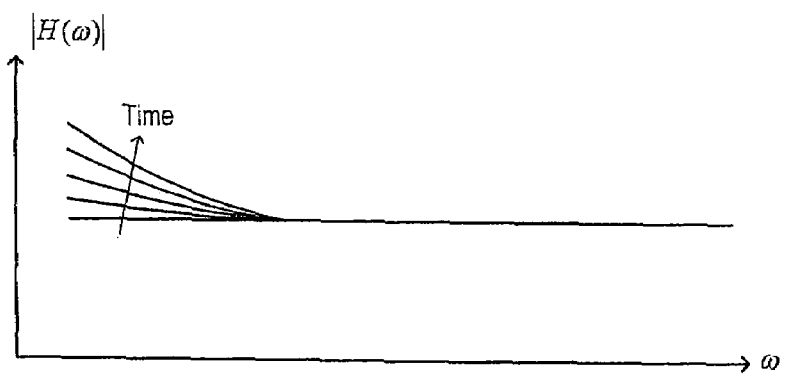
FIG. 4B illustrates the change over time of the overall transfer function due to changes in the properties of the speaker over time under the assumption of an ideal microphone.

The speaker 225 includes a cone and a surround coupling the cone to a frame. The surround is made of a flexible material such as butyl rubber. As the surround ages it becomes more compliant, and thus, the speaker makes larger excursions from its quiescent position in response to the same current stimulus. This effect is more pronounced at lower frequencies and negligible at high frequencies. In addition, the longer excursions at low frequencies implies that the vibrational mechanism of the speaker is driven further into the nonlinear regime. Thus, if the microphone were ideal (i.e., did not change its properties over time), the amplitude of the overall transfer function H(ω) in expression (2) would increase at low frequencies and remain stable at high frequencies, as suggested by FIG. 4B.

The actual change to the overall transfer function H(ω) over time is due to a combination of affects including the speaker aging mechanism and the microphone aging mechanism just described.

In addition to the sensitivity value $s_1$, the processor 207 may compute a lowpass sensitivity value $s_2$ and a speaker related sensitivity $s_3$ as follows. The lowpass sensitivity factor $s_2$ may be determined by computing a lowpass weighted average of the magnitude of the overall transfer function H(ω):

$$s_2=\text{SUM}[|H(\omega)|L(\omega), \omega \text{ ranging from zero to } \pi]. \quad (4)$$

Figure 5:
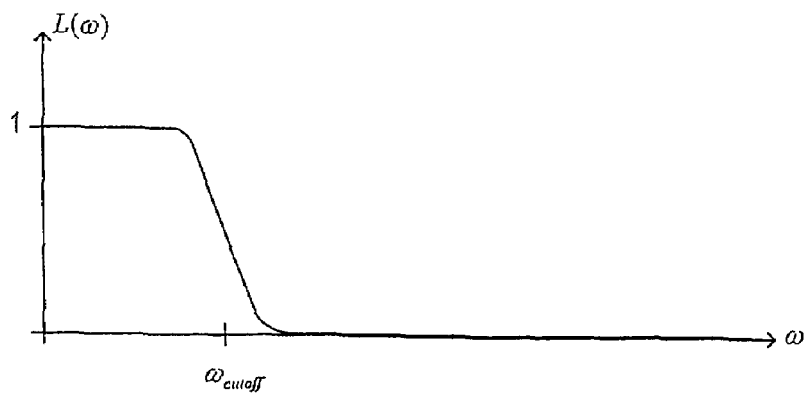
FIG. 5 illustrates a lowpass weighting function $L(\omega)$.

The lowpass weighting function L(ω) equals is equal (or approximately equal) to one at low frequencies and transitions towards zero in the neighborhood of a cutoff frequency. In one embodiment, the lowpass weighting function may smoothly transition to zero as suggested in FIG. 5.

The processor 207 may compute the speaker-related sensitivity value $s_3$ according to the expression:

$$s_3=s_2-s_1.$$

The processor 207 may maintain sensitivity averages $S_1$, $S_2$ and $S_3$ corresponding to the sensitivity values $s_1$, $s_2$ and $s_3$ respectively. The average $S_i$, i=1, 2, 3, represents the average of the sensitivity value $s_i$ from past performances of the calibration experiment.

Furthermore, processor 207 may maintain averages $A_i$ and $B_{ij}$ corresponding respectively to the coefficients $a_i$ and $b_{ij}$ in the Volterra series speaker model. After computing sensitivity value $s_3$, the processor may compute current estimates for the coefficients $b_{ij}$ by performing an iterative search. Any of a wide variety of known search algorithms may be used to perform this iterative search.

In each iteration of the search, the processor may select values for the coefficients $b_{ij}$ and then compute an estimated input signal $X_{EST}(k)$ based on:

the block $B_Y$ of samples of the transmitted noise signal Y(k);

the gain of the D/A converter 240 and the gain of the power amplifier 250;

the modified Volterra series expression $$f_S(k) = c \sum_{i=0}^{N_a-1} A_i v(k-i) + \sum_{i=0}^{N_b-1} \sum_{j=0}^{M_b-1} b_{ij} v(k-i) \cdot v(k-j), \quad (5)$$

where c is given by $c = s_3/s_3$;

the parameters characterizing the transfer function for the direct path and reflected path transmissions between the output of speaker 225 and the input of microphone 201;

the transfer function of the microphone 201;

the gain of the preamplifier 203; and the gain of the A/D converter 205.

The processor may compute the energy of the difference between the estimated input signal $X_{EST}(k)$ and the block $B_X$ of actually received input samples X(k). If the energy value is sufficiently small, the iterative search may terminate. If the energy value is not sufficiently small, the processor may select a new set of values for the coefficients $b_{ij}$, e.g., using knowledge of the energy values computed in the current iteration and one or more previous iterations.

The scaling of the linear terms in the modified Volterra series expression (5) by factor c serves to increase the probability of successful convergence of the $b_{ij}$.

After having obtained final values for the coefficients $b_{ij}$, the processor 207 may update the average values $B_{ij}$ according to the relations:

$$B_{ij} \leftarrow k_{ij} B_{ij} + (1-k_{ij}) b_{ij}, \quad (6)$$

where the values $k_{ij}$ are positive constants between zero and one.

In one embodiment, the processor 207 may update the averages $A_i$ according to the relations:

$$A_i \leftarrow g_i A_i + (1-g_i)(cA_i), \quad (7)$$

where the values $g_i$ are positive constants between zero and one.

In an alternative embodiment, the processor may compute current estimates for the Volterra series coefficients $a_i$ based on another iterative search, this time using the Volterra expression:

$$f_S(k) = \sum_{i=0}^{N_a-1} a_i v(k-i) + \sum_{i=0}^{N_b-1} \sum_{j=0}^{M_b-1} B_{ij} v(k-i) \cdot v(k-j). \quad (8A)$$

After having obtained final values for the coefficients $a_i$, the processor may update the averages $A_i$ according the relations:

$$A_i \leftarrow g_i A_i + (1-g_i) a_i. \quad (8B)$$

The processor may then compute a current estimate $T_{mic}$ of the microphone transfer function based on an iterative search, this time using the Volterra expression:

$$f_S(k) = \sum_{i=0}^{N_a-1} A_i v(k-i) + \sum_{i=0}^{N_b-1} \sum_{j=0}^{M_b-1} B_{ij} v(k-i) \cdot v(k-j). \quad (9)$$

After having obtained a current estimate $T_{mic}$ for the microphone transfer function, the processor may update an average microphone transfer function $H_{mic}$ based on the relation:

$$H_{mic}(\omega) \leftarrow k_m H_{mic}(\omega) + (1-k_m) T_{mic}(\omega), \quad (10)$$

where $k_m$ is a positive constant between zero and one.

Furthermore, the processor may update the average sensitivity values $S_1$, $S_2$ and $S_3$ based respectively on the currently computed sensitivities $s_1$, $s_2$, $s_3$, according to the relations:

$$S_1 \leftarrow h_1 S_1 + (1-h_1) s_1, \quad (11)$$

$$S_2 \leftarrow h_2 S_2 + (1-h_2) s_2, \quad (12)$$

$$S_3 \leftarrow h_3 S_3 + (1-h_3) s_3, \quad (13)$$

where $h_1$, $h_2$, $h_3$ are positive constants between zero and one.

In the discussion above, the average sensitivity values, the Volterra coefficient averages $A_i$ and $B_{ij}$ and the average microphone transfer function $H_{mic}$ are each updated according to an IIR filtering scheme. However, other filtering schemes are contemplated such as FIR filtering (at the expense of storing more past history data), various kinds of nonlinear filtering, etc.

Figure 6A:
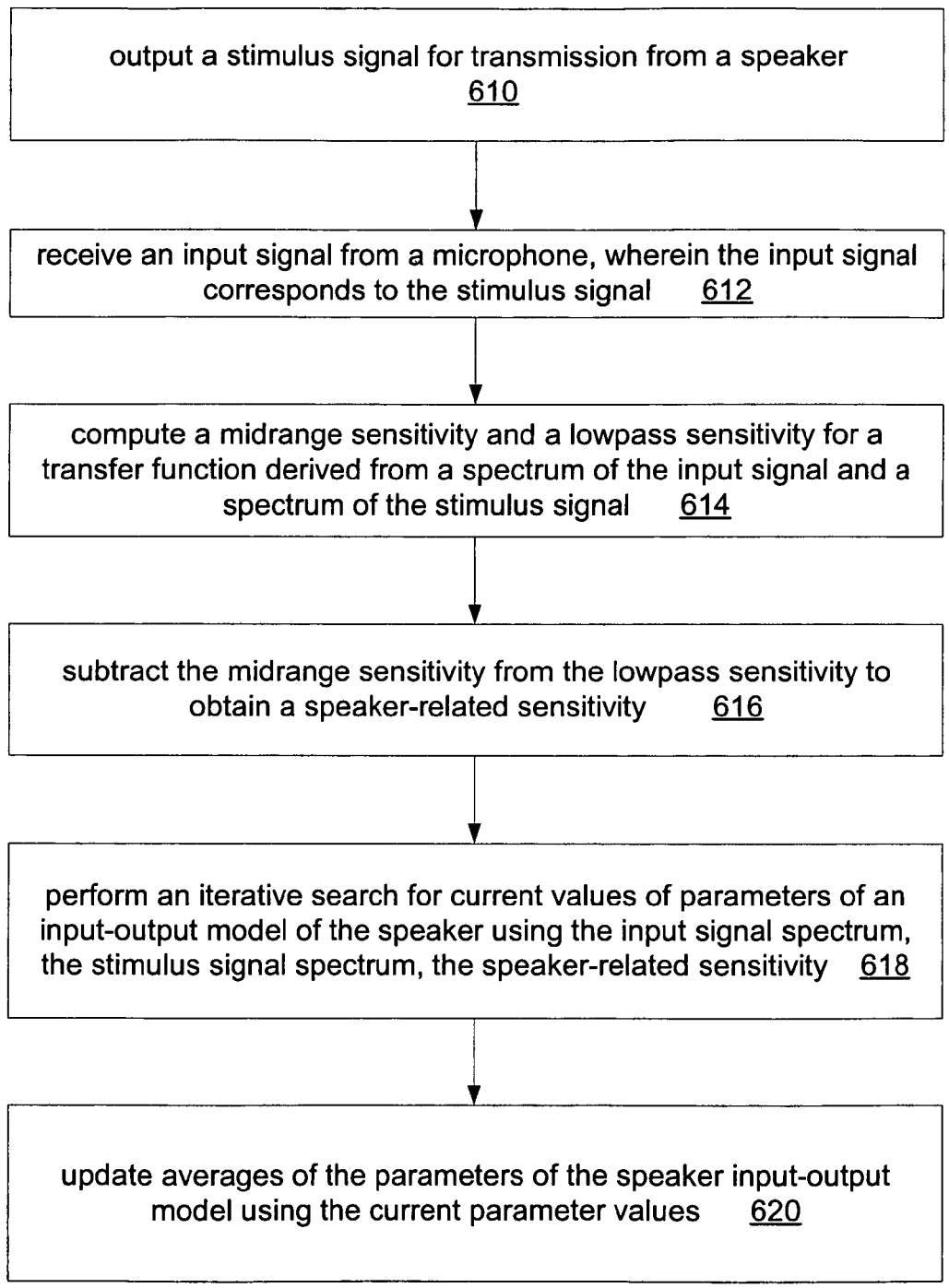
FIG. 6A illustrates one set of embodiments of a method for performing offline self calibration.

In one set of embodiments, a method for calibrating a system including at least a speaker may be performed as illustrated FIG. 6A.

At 610, a stimulus signal may be provided as output for transmission from the speaker. The stimulus signal may be a noise signal, e.g., a burst of maximum length sequence noise.

At 612, an input signal may be received from a microphone, where the input signal corresponds to the stimulus signal. The input signal may capture the response to the stimulus signal and a sufficient number of its reflections for a maximum expected room size.

At 614, a midrange sensitivity and a lowpass sensitivity may be computed for a transfer function $H(\omega)$ derived from a spectrum of the input signal and a spectrum of the stimulus signal.

At 616, the midrange sensitivity may be subtracted from the lowpass sensitivity to obtain a speaker-related sensitivity.

At 618, an iterative search may be performed in order to determine current values of parameters of an input-output model of the speaker using the input signal spectrum, the stimulus signal spectrum, and the speaker-related sensitivity. Any of a wide variety of known search algorithms may be used to perform this iterative search.

At 620, averages of the parameters (of the speaker input-output model) may be updated using the current parameter values. The update may be performing according to any of various known filtering schemes or combinations thereof.

Figure 6B:
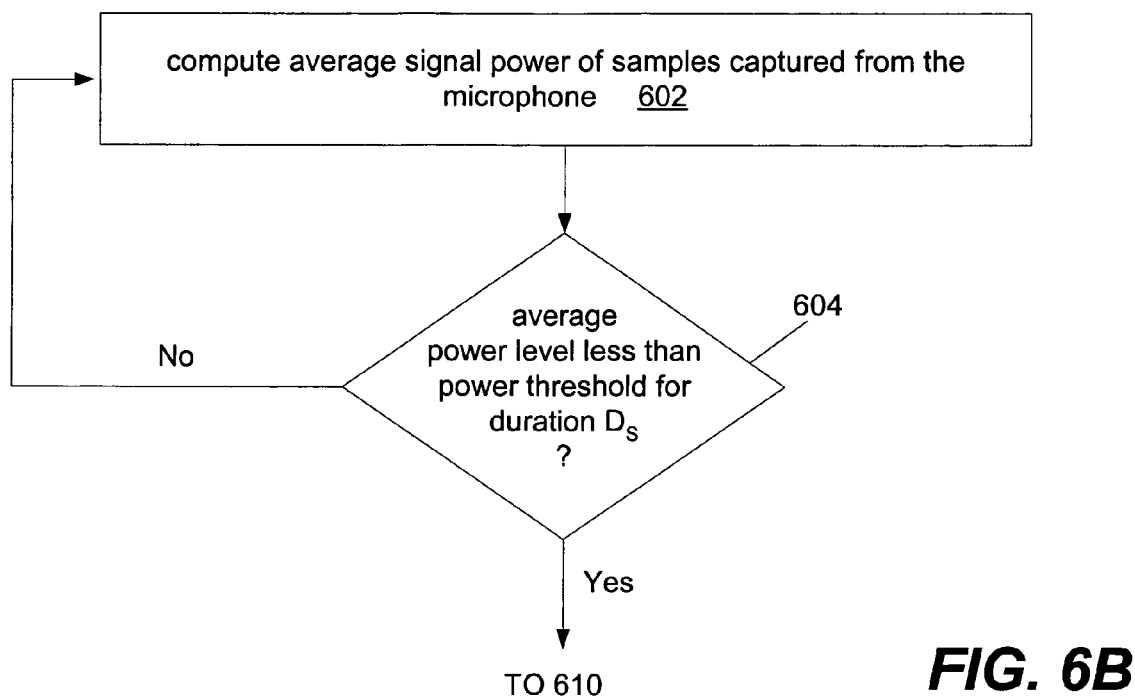
FIG. 6B illustrates one embodiment for monitoring average signal power from a microphone in order to control when a calibration experiment is to be performed.

The method may also include monitoring average signal power from the microphone, e.g., as illustrated in FIG. 6B. At 602, the average signal power of samples captured from the microphone may be computed. At 604, a test may be performed to determine if the average signal power has remained less than a power threshold for a predetermined amount of time $D_S$. The action 610, i.e., outputting the stimulus signal, may be performed in response to a determination that the average signal power from the microphone has remained less than the power threshold for the predetermined amount of time. Thus, the calibration experiment may be performed when the environment is sufficiently silent.

The parameter averages of the speaker input-output model are usable to perform echo cancellation, e.g., on inputs signals captured during a conversation. In one embodiment, the method also includes: receiving additional input signals from the microphone and performing echo cancellation on the additional input signals using the parameter averages.

The input-output model of the speaker may be a nonlinear model, e.g., a Volterra series model. Other types of nonlinear models may be used as well.

In some embodiments, the method may also include applying one or more notch filters to the stimulus signal, prior to transmission from the speaker, in order to remove one or more frequencies from the stimulus signal. The one or more frequencies may be frequencies that are known to induce resonance in one or more physical structures. For example, in embodiments where the method is implemented by a speakerphone, the one or more frequencies may include frequencies known to causes resonance of structures in the speakerphone and/or of structures in the environment of the speakerphone.

In one embodiment, the method may also include: performing an iterative search for a current transfer function of the microphone using the input signal spectrum, the spectrum of the stimulus signal, and the current parameter values; and updating an average microphone transfer function using the current transfer function. The average microphone transfer function may also be usable to perform echo cancellation.

In one embodiment, the actions 610 through 620 may be performed by one or more processors in a device such as a speakerphone, a video conferencing system, a speaker testing device, etc.

In some embodiments, a method for calibrating a system (including at least a speaker) may involve performing actions 612 through 620, under the assumption that some other mechanism arranges for the performance of action 610, i.e., outputting the stimulus signal.

Any of the various method embodiments disclosed herein (or any combinations thereof or portions thereof) may be implemented in terms of program instructions. The program instructions may be stored in (or on) any of various memory media. A memory medium is a medium configured for the storage of information. Examples of memory media include various kinds of magnetic media (e.g., magnetic tape or magnetic disk); various kinds of optical media (e.g., CD-ROM); various kinds of semiconductor RAM and ROM; various media based on the storage of electrical charge or other physical quantities; etc.

Furthermore, various embodiments of a system including a memory and a processor (or a set of processors) are contemplated, where the memory is configured to store program instructions and the processor is configured to read and execute the program instructions from the memory. In one embodiment, the program instructions are executable to implement:

(a) receiving an input signal from a microphone, wherein the input signal corresponds to a transmission of a stimulus signal from a speaker;
(b) computing a midrange sensitivity and a lowpass sensitivity for a transfer function $H(\omega)$ derived from a spectrum of the input signal and a spectrum of the stimulus signal;
(c) subtracting the midrange sensitivity from the lowpass sensitivity to obtain a speaker-related sensitivity;
(d) performing an iterative search for current values of parameters of an input-output model of the speaker using the input signal spectrum, the stimulus signal spectrum, the speaker-related sensitivity; and
(e) updating averages of the parameters of the speaker input-output model using the current parameter values.

The system may also include the speaker and the microphone. For example, embodiments of the system targeted for realization as a speakerphone may include the speaker and the microphone. In some embodiments, the system may be a speakerphone as described above in conjunction with FIG. 1B or FIG. 8. Thus, the program instructions may be stored in memory 209 and the processor 207 may perform actions (a) through (e).

The parameter averages of the speaker input-output model are usable to perform echo cancellation on other input signals, e.g., input signals captured from the microphone during a live conversation. In one embodiment, the program instructions are further executable to implement: receiving additional input signals, and performing echo cancellation on the additional input signals using the parameter averages.

The input-output model of the speaker may be a nonlinear model, e.g., a Volterra series model.

Updating Modeling Information Based on Online Data Gathering

In one set of embodiments, the processor 207 may be programmed to update the modeling information $I_M$ during periods of time when the speakerphone 200 is being used to conduct a conversation.

Suppose speakerphone 200 is being used to conduct a conversation between one or more persons situated near the speakerphone 200 and one or more other persons situated near a remote speakerphone (or videoconferencing system). In this case, the processor 207 sends out the remote audio signal R(k), provided by the remote speakerphone, as the digital output signal Y(k). It would probably be offensive to the local persons if the processor 207 interrupted the conversation to inject a noise transmission into the digital output stream Y(k) for the sake of self calibration. Thus, the processor 207 may perform its self calibration based on samples of the output signal Y(k) while it is "live", i.e., carrying the audio information provided by the remote speakerphone. The self-calibration may be performed as follows.

The processor 207 may start storing samples of the output signal Y(k) into an first FIFO and storing samples of the input signal X(k) into a second FIFO, e.g., FIFOs allocated in memory 209. Furthermore, the processor may scan the samples of the output signal Y(k) to determine when the average power of the output signal Y(k) exceeds (or at least reaches) a certain power threshold. The processor 207 may terminate the storage of the output samples Y(k) into the first FIFO in response to this power condition being satisfied. However, the processor may delay the termination of storage of the input samples X(k) into the second FIFO to allow sufficient time for the capture of a full reverb tail corresponding to the output signal Y(k) for a maximum expected room size.

The processor 207 may then operate, as described above, on a block $B_Y$ of output samples stored in the first FIFO and a block $B_X$ of input samples stored in the second FIFO to compute:

(1) current estimates for Volterra coefficients $a_i$ and $b_{ij}$;
(2) a current estimate $T_{mic}$ for the microphone transfer function;

(3) updates for the average Volterra coefficients $A_i$ and $B_{ij}$; and (4) updates for the average microphone transfer function $H_{mic}$.

Because the block $B_X$ of received input samples is captured while the speakerphone 200 is being used to conduct a live conversation, the block $B_X$ is very likely to contain interference (from the point of view of the self calibration) due to the voices of persons in the environment of the microphone 201. Thus, in updating the average values with the respective current estimates, the processor may strongly weight the past history contribution, i.e., more strongly than in those situations described above where the self-calibration is performed during periods of silence in the external environment.

In some embodiments, a system (e.g., a speakerphone or a videoconferencing system) may include a microphone, a speaker, memory and a processor, e.g., as illustrated in FIG. 1B. The memory may be configured to store program instructions and data. The processor is configured to read and execute the program instructions from the memory. The program instructions are executable by the processor to:

(a) provide an output signal for transmission from the speaker, where the output signal carries live signal information from a remote source;

(b) receive an input signal from the microphone, corresponding to the output signal and its reverb tail;

(c) compute a midrange sensitivity and a lowpass sensitivity for a transfer function derived from a spectrum of the input signal and a spectrum of the output signal;

(d) subtract the midrange sensitivity from the lowpass sensitivity to obtain a speaker-related sensitivity;

(e) perform an iterative search for current values of parameters of an input-output model for the speaker using the input signal spectrum, the output signal spectrum, the speaker-related sensitivity; and (f) update averages of the parameters of the speaker input-output model using the current values obtained in (e).

The parameter averages of the speaker input-output model are usable to perform echo cancellation on other input signals (i.e., other blocks of samples of the digital input signal X(k)).

The input-output model of the speaker is a nonlinear model, e.g., a Volterra series model.

Furthermore, in some embodiments, the program instructions may be executable by the processor to further implement:

performing an iterative search for a current transfer function of the microphone using the input signal spectrum, the output signal spectrum, and the current values; and updating an average microphone transfer function using the current transfer function.

The current transfer function is usable to perform said echo cancellation on said other input signals.

Figure 6C:
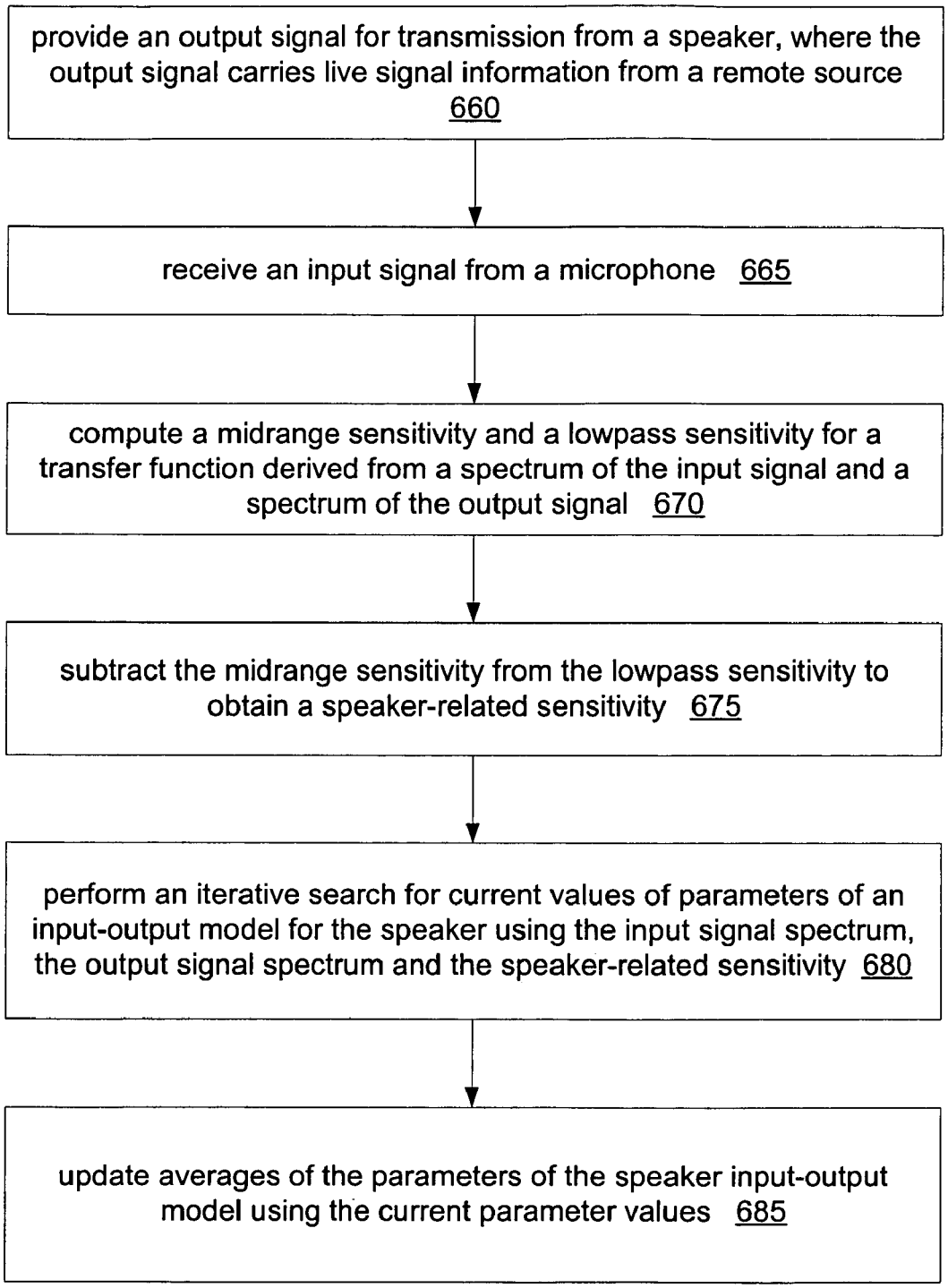
FIG. 6C illustrates one set of embodiments of a method for performing "live" self calibration.

In one set of embodiments, as illustrated in FIG. 6C, a method for performing self calibration may involve:

(a) providing an output signal for transmission from a speaker, where the output signal carries live signal information from a remote source (as indicated at step 660);

(b) receiving an input signal from a microphone, corresponding to the output signal and its reverb tail (as indicated at step 665);

(c) computing a midrange sensitivity and a lowpass sensitivity for a transfer function H(ω), where the transfer function H(ω) is derived from a spectrum of the input signal and a spectrum of the output signal (as indicated at step 670);

(d) subtracting the midrange sensitivity from the lowpass sensitivity to obtain a speaker-related sensitivity (as indicated at step 675);

(e) performing an iterative search for current values of parameters of an input-output model for the speaker using the input signal spectrum, the output signal spectrum and the speaker-related sensitivity (as indicated at step 680); and (f) updating averages of the parameters of the speaker input-output model using the current parameter values (as indicated at step 685).

The parameter averages of the speaker input-output model are usable to perform echo cancellation on other input signals. Furthermore, the method may involve:

performing an iterative search for a current transfer function of the microphone using the input signal spectrum, the spectrum of the output signal, and the current values; and updating an average microphone transfer function using the current transfer function.

The current transfer function is also usable to perform said echo cancellation on said other input signals.

Plurality of Microphones

In some embodiments, the speakerphone 200 may include $N_M$ input channels, where $N_M$ is two or greater. Each input channel $IC_j$, j=1, 2, 3, . . . , $N_M$ may include a microphone $M_j$, a preamplifier $PA_j$, and an A/D converter $ADC_j$. The description given herein of various embodiments in the context of one input channel naturally generalizes to $N_M$ input channels.

Microphone $M_j$ generates analog electrical signal $u_j(t)$. Preamplifier $PA_j$ amplifies the analog electrical signal $u_j(t)$ in order to generate amplified signal $x_j(t)$. A/D converter $ADC_j$ samples the amplified signal $x_j(t)$ in order to generate digital signal $X_j(k)$.

Figure 7:
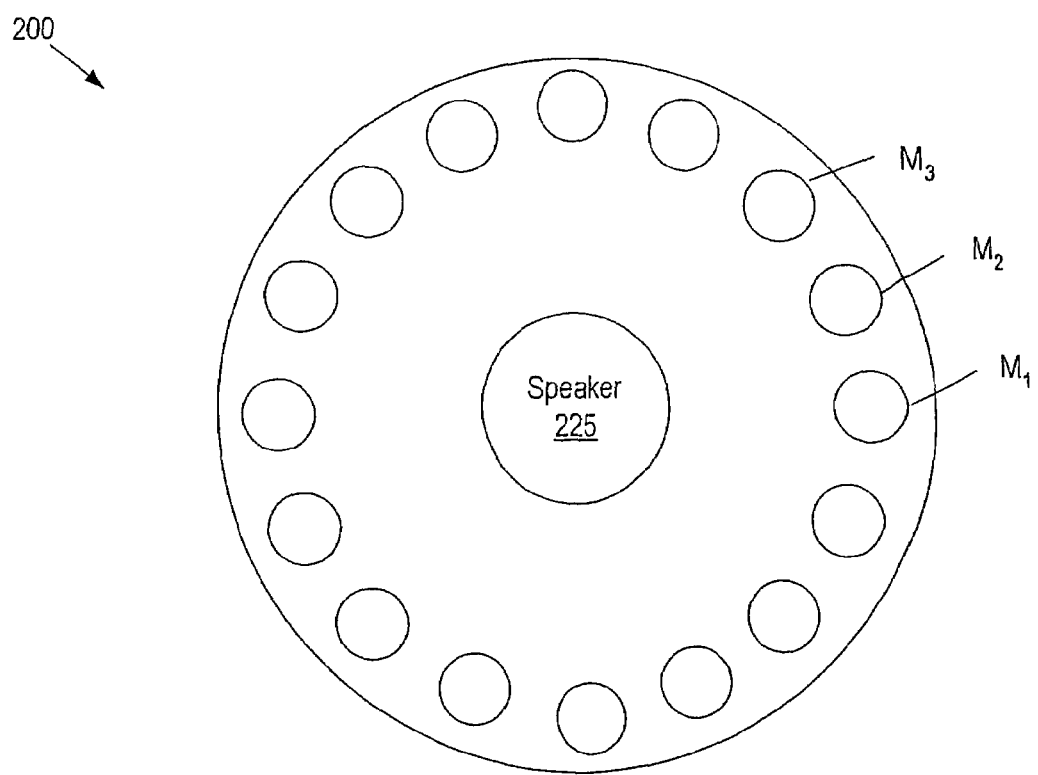
FIG. 7 illustrates one embodiment of speakerphone having a circular array of microphones.

In one group of embodiments, the $N_M$ microphones may be arranged in a circular array with the speaker 225 situated at the center of the circle as suggested by the physical realization (viewed from above) illustrated in FIG. 7. Thus, the delay time $\tau_0$ of the direct path transmission between the speaker and microphone $M_j$ is approximately the same for all microphones. In one embodiment of this group, the microphones may all be omni-directional microphones having approximately the same microphone transfer function.

Processor 207 may receive the digital input signals $X_j(k)$, j=1, 2, . . . , $N_M$, and perform acoustic echo cancellation on each channel independently based on calibration information derived from each channel separately.

In one embodiment, $N_M$ equals 16. However, a wide variety of other values are contemplated for $N_M$.

Direct Path Signal Cancellation Before AEC

Figure 8:
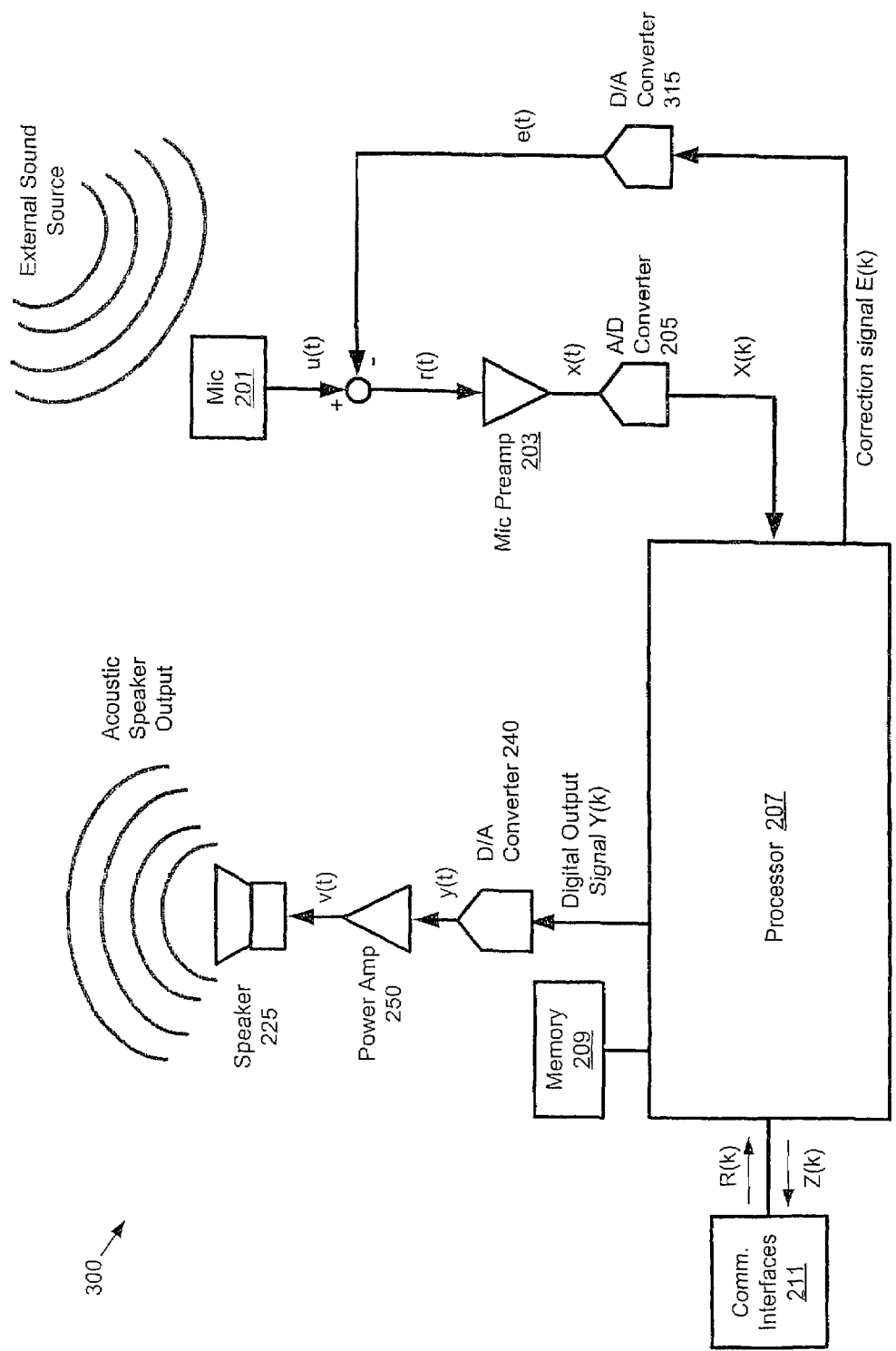
FIG. 8 illustrates one set of embodiments of a speakerphone 300 configured to cancel a direct path signal from to input preamplification.

In some embodiments, a speakerphone 300 may be configured as illustrated in FIG. 8. The reader will observe that speakerphone 300 is similar in many respects to speakerphone 200 (illustrated in FIG. 1B). However, in addition to the components illustrated in FIG. 1B as part of speakerphone 200, speakerphone 300 includes a subtraction circuit 310 and a D/A converter 315. The subtraction circuit 310 is coupled to receive:

the electrical signal u(t) generated by the microphone 201, and the analog signal e(t) generated by the D/A converter 315.

The subtraction circuit 310 generates a difference signal r(t)= u(t)−e(t). The difference signal r(t) is provided to preamplifier circuit 203. Note that digital-to-analog (D/A) converter 315 generates the signal e(t) from digital signal E(k) and that the digital signal E(k) is provided by processor 207.

The preamplifier circuit 203 amplifies the difference signal r(t) to generate an amplified signal x(t). The gain of the preamplifier circuit is adjustable within a specified dynamic range. Analog-to-digital converter 205 converts the amplified signal x(t) into a digital input signal X(k). The digital input signal X(k) is provided to processor 207.

The processor 207 receives a remote audio signal R(k) from another speakerphone (e.g., via one or more of the communication interfaces 211) and mixes the remote audio signal R(k) with any locally generated signals (e.g., beeps or tones) to generate a digital output signal Y(k).

The digital-to-analog converter 240 receives the digital output signal Y(k) and converts this signal into an analog electrical signal y(t). The power amplifier 250 amplifies the analog electrical signal y(t) to generate an amplified signal v(t). The amplified signal v(t) is used to drive a speaker 225. The speaker 225 converts the amplified signal v(t) into an acoustic signal. The acoustic signal generated by the speaker radiates into the ambient space, and thus, local participants are able to hear a replica of the acoustic signals generated by remote participants (situated near a remote speakerphone).

Figure 8B:
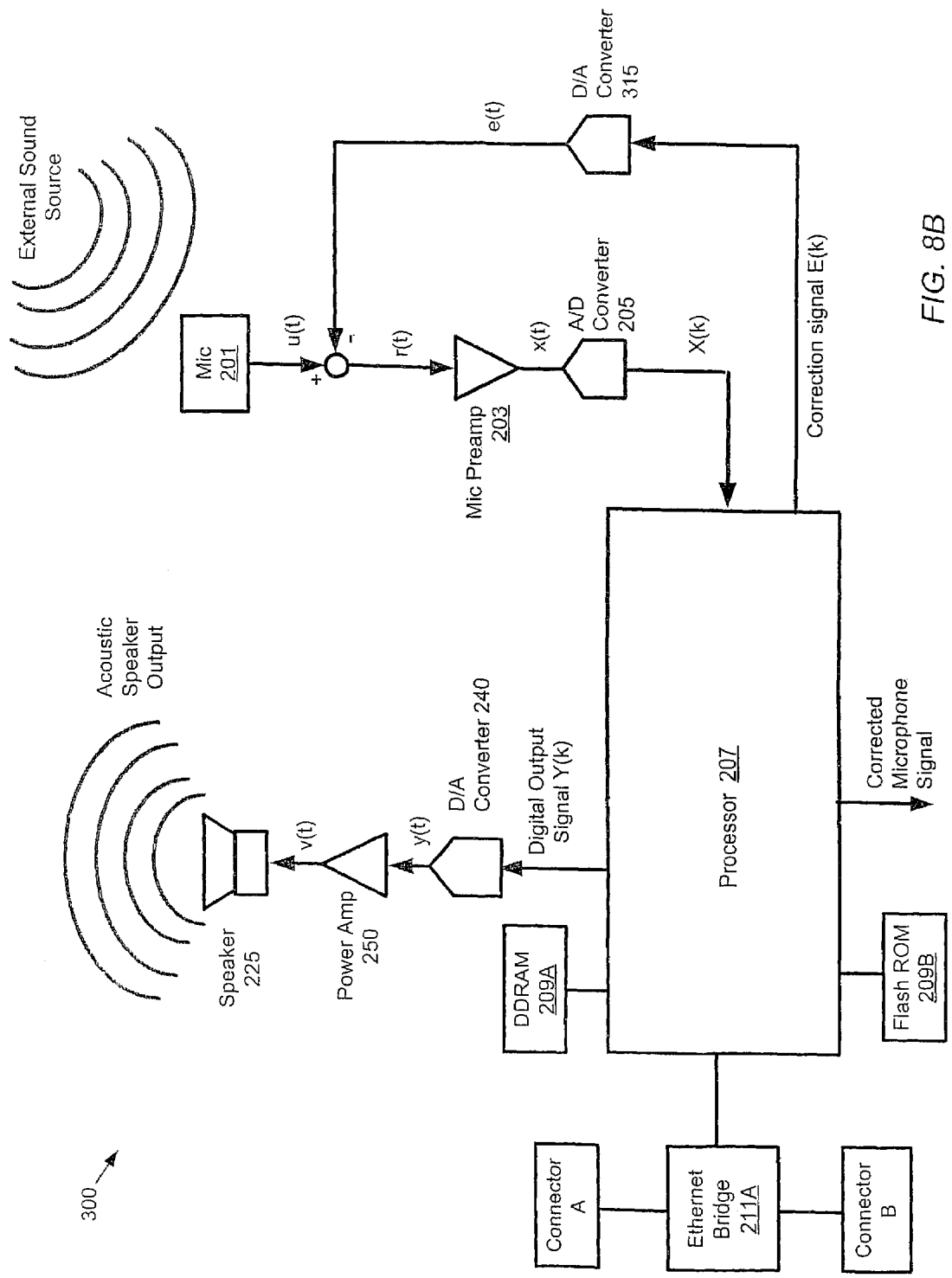
FIG. 8B illustrates one embodiments of the speakerphone 300 having an Ethernet bridge.

FIG. 8B illustrates one embodiment of the speakerphone 300 which includes (among other things) an Ethernet bridge 211A, DDRAM 209A and Flash ROM 209B. The Ethernet bridge may couple to two connectors A and B.

In general, the microphone signal u(t) is a superposition of contributions due to:
- acoustic signals (e.g., voice signals) generated by one or more persons (e.g., conference participants) in the environment of the speakerphone 300, and reflections of these acoustic signals off of acoustically reflective surfaces in the environment;
- acoustic signals generated by one or more noise sources (such as fans and motors, automobile traffic and fluorescent light fixtures) and reflections of these acoustic signals off of acoustically reflective surfaces in the environment; and
- the acoustic signal generated by the speaker 225 and the reflections of this acoustic signal off of acoustically reflective surfaces in the environment.

Let $u_{dp}(t)$ denote the contribution to u(t) that corresponds to the direct path transmission between speaker 225 and the microphone 201. (See FIG. 2.)

Processor 207 may be configured to execute software including a direct path signal estimator 210 (hereinafter referred to as the DPS estimator) and an acoustic echo cancellation (AEC) module 220, e.g., as suggested in FIG. 9. The DPS estimator and AEC module may be stored in memory 209.

The DPS estimator 210 may attempt to generate the digital signal E(k) so that the corresponding analog signal e(t) is a good approximation to the direct path contribution $u_{dp}(t)$. In some embodiments, the DPS estimator may employ a method for generating digital signal E(k) that guarantees (or approximates) the condition:

$$\text{Energy}[e(t) - u_{dp}(t)] / \text{Energy}[u_{dp}(t)] < \text{epsilon},$$

where epsilon is a small positive fraction. The notation Energy[f(t)] represents the energy of the signal f(t) considered over a finite interval in time.

Because e(t) captures a substantial portion of the energy in the direct path contribution $u_{dp}(t)$, the subtraction r(t)=u(t)−e(t) implies that only a small portion of the direct path contribution $u_{dp}(t)$ remains in r(t). The direct path contribution $u_{dp}(t)$ is typically the most dominant contribution to the microphone signal u(t). Thus, the subtraction of e(t) from the microphone signal u(t) prior to the preamplifier 203 implies that the average power in difference signal r(t) is substantially less than the average power in u(t). Therefore, the gain of the preamplifier may be substantially increased to more effectively utilize the dynamic range of the A/D converter 205 when the DPS estimator 210 is turned on. (When the DPS estimator is off, e(t)=0 and r(t)=u(t).)

Note that the digital input signal X(k) is obtained from r(t) by scaling and sampling. Thus, it is apparent that the digital input signal X(k) would have a direct path contribution $X_{dp}(k)$, linearly related to $u_{dp}(t)$, if the DPS estimator 210 were turned off, i.e., if r(t)=u(t). However, only a small portion of the direct path contribution $X_{dp}(k)$ remains in X(k) when the DPS estimator 210 is on, i.e., if r(t)=u(t)−e(t). Any remaining portion of the direct path contribution $X_{dp}(k)$ in digital input signal X(k) may fall below the threshold for consideration by the AEC module 220. (In one embodiment, the AEC module 220 may employ a threshold for deciding which peaks in the power spectrum of X(k) are sufficiently large to warrant analysis.) Thus, the AEC module 220 will concentrate its computational effort on estimating and canceling the reflected path contributions.

Because the AEC module 220 doesn't have to deal with the direct path contribution, the AEC module is able to analyze a larger number of the reflected path contributions than if it did have to deal with the direct path contribution. Furthermore, because the AEC module doesn't have to deal with the direct path contribution, the AEC module is able to set its dynamic range adjustment parameters in a manner that gives more accurate results in its analysis of the reflected path contributions than if the direct path signal estimator 210 were turned off. (If the direct path estimator 210 were turned off, the direct path contribution $X_{dp}(k)$ to the digital input X(k) would greatly dominate the contributions due to the reflected paths.)

From the point-of-view of the AEC module 220, the path with minimum propagation time (between speaker and microphone) is the first reflected path, i.e., the reflected path having the smallest path length, because the direct path is substantially eliminated from the digital input X(k). The propagation time $\tau_1$ of the first reflected path is larger than the propagation time $\tau_0$ of the direct path. Thus, the AEC module 220 may operate on larger blocks of the samples X(k) than if the DPS estimator 210 were turned off. The larger blocks of samples implies greater frequency resolution in the transform domain. Greater frequency resolution implies a high-quality of cancellation of the reflected paths.

In various embodiments, the DPS estimator 210 receives signal Y(k) and operates on the signal Y(k) using at least a subset of the modeling information $I_M$ to generate the signal E(k). In one embodiment, the DPS estimator 210 may operate on the signal Y(k) using:
- the gain of the D/A converter 240;
- the gain of the power amplifier 250;
- the input-output model for the speaker 225;
- the transfer function $H_{dp}$ for the direct path transmission between the output of speaker 225 and the input of microphone 201;
- the transfer function of the microphone 201;
- the gain of the preamplifier 203; and
- the gain of the A/D converter 205.

The DPS estimator 210 also receives the digital input X(k). Using blocks of the samples X(k) and corresponding blocks of the samples Y(k), the DPS estimator 210 may periodically update the transfer function $H_{dp}$. For example, in some embodiments, the DPS estimator 210 may generate a new estimate of the transfer function $H_{dp}$ for each received block of digital input X(k). The transfer function $H_{dp}$ may be characterized by an attenuation coefficient and a time delay for the direct path transmission.

The AEC module 220 receives the digital input X(k) and the digital output Y(k), generates an error signal C(k), and subtracts the error signal C(k) from the digital input X(k) to obtain a corrected signal Z(k). The corrected signal Z(k) may be transmitted to a remote speakerphone through the communication mechanism CM. When the direct path signal estimator 210 is turned on, error signal C(k) generated by the AEC module is an estimate of the portion of X(k) that is due to a number $N_{on}$ of the most dominant reflected path transmissions between the speaker and the microphone. When the direct path signal estimator 210 is turned off, the error signal C(k) generated by the AEC module is an estimate of the portion of X(k) that is due to the direct path and a number $N_{off}$ of the most dominant reflected path transmissions between the speaker and the microphone. As alluded to above, when the DPS estimator 210 is on, the direct path contribution is substantially eliminated from the signal X(k) arriving at the AEC module 220 (by virtue of the subtraction occurring at subtraction circuit 310). Thus, the AEC module 220 does not have to deal with the direct path contribution and is able to devote more of its computational resources to analyzing the reflected path contributions. Thus, $N_{on}$ is generally larger than $N_{off}$.

The AEC module 220 may operate on the digital signal Y(k) using at least a subset of the modeling information $I_M$ in order to generate the error signal C(k). In one embodiment, the AEC module 220 may operate on the digital signal Y(k) using:

the gain of the D/A converter 240;
the gain of the power amplifier 250;
the apparent transfer function $H_{app}$ between the output of speaker 225 and the input of microphone 201;
the transfer function of the microphone 201;
the gain of the preamplifier 203;
the gain of the A/D converter 205.

Note that the apparent transfer function $H_{app}$ models only reflect paths between the speaker and microphone when the direct path signal estimator 210 is turned on.

Figure 9B:
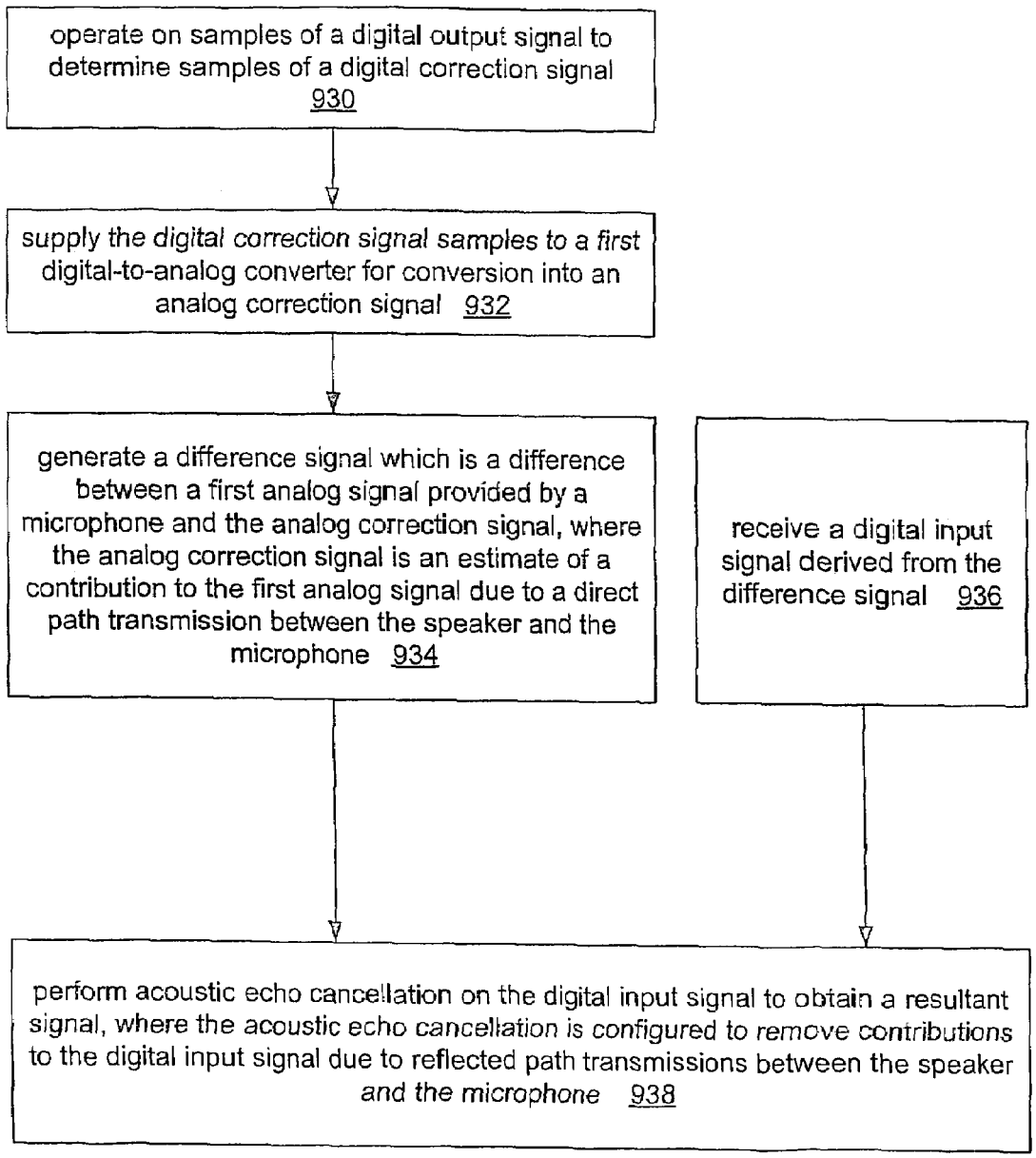
FIG. 9B illustrates one embodiment of a method for canceling speaker signal energy from a received microphone signal.

In some embodiments, a method for canceling speaker signal energy from a received microphone signal may be enacted as illustrated in FIG. 9B.

At 930, samples of a digital output signal may be operated on to determine samples of a digital correction signal. The output signal samples are samples that are (or have been) directed to an output channel for transmission from a speaker.

At 932, the digital correction signal samples may be supplied to a first digital-to-analog converter for conversion into an analog correction signal.

At 934, a difference signal which is a difference between a first analog signal provided by a microphone and the analog correction signal may be generated (e.g., by an analog subtraction circuit), where the analog correction signal is an estimate of a contribution to the first analog signal due to a direct path transmission between the speaker and the microphone.

At 936, a digital input signal derived from the difference signal may be received from an input channel.

At 938, acoustic echo cancellation may be performed on the digital input signal to obtain a resultant signal. The acoustic echo cancellation may be configured to remove contributions to the digital input signal due to reflected path transmissions between the speaker and the microphone.

Such a method may be especially useful for speakerphones and videoconferencing system where a speaker and a microphone may be located close to each other, e.g., on the housing of the speakerphone (or videoconferencing system).

Figure 10:
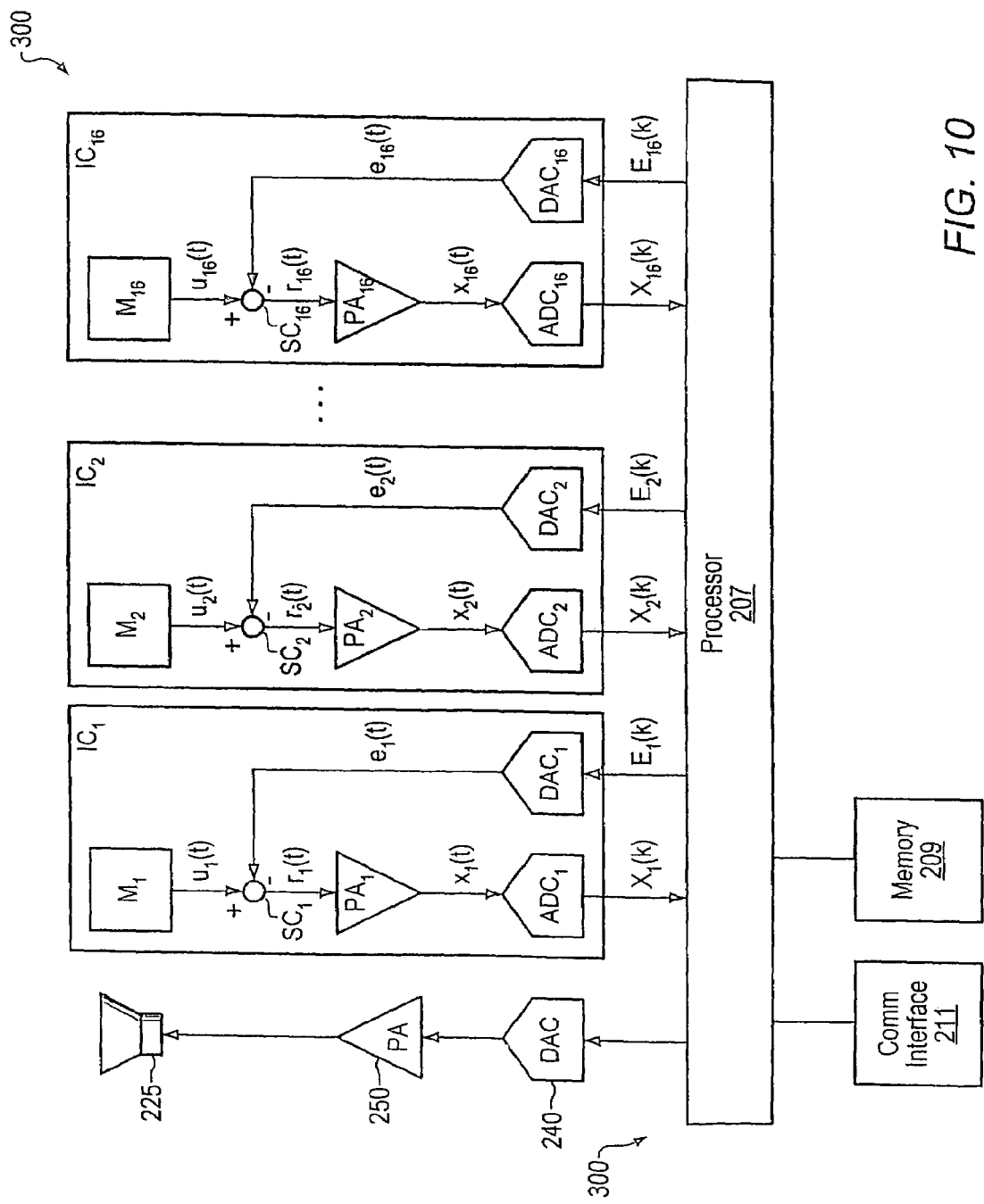
FIG. 10 illustrates one embodiment of speakerphone 300 configured to perform a separate direct path cancellation on each microphone input channel.

In one set of embodiments, the speakerphone 300 may include a set of $N_M$ input channels. Each input channel $IC_j$, j=1, 2, 3, ..., $N_M$, may include a microphone $M_j$, a subtraction circuit $SC_j$, a preamplifier $PA_j$, an A/D converter $ADC_j$, and a D/A converter $DAC_j$. The integer $N_M$ is greater than or equal to two. The description given above of canceling the direct path contribution prior to the preamplifier 203 for one microphone channel naturally extends to $N_M$ microphone channels. FIG. 10 illustrates speakerphone 300 in the case $N_M$=16.

Let $u_j(t)$ denote the analog electrical signal captured by microphone $M_j$. Subtraction circuit $SC_j$ receives electrical signal $u_j(t)$ and a corresponding correction signal $e_j(t)$ and generates a difference signal $r_j(t)=u_j(t)-e_j(t)$. Preamplifier $PA_j$ amplifies the difference signal $r_j(t)$ to obtain an amplified signal $x_j(t)$. A/D converter $ADC_j$ samples the amplified signal $x_j(t)$ in order to obtain a digital signal $X_j(k)$. The digital signals $X_j(k)$, j=1, 2, ..., $N_M$, are provided to processor 207.

Processor 207 generates the digital correction signals $E_j(k)$, j=1, 2, ..., $N_M$. D/A converter $DAC_j$ converts the digital correction signal $E_j(k)$ into the analog correction signal $e_j(t)$ which is supplied to the subtraction circuit $SC_j$. Thus, the processor 207 may generate an independent correction signal $E_j(k)$ for each input channel $IC_j$ as described in the embodiments above.

Figure 10B:
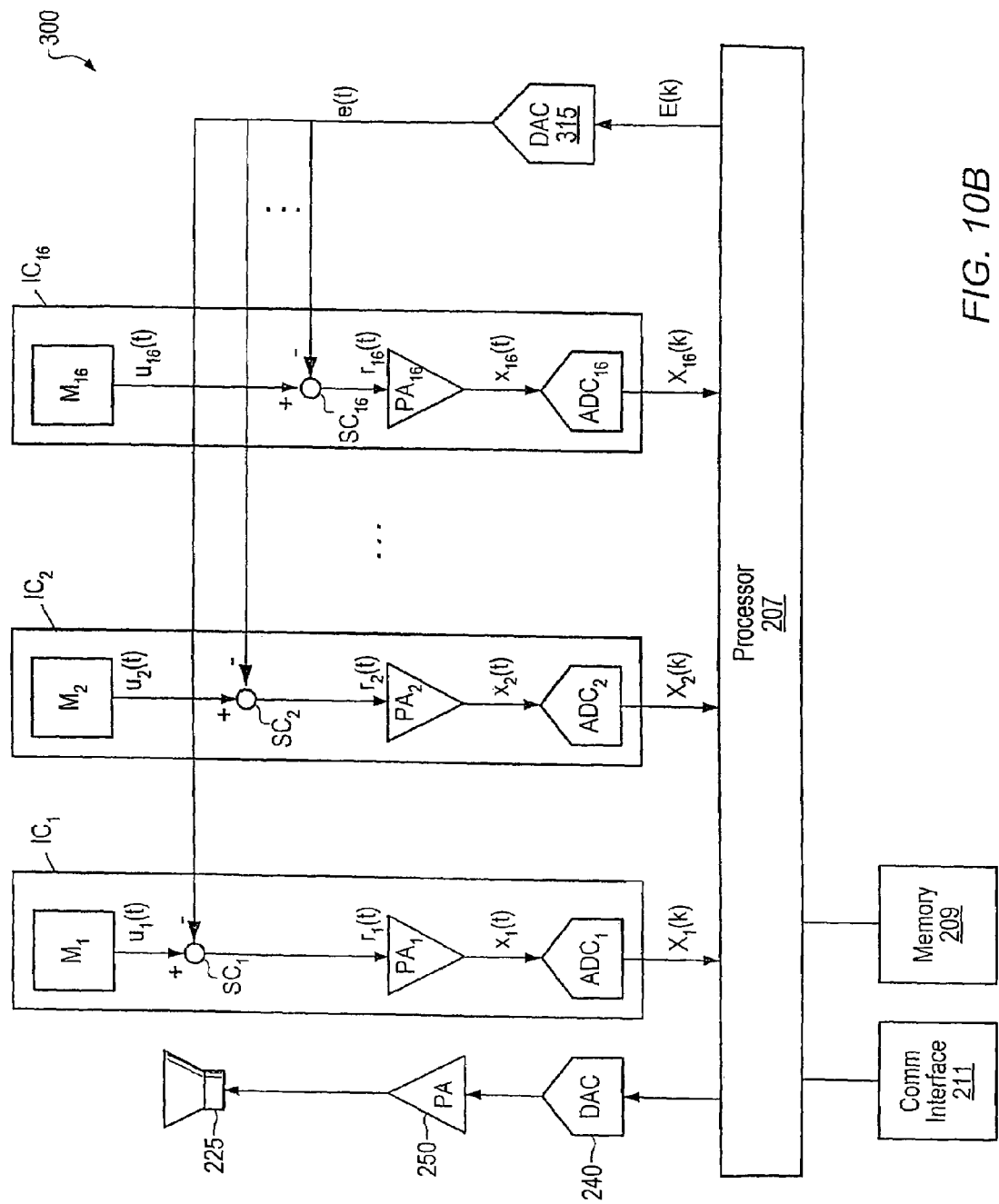
FIG. 10B illustrates one embodiment of speakerphone 300 configured to generate a single cancellation signal which is applied to all microphone input channels.

In one group of embodiments, the $N_M$ microphones may be arranged in a circular array with the speaker 225 situated at the center of the circle, e.g., as suggested in FIG. 7. Thus, the delay time $\tau_0$ of the direct path transmission between the speaker and each microphone is approximately the same for all microphones. Furthermore, the attenuation coefficient of the direct path transmission between the speaker and each microphone may be approximately the same for all microphones (since they all have approximately the same distance from the center). The microphones may be configured to satisfy the condition of having approximately equal microphone transfer functions. This condition may be easier to satisfy if the microphones are omnidirectional microphones. In some embodiments, the processor 207 may apply the same correction signal e(t) to each input channel, i.e., $r_j(t)=u_j(t)-e(t)$ for j=1, 2, 3, ..., $N_M$. (FIG. 10B illustrates the case NM=16.) In these embodiments, the speakerphone 300 may have a D/A converter 315 which is shared among all input channels instead of $N_M$ digital-to-analog converters as described above. Thus, the processor 207 may generate a single digital correction signal E(k) and supply the single correction signal E(k) to the D/A converter 315. The D/A converter 315 converts the correction signal E(k) into the analog correction signal e(t) which is fed to all the subtractions units $SC_j$, j=1, 2, ..., $N_M$.

In one embodiment, $N_M$ equals 16. However, a wide variety of other values are contemplated for $N_M$.

In some embodiments, other microphone array configurations may be used (e.g., square, rectangular, elliptical, etc.).

In one set of embodiments, speakerphone 300 may be configured to generate a correction signal E(k) from the digital output signal Y(k) by:

(a) multiplying the digital output signal Y(k) by the gain of the D/A converter 240 and the gain of the power amplifier 250 to obtain a digital representation v(k) of the speaker input signal;

(b) applying a nonlinear speaker model to the digital representation v(k) to obtain a digital representation $R_{SP}(k)$ of the acoustic signal radiated by the speaker 225;

(c) applying the transfer function $H_{dp}$ (of the direct path transmission from the speaker 225 to the microphone 201) to the digital representation $R_{SP}(k)$ to obtain a digital representation $A_{MIC}(k)$ of the acoustic signal received by the microphone;

(d) applying the microphone transfer function to the digital representation $A_{MIC}(k)$ in order to obtain a digital representation u(k) of the microphone output signal;

(e) multiplying the digital representation u(k) by the reciprocal of the gain of the D/A converter 315.

Applying the transfer function $H_{dp}$ to the digital representation $R_{SP}(k)$ may involve:

delaying the digital representation $R_{SP}(k)$ by the time delay $\tau_0$ of the direct path transmission, and scaling by the attenuation coefficient of the direct path transmission.

The parameters of the nonlinear speaker model and the microphone transfer function may change over time. Thus, the processor 207 may repeatedly update the model parameters and the microphone transfer function in order to track the changes over time. Various embodiments for updating the speaker model parameters and the microphone transfer function are described above.

Similarly, the speaker 225 and/or the microphone 201 may move, and thus, the transfer function $H_{dp}$ may change over time. Thus, the processor 207 may repeatedly update the transfer function $H_{dp}$ as needed (e.g., periodically or intermittently). The time delay $\tau_0$ of the direct path transmission may be estimated based on a cross correlation between the output signal Y(k) and the input signal X(k). In one embodiment, the attenuation coefficient of the direct path transmission may be estimated based on a calibration experiment performed during a period of time when the speakerphone is not being used for communication and when the environment is relatively silent.

In one set of embodiments, the analog correction signal e(t) may be subtracted from raw signal u(t) coming from the microphone prior to the preamplifier 203. In another set of embodiments, the analog correction signal may be subtracted after the preamplifier and prior to the A/D converter 205. In one alternative embodiment, the digital correction signal E(k) may be subtracted (in the digital domain) after the A/D converter 205 (and never converted into an analog signal).

In yet another set of embodiments, the analog correction signal e(t) may be converted into an acoustic correction signal using a small acoustic transducer (e.g., speaker) situated close to the microphone 201. This acoustic cancellation methodology has the advantage of protecting the microphone itself from clipping due to high volume sounds from the speaker 225.

In some embodiments, the speakerphone 300 may have one or more microphones and one or more speakers arranged in a fixed configuration, e.g., mounted into the speakerphone housing. In other embodiments, the one or more microphones and one or more microphones may be movable, e.g., connected to the base unit by flexible wires and/or wireless connections. In yet other embodiments, some subset of the speakers and/or microphones may be fixed and another subset may be movable. The method embodiments described herein for canceling the direct path contribution to a microphone signal prior to preamplification (or prior to A/D conversion) may be applied to each microphone channel regardless of whether the corresponding microphone is fixed or movable.

Cancellation of the direct path contribution from the raw microphone signal u(t) may:

allow the usable dynamic range of the signal x(t) is be increased by increasing the gain of the preamplifier 203;

reduce the closed loop gain of speaker-to-mic system;

improve echo canceller effectiveness by eliminating strong peaks in the speaker-to-mic transfer function;

allow the speaker 225 to be driven at a louder volume and the sensitivity of the microphone 201 to be increased without clipping at the A/D converter 205, therefore allowing the speakerphone 300 to function in larger rooms with larger effective range because speaker 225 is louder and microphone 201 is more sensitive;

allow use of omnidirectional microphones instead of directional microphones (such as cardioid or hypercardioid microphones).

Omnidirectional microphones are less expensive, more reliable and less sensitive to vibration than directional microphones. Use of directional microphones is complicated by the directional dependence of their frequency response. Omnidirectional microphones do not have this complication. Omnidirectional microphones do not experience the proximity effect (this helps with dynamic range). Omnidirectional microphones are smaller for the same sensitivity as directional microphones, therefore allowing a smaller housing than if directional microphones were used.

In one set of embodiments, the correction signal E(k) may be determined as follows. The processor 207 may measure the transfer function $H_{dp}$ of the direct path transmission between the speaker 225 and the microphone 201, e.g., by asserting a noise burst as the output signal Y(k) (for transmission from the speaker 225) and capturing the resulting signal X(k) from the A/D converter 205. If this measurement is being performed in an environment having nontrivial echoes, the processor 207 may reduce the duration of noise burst until the tail edge of the noise burst arrives at the microphone 201 prior to the leading edge of the first room reflection. The processor 207 may assert the same noise burst repeatedly in order to average out the effects of other random acoustic sources in the room and the effects of circuit noise in the input channel (e.g., in the summation circuit 310, the preamplifier 203 and the A/D converter 205).

The processor 207 may determine the minimum time interval between successive noise bursts based on the time it takes for the room reverberation due to a single noise burst to die down to an acceptably low level.

The processor 207 may perform a cross correlation between the noise stimulus Y(k) with measured response X(k) to determine the time delay $\tau_0$ between stimulus and response. In particular, the time delay $\tau_0$ may be determined by the delay value which maximizes the cross correlation function.

Figure 11:
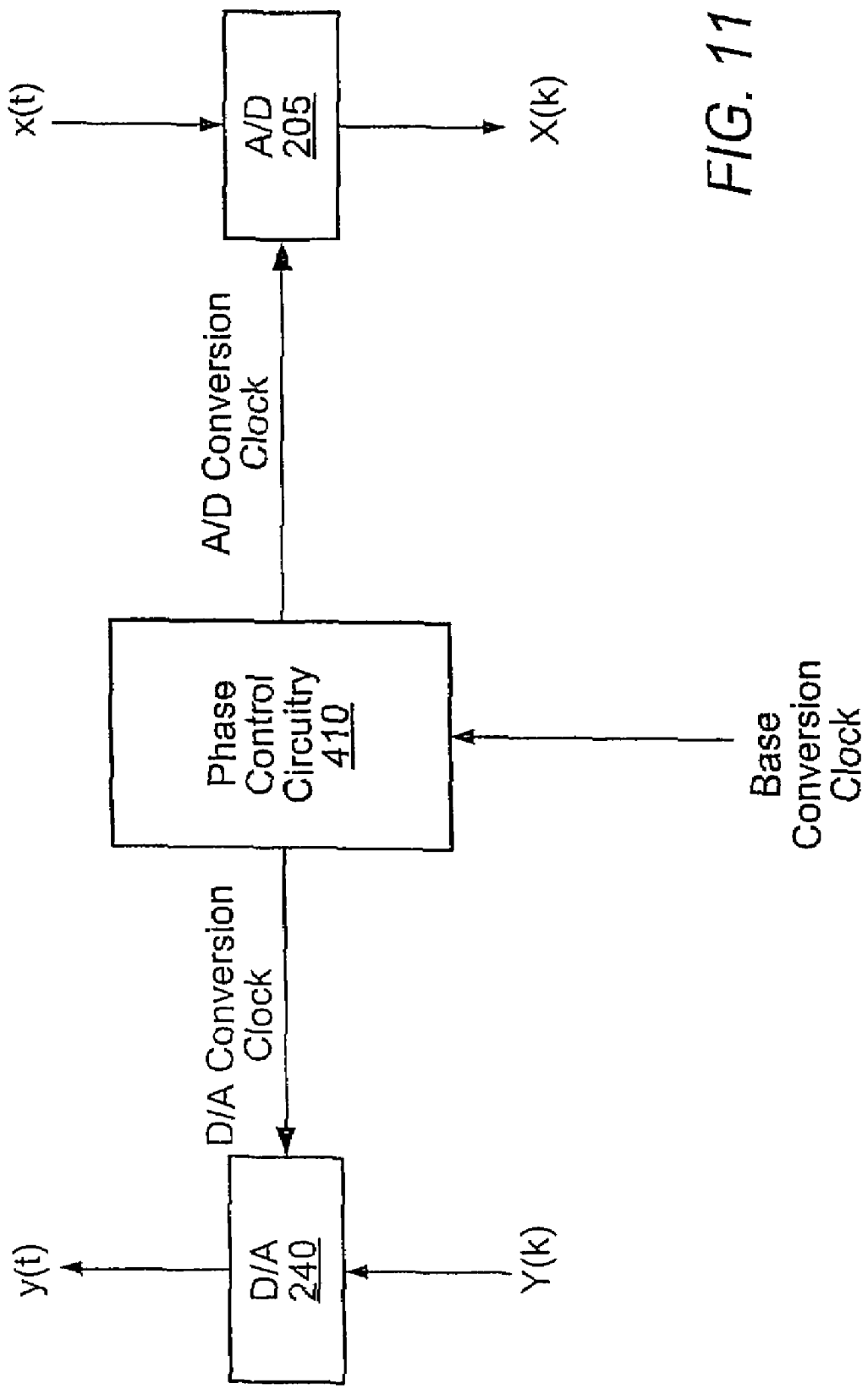
FIG. 11 illustrates circuitry to shift the phases of an A/D conversion clock and a D/A conversion clock relative to a base conversion clock.

In some embodiments, the precision of the measurement of time delay $\tau_0$ may be improved by adjusting the phase offset of the A/D converter 205 and/or the phase offset of the D/A converter 240 relative to a base conversion clock. The speakerphone 300 includes circuitry 410 to control the phase $\theta_{A/D}$ of the A/D conversion clock relative to the base conversion clock and the phase $\theta_{D/A}$ of the D/A conversion clock relative to the base conversion clock as suggested in FIG. 11. The A/D conversion clock is supplied to the A/D converter 205 and controls when sampling events occur. The D/A conversion clock is supplied to the D/A converter 240 and controls when D/A conversion events occur. The frequency $f_{conv}$ of the base conversion clock may be greater than or equal to the Nyquist rate for speech signals (or for audio signals in some embodiments). For example, in one embodiment the frequency $f_{conv}$ may equal 16 kHz.

After having located the integer sample index $k_{max}$ that maximizes the cross correlation, the processor 207 may:

(a) select a value of phase $\theta_{D/A}$;
(b) apply the selected phase value, e.g., by supplying the selected phase value to the phase control circuitry 410;
(c) transmit the noise burst as the output signal Y(k);
(d) capture the response signal X(k) from the D/A converter 205;
(e) compute the cross correlation value (between the noise burst and the response signal) corresponding to the integer sample index $k_{max}$;
(f) store the computed cross correlation value for further analysis.

The processor 207 may repeat (a) through (f) for successive values of phase $\theta_{D/A}$ spanning a range of angles, e.g., the range from −180 to 180 degrees. Furthermore, the processor may analyze the successive cross correlation values to determine the value $\theta_{max}$ of the phase $\theta_{D/A}$ that gives the maximum cross correlation value. The processor 207 may compute a refined estimate of the time delay $\tau_0$ using the integer sample index $k_{max}$ and the phase value $\theta_{max}$. For example, in one embodiment, the processor 207 may compute the refined estimate according to the expression:

$$\tau_0 = k_{max} + \theta_{max}/360.$$

In one set of embodiments, the processor 207 may increment the value of phase $\theta_{D/A}$ by the angle $(1/2^N)*360$ degrees, where N is a positive integer, in each iteration of (a). Thus, the processor 207 may explore the phase values $$\theta_{D/A} = -180 + k*(1/2^N)*360 \text{ degrees,}$$

k=0, 1, 2, ..., $2^N-1$. In one group of embodiments, N may equal any integer value in the range [3,9]. However, values outside this range are contemplated as well.

In an alternative set of embodiments, the phase $\theta_{A/D}$ of the A/D converter 205 may be varied instead of the phase $\theta_{D/A}$ of the D/A converter 240.

In some embodiments, the processor 207 may compute:
a Fast Fourier Transform (FFT) of the noise burst that is transmitted as output Y(k);
an FFT of the response signal X(k) captured from the microphone input channel; and
a ratio $H_{linear} = X(\omega)/Y(\omega)$, where $Y(\omega)$ denotes the transform of Y(k), and $X(\omega)$ denotes the transform of X(k). The ratio $H_{linear} = X(\omega)/Y(\omega)$ represents the linear part of a model M describing the relationship between signals at the circuit node corresponding to Y and the circuit node corresponding to X. See FIG. 8.

In order to compute the parameters of the nonlinear part of the model M, the processor 207 may transmit sine wave tones (at two different non-harmonically related frequencies) as output Y(k), and, capture the response signal X(k) from the microphone input channel. The processor may compute the spectrum $X(\omega)$ of the response signal X(k) by performing an FFT, and equalize the spectrum $X(\omega)$ by multiplying the spectrum $X(\omega)$ by the inverse of the transfer function $H_{linear}$ measured above:

$$Y^{eq}(\omega) = X(\omega)/H_{linear}(\omega).$$

The processor 207 may adapt the parameters of the nonlinear portion until the output of the model M closely matches the measured data.

In one set of embodiments, the model M may be a Volterra model.

During operation of the speakerphone 300, the processor 207 may transmit the output signal Y(k) through the output channel (including D/A converter 240, power amplifier 250 and speaker 225) and capture the input signal X(k) from the microphone input channel. Now the signal X(k) and Y(k) are carrying the substance of a live conversation between local participants and remote participants. The processor 207 may generate the correction signal E(k) by applying the non-linear portion of the model M to the signal Y(k) in the time domain, and applying the linear portion of the model M to the spectrum $Y(\omega)$ in the frequency domain.

The parameters of the model M (including the linear portion and the nonlinear portion) may be recomputed periodically (or intermittently) in order to track changes in the characteristics of the speaker and microphone. See the various embodiments described above for estimating the parameters of the model M.

The linear calibration may be performed during the night when speakerphone is less likely to be used and when people are less likely to be in the room or near the room and when the air conditioning (or any other noise sources that would reduce the accuracy of the measurement) is less likely to be operating. For example, the processor may be programmed to perform the calibration at 2:00 AM if a call is not in progress and if the room is sufficiently quiet as determined by the signal coming from the microphone(s).

Hybrid Beamforming

As noted above, speakerphone 300 (or speakerphone 200) may include a set of microphones, e.g., as suggested in FIG. 7. In one set of embodiments, processor 207 may operate on the set of digital input signals $X_j(k)$, j=1, 2, ..., $N_M$, captured from the microphone input channels, to generate a resultant signal D(k) that represents the output of a highly directional virtual microphone pointed in a target direction. The virtual microphone is configured to be much more sensitive in an angular neighborhood of the target direction than outside this angular neighborhood. The virtual microphone allows the speakerphone to "tune in" on any acoustic sources in the angular neighborhood and to "tune out" (or suppress) acoustic sources outside the angular neighborhood.

According to one methodology, the processor 207 may generate the resultant signal D(k) by:
operating on the digital input signals $X_j(k)$, j=1, 2, ..., $N_M$ with virtual beams B(1), B(2), ..., B($N_B$) to obtain respective beam-formed signals, where $N_B$ is greater than or equal to two;
adding (perhaps with weighting) the beam-formed signals to obtain a resultant signal D(k).

In one embodiment, this methodology may be implemented in the frequency domain by:
computing a Fourier transform of the digital input signals $X_j(k)$, j=1, 2, ..., $N_M$, to generate corresponding input spectra $X_j(f)$, j=1, 2, ..., $N_M$, where f denotes frequency; and
operating on the input spectra $X_j(f)$, j=1, 2, ..., $N_M$ with the virtual beams B(1), B(2), ..., B($N_B$) to obtain respective beam formed spectra V(1), V(2), ..., V($N_B$), where $N_B$ is greater than or equal to two;
adding (perhaps with weighting) the spectra V(1), V(2), ..., V($N_B$) to obtain a resultant spectrum D(f);
inverse transforming the resultant spectrum D(f) to obtain the resultant signal D(k).

Each of the virtual beams B(i), i=1, 2, ..., $N_B$ has an associated frequency range $$R(i) = [c_i, d_i]$$

and operates on a corresponding subset $S_i$ of the input spectra $X_j(f)$, $j=1, 2, \ldots, N_M$. (To say that A is a subset of B does not exclude the possibility that subset A may equal set B.) The processor 207 may window each of the spectra of the subset $S_i$ with a window function $W_i(f)$ corresponding to the frequency range R(i) to obtain windowed spectra, and, operate on the windowed spectra with the beam B(i) to obtain spectrum V(i). The window function $W_i$ may equal one inside the range R(i) and the value zero outside the range R(i). Alternatively, the window function $W_i$ may smoothly transition to zero in neighborhoods of boundary frequencies $c_i$ and $d_i$.

The union of the ranges R(1), R(2), ..., R($N_B$) may cover the range of audio frequencies, or, at least the range of frequencies occurring in speech.

The ranges R(1), R(2), ..., R($N_B$) include a first subset of ranges that are above a certain frequency $f_{TR}$ and a second subset of ranges that are below the frequency $f_{TR}$. In one embodiment, the frequency $f_{TR}$ may be approximately 550 Hz.

Each of the virtual beams B(i) that corresponds to a frequency range R(i) below the frequency $f_{TR}$ may be a superdirective beam of order L(i) formed from L(i)+1 of the input spectra $X_j(f)$, $j=1, 2, \ldots, N_M$, where L(i) is an integer greater than or equal to one. The L(i)+1 spectra may correspond to L(i)+1 microphones of the circular array that are aligned (or approximately aligned) in the target direction.

Furthermore, each of the virtual beams B(i) that corresponds to a frequency range R(i) above the frequency $f_{TR}$ may have the form of a delay-and-sum beam. The delay-and-sum parameters of the virtual beam B(i) may be designed by beam forming design software. The beam forming design software may be conventional software known to those skilled in the art of beam forming. For example, the beam forming design software may be software that is available as part of MATLAB®.

Figure 12:
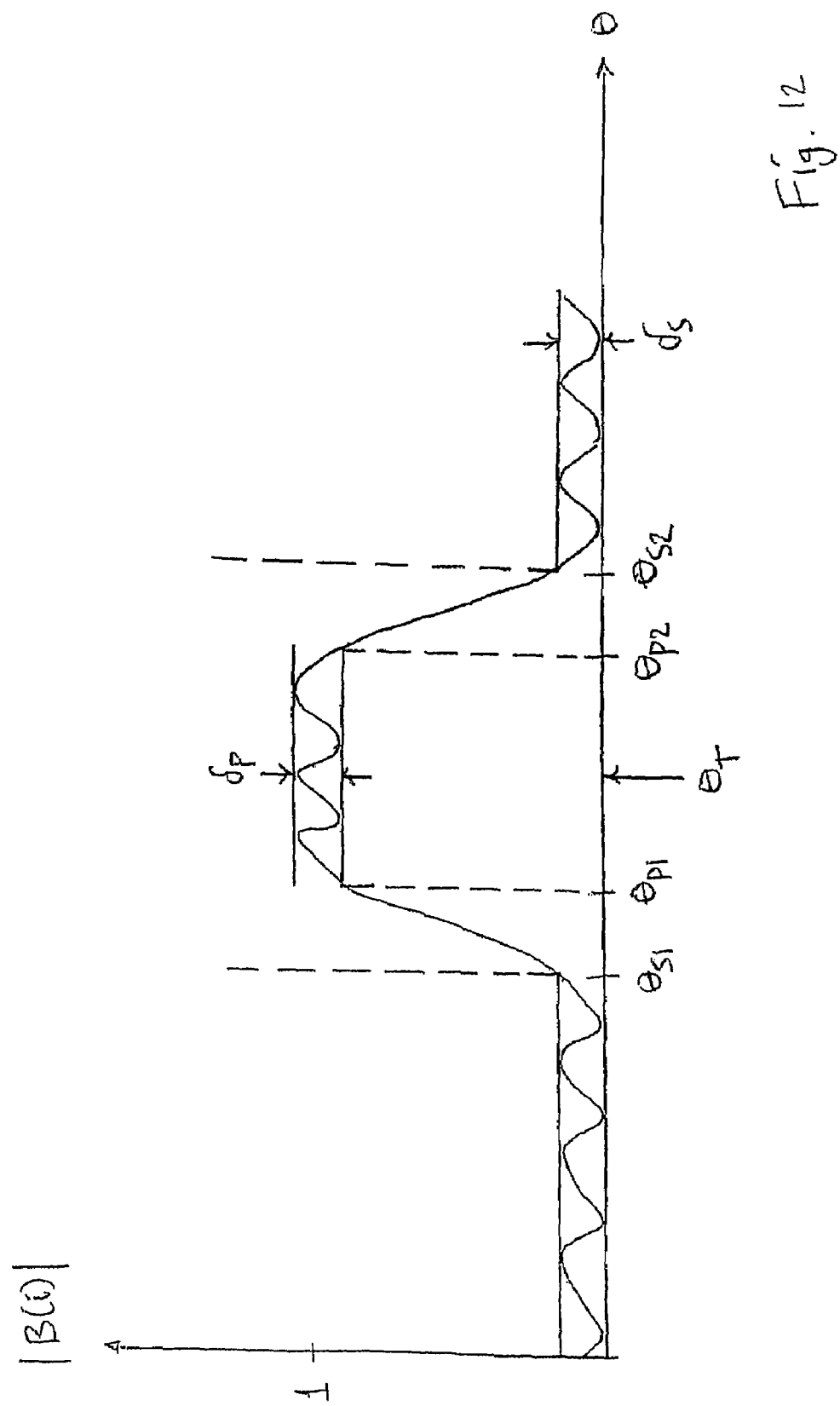
FIG. 12 illustrates an example of design parameters associated with the design of a beam B(i).

The beam forming design software may be directed to design an optimal delay-and-sum beam for beam B(i) at some frequency $f_i$ (e.g., the midpoint frequency) in the frequency range R(i) given the geometry of the circular array and beam constraints such as passband ripple $\delta_p$, stopband ripple $\delta_s$, passband edges $\theta_{P1}$ and $\theta_{P2}$, first stopband edge $\theta_{S1}$ and second stopband edge $\theta_{S2}$ as suggested by FIG. 12.

The beams corresponding to frequency ranges above the frequency $f_{TR}$ are referred to herein as "high-end beams". The beams corresponding to frequency ranges below the frequency $f_{TR}$ are referred to herein as "low-end beams". The virtual beams B(1), B(2), ..., B($N_B$) may include one or more low-end beams and one or more high-end beams.

In some embodiments, the beam constraints may be the same for all high-end beams B(i). The passband edges $\theta_{P1}$ and $\theta_{P2}$ may be selected so as to define an angular sector of size $360/N_M$ degrees (or approximately this size). The passband may be centered on the target direction $\theta_T$.

The high end frequency ranges R(i) may be an ordered succession of ranges that cover the frequencies from $f_{TR}$ up to a certain maximum frequency (e.g., the upper limit of audio frequencies, or, the upper limit of voice frequencies).

The delay-and-sum parameters for each high-end beam and the parameters for each low-end beam may be designed at a design facility and stored into memory 209 prior to operation of the speakerphone.

Since the microphone array is symmetric with respect to rotation through any multiple of $360/N_M$ degrees, in one set of embodiments, the set of parameters designed for one target direction may be used for any of the $N_M$ target directions given by $k(360/N_M)$, $k=0, 1, 2, \ldots, N_M-1$, by applying an appropriate circular shift when accessing the parameters from memory.

In one embodiment,
the frequency $f_{TR}$ is 550 Hz,
R(1)=R(2)=[0,550 Hz],
L(1)=L(2)=2, and
low-end beam B(1) operates on three of the spectra $X_j(f)$, $j=1, 2, \ldots, N_M$, and low-end beam B(2) operates on a different three of the spectra $X_j(f)$, $j=1, 2, \ldots, N_M$;
frequency ranges R(3), R(4), ..., R($N_B$) are an ordered succession of ranges covering the frequencies from $f_{TR}$ up to a certain maximum frequency (e.g., the upper limit of audio frequencies, or, the upper limit of voice frequencies);
beams B(3), B(4), ..., B($N_M$) are high-end beams designed as described above.

Figure 13:
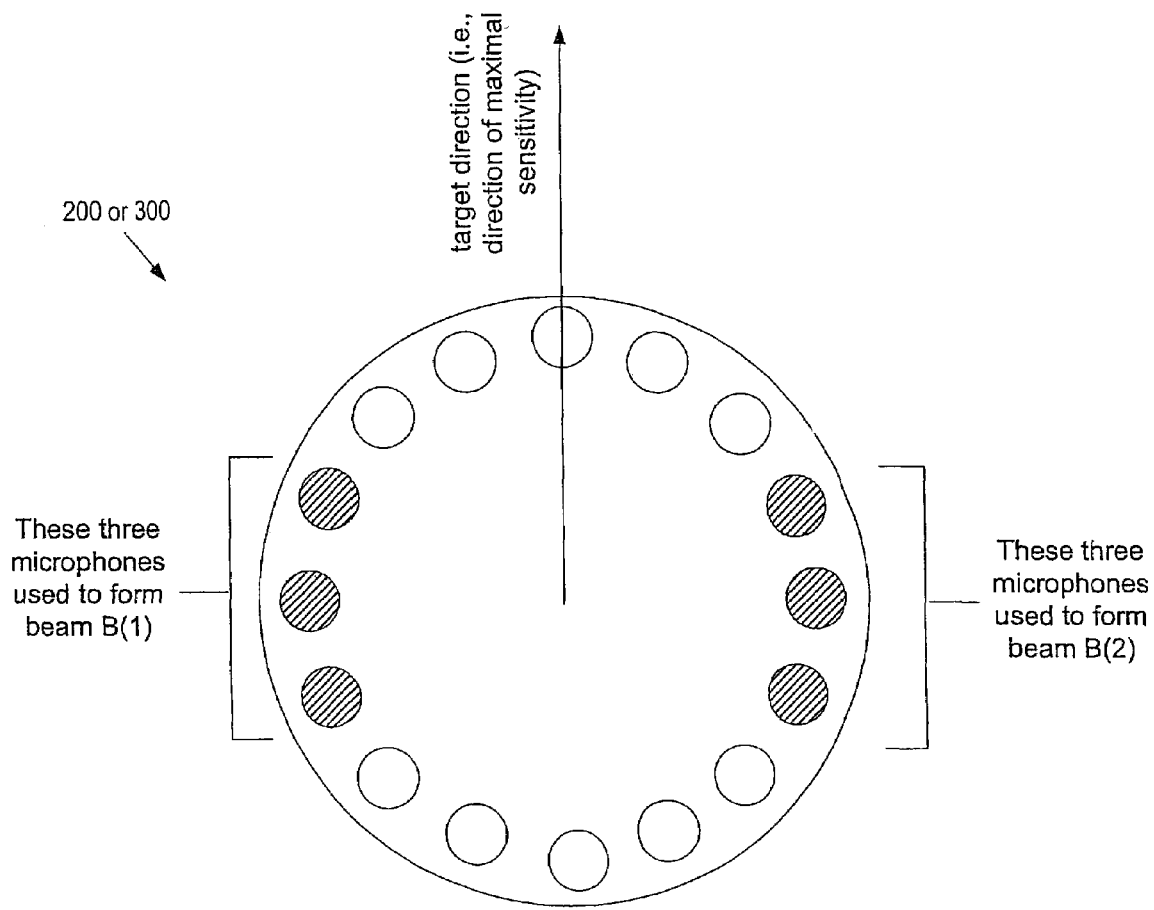
FIG. 13 illustrates two sets of three microphones aligned approximately in a target direction, each set being used to form a virtual beam.

FIG. 13 illustrates the three microphones (and thus, the three spectra) used by each of beams B(1) and B(2), relative to the target direction.

Figure 14:
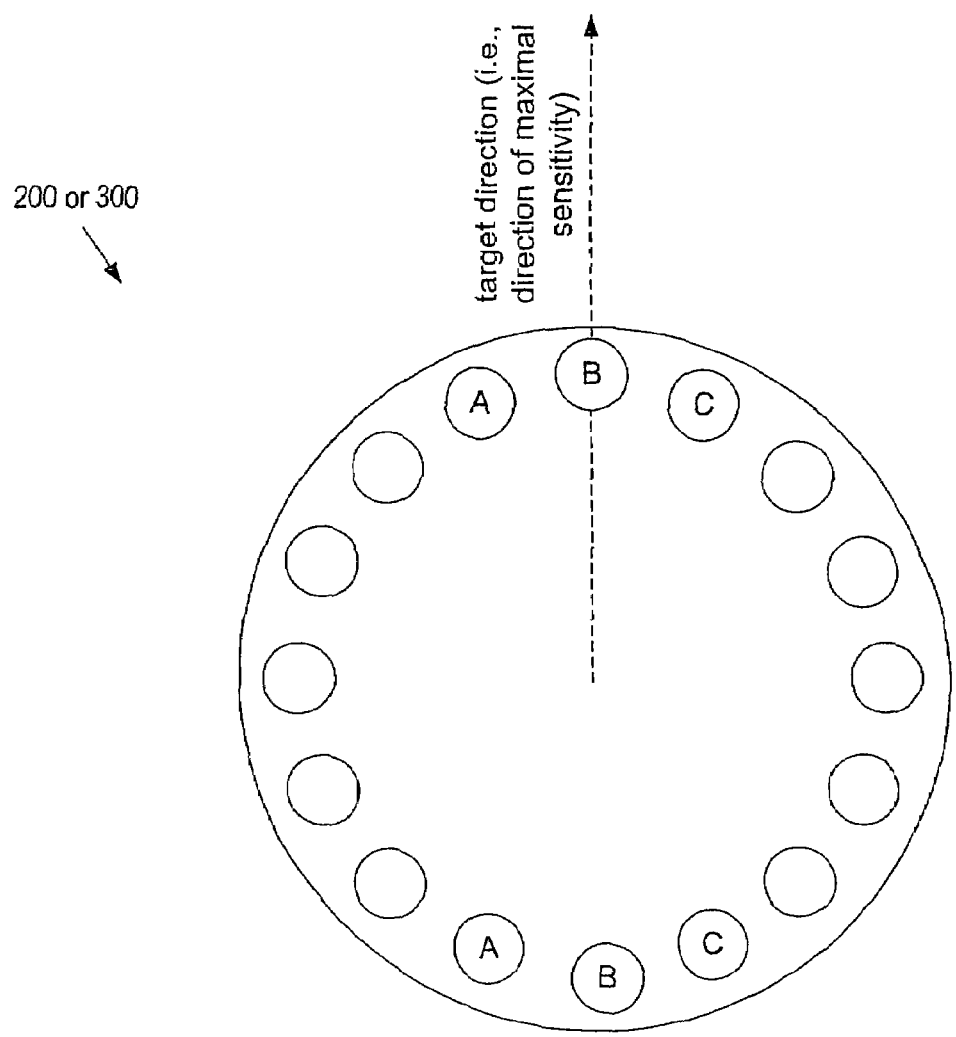
FIG. 14 illustrates three sets of two microphones aligned in a target direction, each set being used to form a virtual beam.

In another embodiment, the virtual beams B(1), B(2), ..., B($N_B$) may include a set of low-end beams of first order. FIG. 14 illustrates an example of three low-end beams of first order. Each of the three low-end beams may be formed using a pair of the input spectra $X_j(f)$, $j=1, 2, \ldots, N_M$. For example, beam B(1) may be formed from the input spectra corresponding to the two "A" microphones. Beam B(2) may be formed form the input spectra corresponding to the two "B" microphones. Beam B(3) may be formed form the input spectra corresponding to the two "C" microphones.

Figure 15:
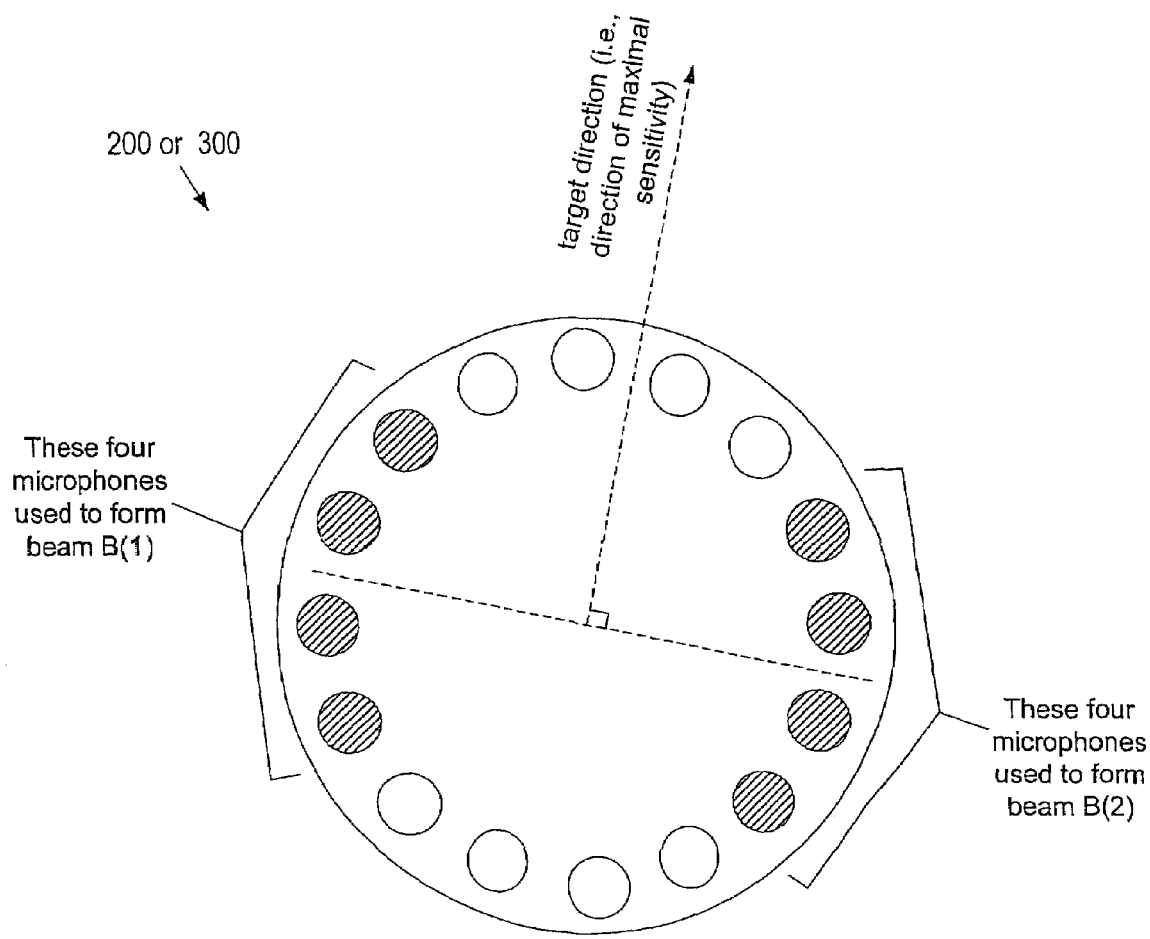
FIG. 15 illustrates two sets of four microphones aligned in a target direction, each set being used to form a virtual beam.

In yet another embodiment, the virtual beams B(1), B(2), ..., B($N_B$) may include a set of low-end beams of third order. FIG. 15 illustrates an example of two low-end beams of third order. Each of the two low-end beams may be formed using a set of four input spectra corresponding to four consecutive microphone channels that are approximately aligned in the target direction.

In one embodiment, the low order beams may include: second order beams (e.g., a pair of second order beams as suggested in FIG. 13), each second order beam being associated with the range of frequencies less than $f_1$, where $f_1$ is less than $f_{TR}$; and third order beams (e.g., a pair of third order beams as suggested in FIG. 15), each third order beam being associated with the range of frequencies from $f_1$ to $f_{TR}$. For example, $f_1$ may equal approximately 250 Hz.

Figure 16A:
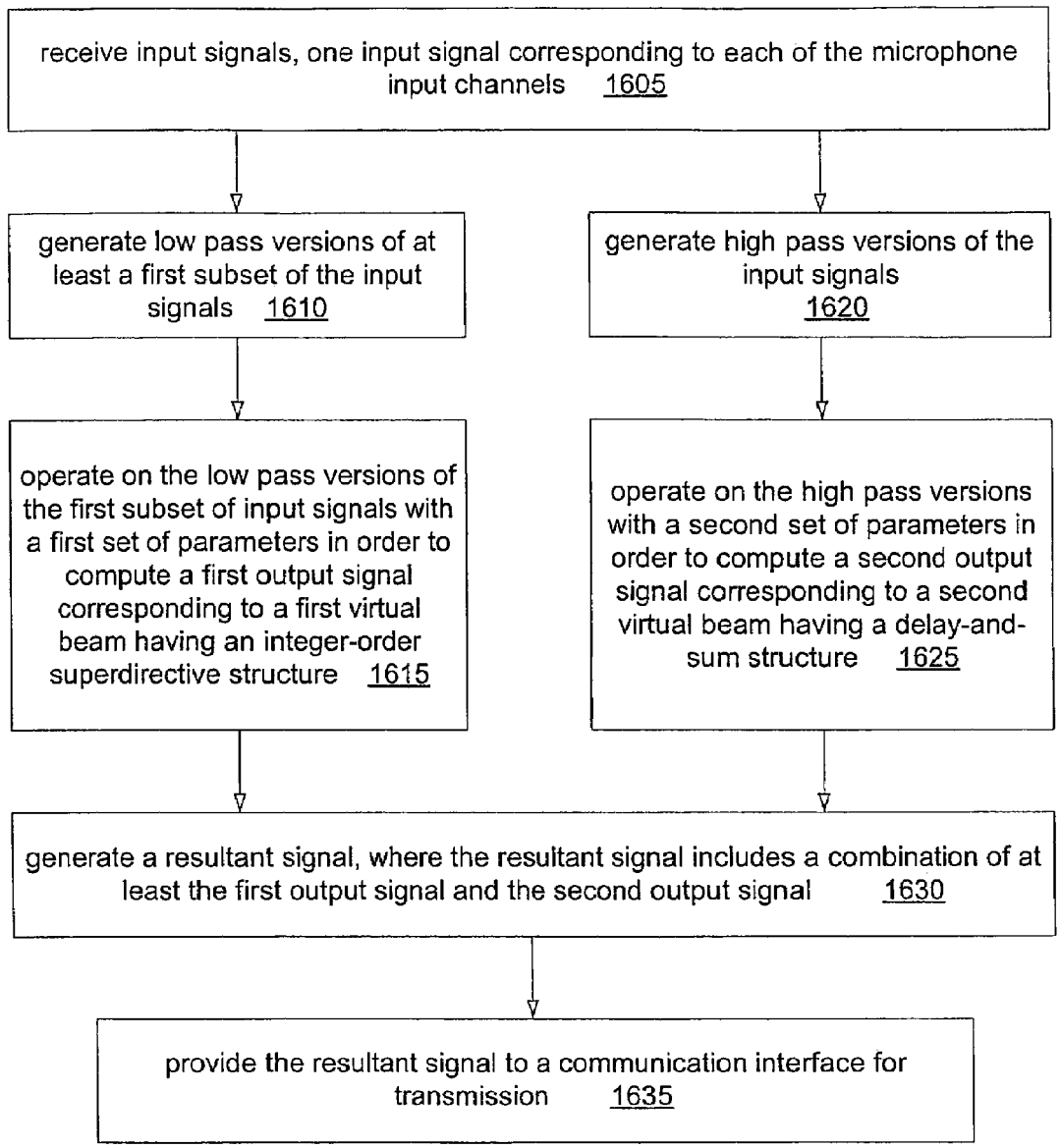
FIG. 16A illustrates one set of embodiments of a method for forming a highly directed beam using at least an integer-order superdirective beam and a delay-and-sum beam.

In one set of embodiments, a method for generating a highly directed beam may involve the following actions, as illustrated in FIG. 16A.

At 1605, input signals may be received from an array of microphones, one input signal from each of the microphones. The input signals may be digitized and stored in an input buffer.

At 1610, low pass versions of at least a first subset of the input signals may be generated. Transition frequency $f_{TR}$ may be the cutoff frequency for the low pass versions. The first subset of the input signals may correspond to a first subset of the microphones that are at least partially aligned in a target direction. (See FIGS. 13-15 for various examples in the case of a circular array.)

At 1615, the low pass versions of the first subset of input signals are operated on with a first set of parameters in order to compute a first output signal corresponding to a first virtual beam having an integer-order superdirective structure. The number of microphones in the first subset is one more than the integer order of the first virtual beam.

At 1620, high pass versions of the input signals are generated. Again, the transition frequency $f_{TR}$ may be the cutoff frequency for the high pass versions.

At 1625, the high pass versions are operated on with a second set of parameters in order to compute a second output signal corresponding to a second virtual beam having a delay-and-sum structure. The second set of parameters may be configured so as to direct the second virtual beam in the target direction.

The second set of parameters may be derived from a combination of parameter sets corresponding to a number of band-specific virtual beams. For example, in one embodiment, the second set of parameters is derived from a combination of the parameter sets corresponding to the high-end beams of delay-and-sum form discussed above. Let $N_H$ denote the number of high-end beams. As discussed above, beam design software may be employed to compute a set of parameters P(i) for a high-end delay-and-sum beam B(i) at some frequency $f_i$ in region R(i). The set P(i) may include $N_M$ complex coefficients denoted P(i,j), j=1, 2, ..., $N_M$, i.e., one for each microphone. The second set Q of parameters may be generated from the parameter sets P(i), i=1, 2, ..., $N_H$ according to the relation:

$$Q(j) = \sum_{i=1}^{N_H} P(i, j) U(i, j),$$

j=1, 2, ..., $N_M$, where U(i,j) is a weighting function that weights the parameters of set P(i), corresponding to frequency $f_i$, most heavily at microphone #i and successively less heavily at microphones away from microphone #i. Other schemes for combining the multiple parameter sets are also contemplated.

At 1630, a resultant signal is generated, where the resultant signal includes a combination of at least the first output signal and the second output signal. The combination may be a linear combination or other type of combination. In one embodiment, the combination is a straight sum (with no weighting).

At 1635, the resultant signal may be provided to a communication interface for transmission to one or more remote destinations.

The action of generating low pass versions of at least a first subset of the input signals may include generating low pass versions of one or more additional subsets of the input signals distinct from the first subset. Correspondingly, the method may further involve operating on the additional subsets (of low pass versions) with corresponding additional virtual beams of integer-order superdirective structure. (There is no requirement that all the superdirective beams must have the same integer order.) Thus, the combination (used to generate the resultant signal) also includes the output signals of the additional virtual beams.

The method may also involve accessing an array of parameters from a memory, and applying a circular shift to the array of parameters to obtain the second set of parameters, where an amount of the shift corresponds to the desired target direction.

It is noted that actions 1610 through 1630 may be performed in the time domain, in the frequency domain, or partly in the time domain and partly in the frequency domain. For example, 1610 may be implemented by time-domain filtering or by windowing in the spectral domain. As another example, 1625 may be performed by weighting, delaying and adding time-domain functions, or, by weighting, adjusting and adding spectra. In light of the teachings given herein, one skilled in the art will not fail to understand how to implement each individual action in the time domain or in the frequency domain.

Figure 16B:
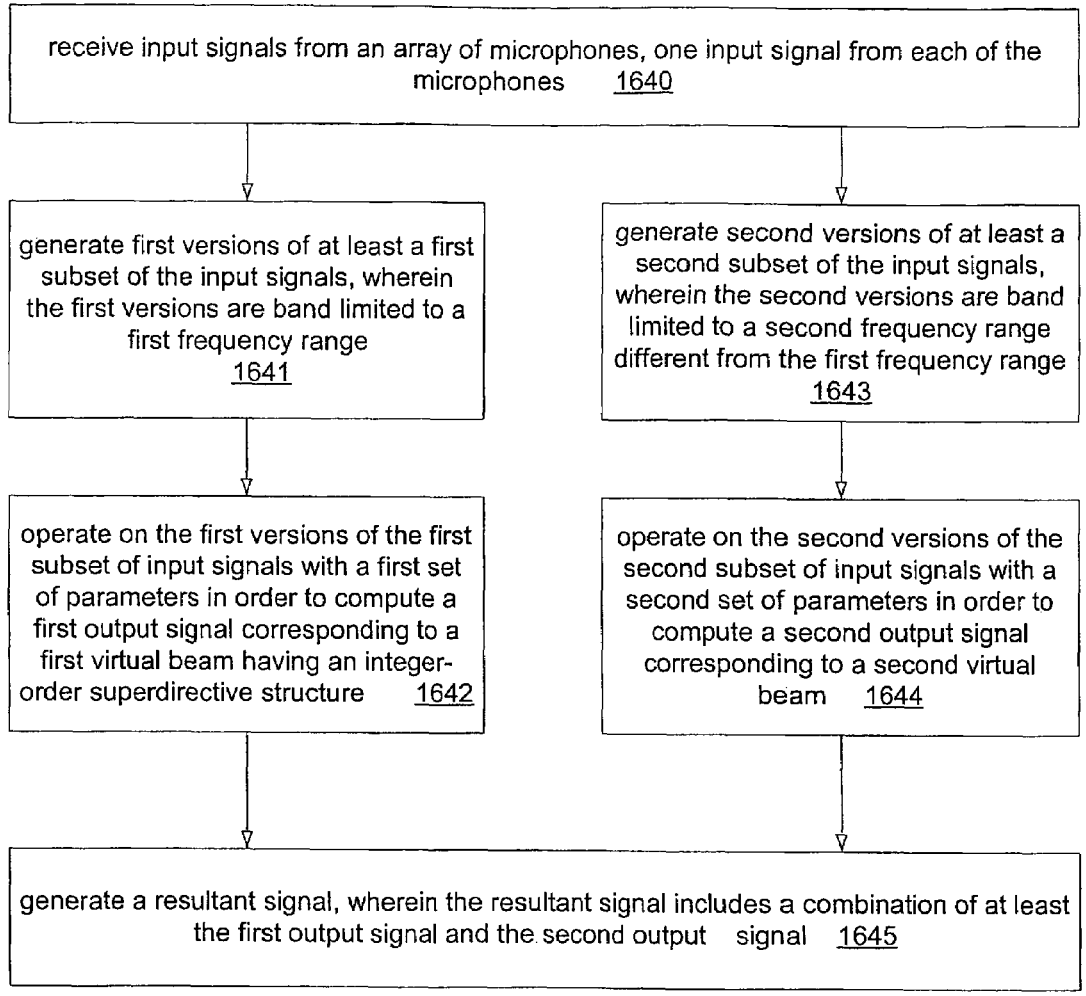
FIG. 16B illustrates one set of embodiments of a method for forming a highly directed beam using at least a first virtual beam and a second virtual beam in different frequency ranges.

In another set of embodiments, a method for generating a highly directed beam may involve the following actions, as illustrated in FIG. 16B.

At 1640, input signals are received from an array of microphones, one input signal from each of the microphones.

At 1641, first versions of at least a first subset of the input signals are generated, wherein the first versions are band limited to a first frequency range.

At 1642, the first versions of the first subset of input signals are operated on with a first set of parameters in order to compute a first output signal corresponding to a first virtual beam having an integer-order superdirective structure.

At 1643, second versions of at least a second subset of the input signals are generated, wherein the second versions are band limited to a second frequency range different from the first frequency range.

At 1644, the second versions of the second subset of input signals are operated on with a second set of parameters in order to compute a second output signal corresponding to a second virtual beam.

At 1645, a resultant signal is generated, wherein the resultant signal includes a combination of at least the first output signal and the second output signal.

The second virtual beam may be a beam having a delay-and-sum structure or an integer order superdirective structure, e.g., with integer order different from the integer order of the first virtual beam.

The first subset of the input signals may correspond to a first subset of the microphones which are at least partially aligned in a target direction. Furthermore, the second set of parameters may be configured so as to direct the second virtual beam in the target direction.

Additional integer-order superdirective beams and/or delay-and-sum beams may be applied to corresponding subsets of band-limited versions of the input signals, and the corresponding outputs (from the additional beams) may be combined into the resultant signal.

In another set of embodiments, a system may include a set of microphones, a memory and a processor, e.g., as suggested variously above in conjunction with FIGS. 1B, 7, 8, 8B, 10 and 10B. The memory may be configured to store program instructions. The processor may be configured to read and execute the program instructions from the memory. The program instructions may be executable to implement:

(a) receiving input signals, one input signal corresponding to each of the microphones;

(b) generating first versions of at least a first subset of the input signals, wherein the first versions are band limited to a first frequency range;

(c) operating on the first versions of the first subset of input signals with a first set of parameters in order to compute a first output signal corresponding to a first virtual beam having an integer-order superdirective structure;

(d) generating second versions of at least a second subset of the input signals, wherein the second versions are band limited to a second frequency range different from the first frequency range;

(e) operating on the second versions of the second subset of input signals with a second set of parameters in order to compute a second output signal corresponding to a second virtual beam;

(f) generating a resultant signal, wherein the resultant signal includes a combination of at least the first output signal and the second output signal.

The second virtual beam may be a beam having a delay-and-sum structure or an integer order superdirective structure, e.g., with integer order different from the integer order of the first virtual beam.

The first subset of the input signals may correspond to a first subset of the microphones which are at least partially aligned in a target direction. Furthermore, the second set of parameters may be configured so as to direct the second virtual beam in the target direction.

Additional integer-order superdirective beams and/or delay-and-sum beams may be applied to corresponding subsets of band-limited versions of the input signals, and the corresponding outputs (from the additional beams) may be combined into the resultant signal.

The program instructions may be further configured to direct the processor to provide the resultant signal to a communication interface (e.g., one of communication interfaces 211) for transmission to one or more remote devices.

The set of microphones may be arranged on a circle. Other array topologies are contemplated. For example, the microphones may be arranged on an ellipse, a square, or a rectangle. In some embodiments, the microphones may be arranged on a grid, e.g., a rectangular grid, a hexagonal grid, etc.

Figure 16C:
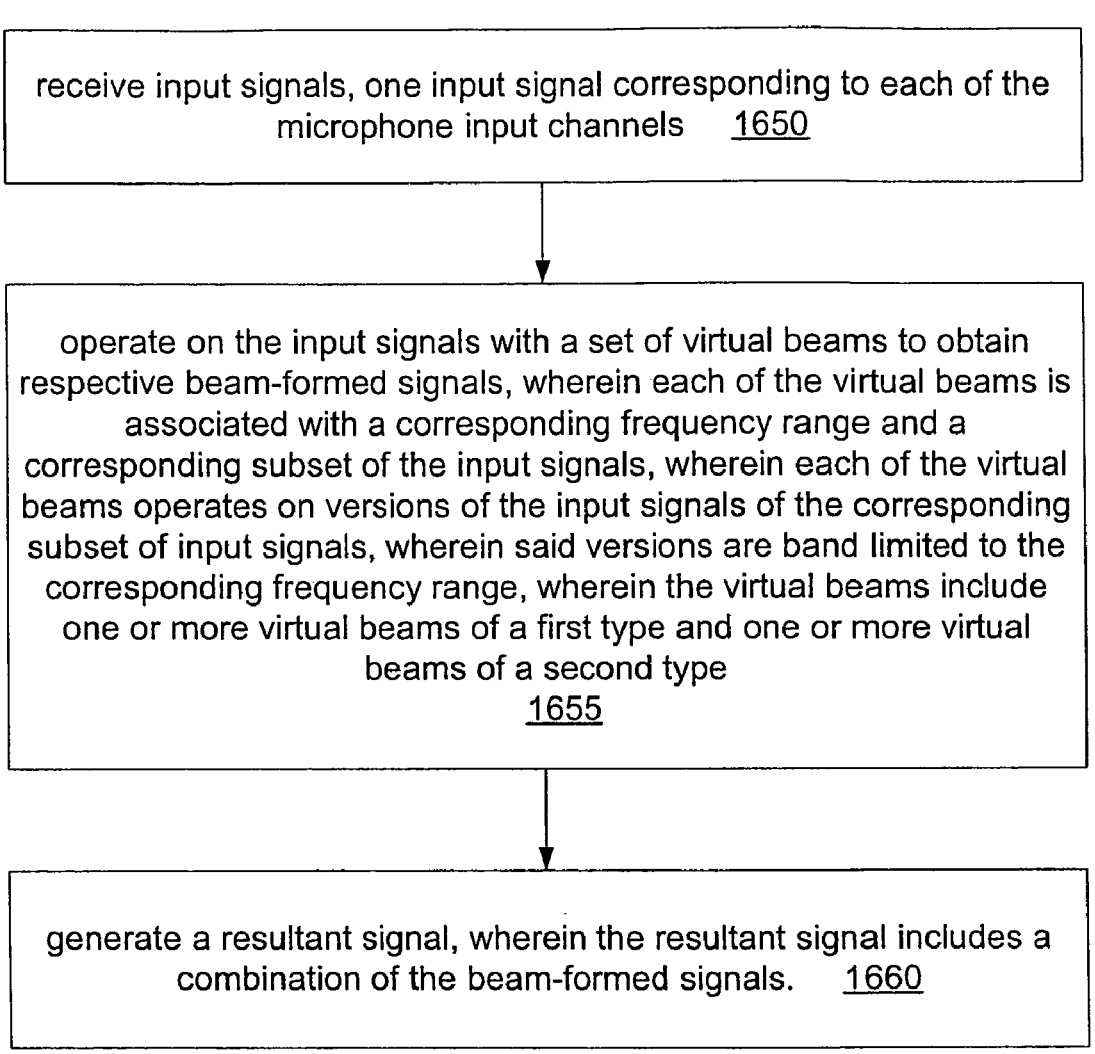
FIG. 16C illustrates one set of embodiments of a method for forming a highly directed beam using one or more virtual beams of a first type and one or more virtual beams of a second type.

In yet another set of embodiments, a method for generating a highly directed beam may include the following actions, as illustrated in FIG. 16C.

At 1650, input signals may be received from an array of microphones, one input signal from each of the microphones.

At 1655, the input signals may be operated on with a set of virtual beams to obtain respective beam-formed signals, where each of the virtual beams is associated with a corresponding frequency range and a corresponding subset of the input signals, where each of the virtual beams operates on versions of the input signals of the corresponding subset of input signals, where said versions are band limited to the corresponding frequency range, where the virtual beams include one or more virtual beams of a first type and one or more virtual beams of a second type.

The first type and the second type may correspond to: different mathematical expressions describing how the input signals are to be combined; different beam design methodologies; different theoretical approaches to beam forming, etc.

The one or more beams of the first type may be integer-order superdirective beams. Furthermore, the one or more beams of the second type may be delay-and-sum beams.

At 1660, a resultant signal may be generated, where the resultant signal includes a combination of the beam-formed signals.

The methods illustrated in FIGS. 16A-C may be implemented by one or more processors under the control of program instructions, by dedicated (analog and/or digital) circuitry, or, by a combination of one or more processors and dedicated circuitry. For example, any or all of these methods may be implemented by one or more processors in a speakerphone (e.g., speakerphone 200 or speakerphone 300).

In yet another set of embodiments, a method for configuring a target system (i.e., a system including a processor, a memory and one or more processors) may involve the following actions, as illustrated in FIG. 17. The method may be implemented by executing program instructions on a computer system which is coupled to the target system.

At 1710, a first set of parameters may be generated for a first virtual beam based on a first subset of the microphones, where the first virtual beam has an integer-order superdirective structure.

At 1715, a plurality of parameter sets may be computed for a corresponding plurality of delay-and-sum beams, where the parameter set for each delay-and-sum beam is computed for a corresponding frequency, where the parameter sets for the delay-and-sum beams are computed based on a common set of beam constraints. The frequencies for the delay-and-sum beams may be above a transition frequency.

At 1720, the plurality of parameter sets may be combined to obtain a second set of parameters, e.g., as described above.

At 1725, the first set of parameters and the second set of parameters may be stored in the memory of the target system.

The delay-and-sum beams may be designed using beam forming design software. Each of the delay-and-sum beams may be designed subject to the same (or similar) set of beam constraints. For example, each of the delay-and-sum beams may be constrained to have the same pass band width (i.e., main lobe width).

The target system being configured may be a device such as a speakerphone, a videoconferencing system, a surveillance device, a video camera, etc.

One measure of the quality of a virtual beam formed from a microphone array is directivity index (DI). Directivity index indicates the amount of rejection of signal off axis from the desired signal. Virtual beams formed from endfire microphone arrays ("endfire beams") have an advantage over beams formed from broadside arrays ("broadside beams") in that the endfire beams have constant DI over all frequencies as long as the wavelength is greater than the microphone array spacing. (Broadside beams have increasingly lower DI at lower frequencies.) For endfire arrays, however, as the frequency goes down the signal level goes down by (6 dB per octave)×(endfire beam order) and therefore the gain required to maintain a flat response goes up, requiring higher signal-to-noise ratio to obtain a usable result.

A high DI at low frequencies is important because room reverberations, which people hear as "that hollow sound", are predominantly at low frequencies. The higher the "order" of an endfire microphone array the higher the potential DI value.

Calibration to Correct for Acoustic Shadowing

The performance of a speakerphone (such as speakerphone 200 or speakerphone 300) using an array of microphones may be constrained by:
(1) the accuracy of knowledge of the 3 dimensional position of each microphone in the array;
(2) the accuracy of knowledge of the magnitude and phase response of each microphone;
(3) the signal-to-noise ratio (S/N) of the signal arriving at each microphone; and
(4) the minimum acceptable signal-to-noise (S/N) ratio (as a function of frequency) determined by the human auditory system.

(1) Prior to use of the speakerphone (e.g., during the manufacturing process), the position of each microphone in the speakerphone may be measured by placing the speakerphone in a test chamber. The test chamber includes a set of speakers at known positions. The 3D position of each microphone in the speakerphone may be determined by:
asserting a known signal from each speaker;
capturing the response from the microphone;
performing cross-correlations to determine the propagation time of the known signal from each speaker to the microphone;

computing the propagation distance between each speaker and the microphone from the corresponding propagation times;

computing the 3D position of the microphone from the propagation distances and the known positions of the speakers.

It is noted that the phase of the A/D clock and/or the phase of D/A clock may be adjusted as described above to obtain more accurate estimates of the propagation times. The microphone position data may be stored in non-volatile memory in each speakerphone.

(2) There are two parts to having an accurate knowledge of the response of the microphones in the array. The first part is an accurate measurement of the baseline response of each microphone in the array during manufacture (or prior to distribution to customer). The first part is discussed below. The second part is adjusting the response of each microphone for variations that may occur over time as the product is used. The second part is discussed in detail above.

Especially at higher frequencies each microphone will have a different transfer function due to asymmetries in the speakerphone structure or in the microphone pod. The response of each microphone in the speakerphone may be measured as follows. The speakerphone is placed in a test chamber at a base position with a predetermined orientation. The test chamber includes a movable speaker (or set of speakers at fixed positions). The speaker is placed at a first position in the test chamber. A calibration controller asserts a noise burst through the speaker. The calibration controller read and stores the signal $X_j(k)$ captured by the microphone $M_j$, $j=1, 2, \ldots, N_M$, in the speakerphone in response to the noise burst. The speaker is moved to a new position, and the noise broadcast and data capture is repeated. The noise broadcast and data capture are repeated for a set of speaker positions. For example, in one embodiment, the set of speaker positions may explore the circle in space given by:

radius equal to 5 feet relative to an origin at the center of the microphone array;

azimuth angle in the range from zero to 360 degrees;

elevation angle equal to 15 degrees above the plane of the microphone array.

In another embodiment, the set of speaker positions may explore a region in space given by:

radius in the range form 1.5 feet to 20 feet.

azimuth angle in the range from zero to 360 degrees;

elevation angle in the range from zero to 90 degrees.

A wide variety of embodiments are contemplated for the region of space sampled by the set of speaker positions.

A second speakerphone, having the same physical structure as the first speakerphone, is placed in the test chamber at the base position with the predetermined orientation. The second speakerphone has ideal microphones $G_j$, $j=1, 2, \ldots, N_M$, mounted in the slots where the first speakerphone has less than ideal microphones $M_j$. The ideal microphones are "golden" microphones having flat frequency response. The same series of speaker positions are explored as with the first speakerphone. At each speaker position the same noise burst is asserted and the response $X_j^G(k)$ from each of the golden microphones of the second speakerphone is captured and stored.

For each microphone channel j and each speaker position, the calibration controller may compute an estimate for the transfer function of the microphone $M_j$, $j=1, 2, \ldots, N_M$, according to the expression:

$H_j^{mic}(\omega) = X_j(\omega)/X_j^G(\omega)$.

The division by spectrum $X_j^G(\omega)$ cancels the acoustic effects due to the test chamber and the speakerphone structure. These microphone transfer functions are stored into non-volatile memory of the first speakerphone, e.g., in memory 209.

In practice, it may be more efficient to gather the golden microphone data from the second speakerphone first, and then, gather data from the first speakerphone, so that the microphone transfer functions $H_j^{mic}(\omega)$ for each microphone channel and each speaker position may be immediately loaded into the first speakerphone before detaching the first speakerphone from the calibration controller.

In one embodiment, the first speakerphone may itself include software to compute the microphone transfer functions $H_j^{mic}(\omega)$ for each microphone and each speaker position. In this case, the calibration controller may download the golden response data to the first speakerphone so that the processor 207 of the speakerphone may compute the microphone transfer functions.

In some embodiments, the test chamber may include a platform that can be rotated in the horizontal plane. The speakerphone may be placed on the platform with the center of the microphone array coinciding with the axis of the rotation of the platform. The platform may be rotated instead of attempting to change the azimuth angle of the speaker. Thus, the speaker may only require freedom of motion within a single plane passing through the axis of rotation of the platform.

When the speakerphone is being used to conduct a live conversation, the processor 207 may capture signals $X_j(k)$ from the microphone input channels, $j=1, 2, \ldots, N_M$, and operate on the signals $X_j(k)$ with one or more virtual beams as described above. The virtual beams are pointed in a target direction (or at a target position in space), e.g., at an acoustic source such as a current talker. The beam design software may have designed the virtual beams under the assumption that the microphones are ideal omnidirectional microphones having flat spectral response. In order to compensate for the fact that the microphones $M_j$, $j=1, 2, \ldots, N_M$, are not ideal omnidirectional microphones, the processor 207 may access the microphone transfer functions $H_j^{mic}$ corresponding to the target direction (or the target position in space) and multiply the spectra $X_j(\omega)$ of the received signals by the inverses $1/H_j^{mic}(\omega)$ of the microphone transfer functions respectively:

$X_j^{adj}(\omega) = X_j(\omega)/H_j^{mic}(\omega)$

The adjusted spectra $X_j^{adj}(\omega)$ may then be supplied to the virtual beam computations.

At high frequencies, effects such as acoustic shadowing begin to show up, in part due to the asymmetries in the speakerphone surface structure. For example, since the keypad is on one side of the speakerphone's top surface, microphones near the keypad will experience a different shadowing pattern than microphones more distant from the keypad. In order to allow for the compensation of such effects, the following calibration process may be performed. A golden microphone may be positioned in the test chamber at a position and orientation that would be occupied by the microphone $M_1$ if the first speakerphone had been placed in the test chamber. The golden microphone is positioned and oriented without being part of a speakerphone (because the intent is to capture the acoustic response of just the test chamber.) The speaker of the test chamber is positioned at the first of the set of speaker positions (i.e., the same set of positions used above to calibrate the microphone transfer functions). The calibration controller asserts the noise burst, reads the signal $X_1^C(k)$ captured from microphone $M_1$ in response to the noise burst, and stores the signal $X_1^C(k)$. The noise burst and data capture is repeated for the golden microphone in each of the positions that would have been occupied if the first speakerphone had been placed in the test chamber. Next, the speaker is moved to a second of the set of speaker positions and the sequence of noise-burst-and-data-gathering over all microphone positions is performed. The sequence of noise-burst-and-data-gathering over all microphone positions is performed for each of the speaker positions. After having explored all speaker positions, the calibration controller may compute a shadowing transfer function $H_j^{SH}(\omega)$ for each microphone channel $j=1, 2, \ldots, N_M$, and for each speaker position, according to the expression:

$$H_j^{SH}(\omega) = X_j^G(\omega)/X_j^C(\omega).$$

The shadowing transfer functions may be stored in the memory of speakerphones prior to the distribution of the speakerphones to customers.

When a speakerphone is being used to conduct a live conversation, the processor 207 may capture signals $X_j(k)$ from the microphone input channels, $j=1, 2, \ldots, N_M$, and operate on the signals $X_j(k)$ with one or more virtual beams pointed in a target direction (or at a target position) as described variously above. In order to compensate for the fact that the microphones $M_j$, $j=1, 2, 3, \ldots, N_M$, are acoustically shadowed (by being incorporated as part of a speakerphone), the processor 207 may access the shadow transfer functions $H_j^{SH}(\omega)$ corresponding to the target direction (or target position in space) and multiply the spectra $X_j(\omega)$ of the received signals by the inverses $1/H_j^{SH}(\omega)$ of the shadowing transfer functions respectively:

$$X_j^{adj}(\omega) = X_j(\omega)/H_j^{SH}(\omega)$$

The adjusted spectra $X_j^{adj}(\omega)$ may then be supplied to the virtual beam computations for the one or more virtual beams.

In some embodiments, the processor 207 may compensate for both non-ideal microphones and acoustic shadowing by multiplying each received signal spectrum $X_j(\omega)$ by the inverse of the corresponding shadowing transfer function for the target direction (or position) and the inverse of the corresponding microphone transfer function for the target direction (or position):

$$X_j^{adj}(\omega) = \frac{X_j(\omega)}{H_j^{SH}(\omega)H_j^{mic}(\omega)}.$$

The adjusted spectra $X_j^{adj}(\omega)$ may then be supplied to the virtual beam computations for the one or more virtual beams.

In some embodiments, parameters for a number of ideal high-end beams as described above may be stored in a speakerphone. Each ideal high-end beam $B^{Id}(i)$ has an associated frequency range $R_i=[c_i,d_i]$ and may have been designed (e.g., as described above, using beam design software) assuming that: (a) the microphones are ideal omnidirectional microphones and (b) there is no acoustic shadowing. The ideal beam $B^{Id}(i)$ may be given by the expression:

$$IdealBeamOutput_i(\omega) = \sum_{j=1}^{N_B} C_j W_i(\omega) X_j(\omega) \exp(-i\omega d_j),$$

where the attenuation coefficients $C_j$ and the time delay values $d_j$ are values given by the beam design software, and $W_i$ is the spectral window function corresponding to frequency range $R_i$. The failure of assumption (a) may be compensated for by the speakerphone in real time operation as described above by multiplying by the inverses of the microphone transfer functions corresponding to the target direction (or target position). The failure of the assumption (b) may be compensated for by the speakerphone in real time operation as described above by applying the inverses of the shadowing transfer functions corresponding to the target direction (or target position). Thus, the corrected beam $B(i)$ corresponding to ideal beam $B_{Id}(i)$ may conform to the expression:

$$CorrectedBeamOutput_i(\omega) = \sum_{j=1}^{N_B} C_j W_i(\omega) \frac{X_j(\omega)}{H_j^{SH}(\omega)H_j^{mic}(\omega)} \exp(-i\omega d_j).$$

In one embodiment, the complex value $z_{i,j}$ of the shadowing transfer function $H_j^{SH}(\omega)$ at the center frequency (or some other frequency) of the range $R_i$ may be used to simplify the above expression to:

$$CorrectedBeamOutput_i(\omega) = \sum_{j=1}^{N_B} C_j W_i(\omega) \frac{X_j(\omega)}{H_j^{mic}(\omega)} \exp(-i\omega d_j)/z_{i,j}.$$

A similar simplification may be achieved by replacing the microphone transfer function $H_j^{mic}(\omega)$ with its complex value at some frequency in the range $R_i$.

In one set of embodiments, a speakerphone may declare the failure of a microphone in response to detecting a discontinuity in the microphone transfer function as determined by a microphone calibration (e.g., an offline self calibration or live self calibration as described above) and a comparison to past history information for the microphone. Similarly, the failure of a speaker may be declared in response to detecting a discontinuity in one or more parameters of the speaker input-output model as determined by a speaker calibration (e.g., an offline self calibration or live self calibration as described above) and a comparison to past history information for the speaker. Similarly, a failure in any of the circuitry interfacing to the microphone or speaker may be detected.

At design time an analysis may be performed in order to predict the highest order end-fire array achievable independent of S/N issues based on the tolerances of the measured positions and microphone responses. As the order of an end-fire array is increased, its actual performance requires higher and higher precision of microphone position and microphone response. By having very high precision measurements of these factors it is possible to use higher order arrays with higher DI than previously achievable.

With a given maximum order array determined by tolerances, the required S/N of the system is considered, as that may also limit the maximum order and therefore maximum usable DI at each frequency.

The S/N requirements at each frequency may be optimized relative to the human auditory system.

An optimized beam forming solution that gives maximum DI at each frequency subject to the S/N requirements and array tolerance of the system may be implemented. For example, consider an nht array with the following formula:

$$X = g1*mic1(t-d1) - g2*mic2(t-d2) - \ldots gn*micn(t-dn).$$

Various mathematical solving techniques such an iterative solution or a Kalman filter may be used to determine the required delays and gains needed to produce a solution optimized for S/N, response, tolerance, DI and the application.

For example, an array used to measure direction of arrival may need much less S/N allowing higher DI than an application used in voice communications. There may be different S/N requirements depending on the type of communication channel or compression algorithm applied to the data.

Continuous Calibration Method

As seen in FIG. 18, a microphone 301 may have a diaphragm 303 (e.g., a Mylar® diaphragm) in the form of a non-conductive membrane. One side of the membrane may be coated with a conductive coating. The other side of the membrane may be charged with a large positive charge at the time of manufacture. The charge may, however, slowly dissipate over the lifetime of the microphone causing the microphone's response (i.e., transfer function) to drift. Other microphone constructions are also contemplated. For example, in some embodiments, continuous calibration methods may be independent of the microphone construction and therefore work for microphones such as nanotype microphones, integrated circuit microphones, etc.

In some embodiments, a speakerphone may measure and compensate for drift (e.g., the speakerphone may measure changes in gain, phase, and frequency response of microphones and correct for the drift). For example, a measurement of the signal from the microphone 301 (which typically includes a mixture of a dominant signal from a speaker and less dominant signals from other sources such as the voices of participants in the room) may be stored. An average of the measurements may be taken over time. In some embodiments, the less dominant sources may be insignificant in the time average compared to the dominant speaker source. The time average may be compared to the speaker output and the difference between the two may be used to offset the drift by adjusting the transfer function described above.

The amount of time used in the time average may depend on both the usage scenario and the microphone drift. In the case where there is a lot of constant background noise, the time averaging may be adjusted to be longer than in the case where the unit is in a quiet room. The drift will vary between different microphones (even from the same manufacturing lot) and will also vary depending on the environmental conditions. For example, if the environment is constantly humid, the electret element charge will dissipate more rapidly than in a dry environment. Average temperature will also affect the drift.

Various types of filters may be used. In some embodiments, the filter employs a log type average (with the majority weighting on the "older" data). The transfer function may be calculated in real time and then stored for "offline" processing along with a number of previously stored data points. There may be a separate "microphone calibration" routine which is run when there are no other (more real-time) demands on the processor.

Figure 19:
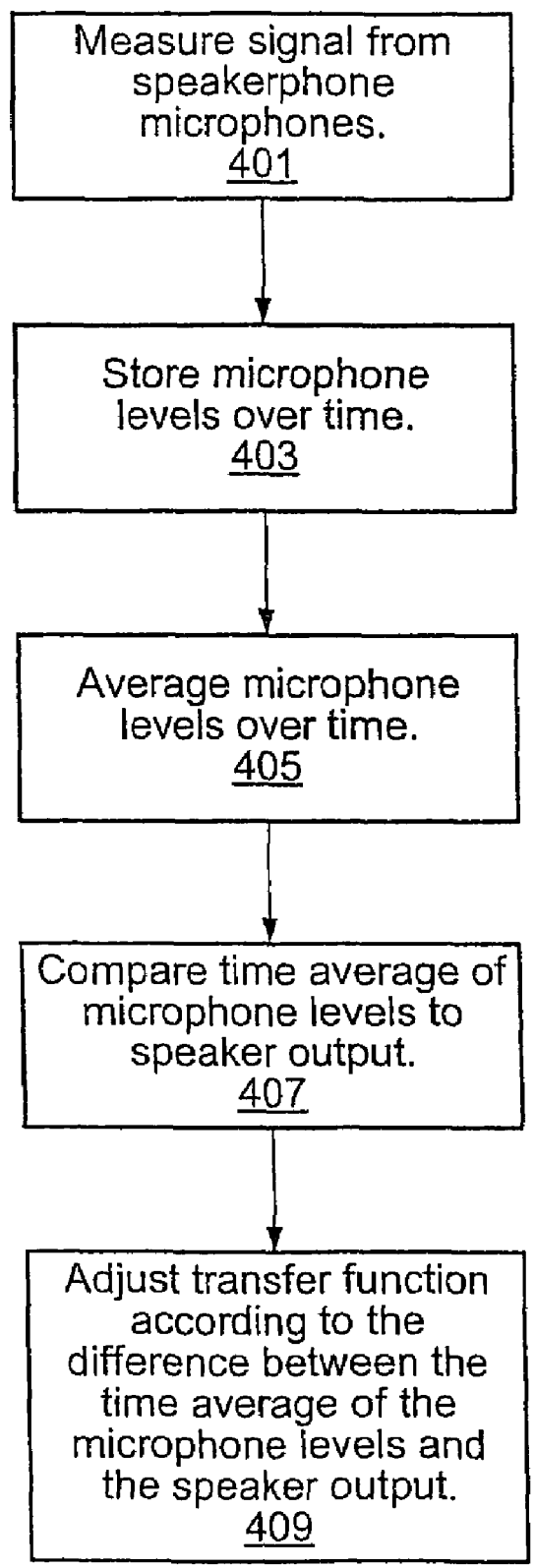
FIG. 19 illustrates one set of embodiments of a method for offsetting microphone drift.

FIG. 19 illustrates a method for offsetting microphone drift, according to some embodiments. It should be noted that in various embodiments of the methods described below, one or more of the steps described may be performed concurrently, in a different order than shown, or may be omitted entirely. Other additional steps may also be performed as desired.

At 401, a signal from the speakerphone microphones may be measured. In some embodiments, signals from each of the microphones may be measured.

At 403, microphone levels may be stored over time. In some embodiments, microphone levels from each microphone may be stored separately. In some embodiments, the microphone levels from each microphone may be added together and the sum may be stored.

At 405, microphone levels may be averaged over time. In some embodiments, the microphone levels may be averaged after a predetermined interval of time. In some embodiments, the microphone levels may be continuously averaged over time.

At 407, the time average of the microphone levels may be compared to a speaker output level. For example, the speaker output may be subtracted from the microphone level time average for each microphone. If the time average is for all of the microphone levels added together, the time average may be divided by the number of speakers before the speaker output is subtracted out.

At 409, the transfer function discussed above with respect to the speaker signal subtraction may be adjusted according to the difference between the time average of the microphone levels and the speaker output. For example, if there is a positive difference when the speaker output is subtracted from the time average, the positive difference may be effectively subtracted from the microphone's response.

In addition to the frequency-domain transfer function discussed above, the center speaker signal (i.e., the signal generated by the center speaker of speakerphone systems such as speakerphone 200 in FIG. 7) may be used in order to perform time-domain measurements. Such measurements may include tracking the variation of the total harmonic distortion of the speaker as a function of both input level and the average power level. In this latter case, many speakers can exhibit short-term variations in their output as a function of the temperature of the voice coil. This phenomenon is not easily modeled as a linear system transfer function and is typically referred to as "thermal compression". These effects may greatly influence the speaker output (and thus, the speaker-to-microphone transfer function). Fortunately, they are relatively easy to measure and do not typically change greatly over time. However, if the speaker driver is damaged for some reason (if, for example the unit is dropped from a large height onto a hard surface), then this damage might be easily detected, since the speaker-to-microphone transfer function will thus change dramatically in a short period of time.

In various embodiments, another time-domain related measurement that can be obtained from the system involves the exact relative positions of the speaker and the microphone(s). This distance can be determined by examining the acoustic delay between the speaker input signal and the microphone output signal(s). Using a simple cross-correlation function, this delay can be calculated with reasonable accuracy-typically within one audio sample time, assuming that the acoustic path between the speaker and the microphone(s) is not obstructed by some external interference. However, the reliability of such a cross-correlation measurement might be greatly increased if the speaker-to-microphone transfer function is incorporated into the calculation. In addition, the temporal resolution of such a cross-correlation measurement need not be limited to a single sample period. In order to increase the resolution of such a calculation, the cross correlation can be conducted at a much higher effective sampling rate by constructing an interpolated data stream for both the speaker input and the microphone output signals. This interpolation prior to the cross-correlation measurement may be effective in increasing the precision of the temporal delay result obtained from the cross-correlation calculation. In the construction of a virtual beam-formed output from the multiple real microphone outputs, this more exact knowledge of the true spatial locations of the microphone array elements may provide a better result than a system that does not take this information into account.

In various embodiments, two sets of variables may be maintained in the measurement system; the microphone location(s) and the speaker location. The measurement may correct for relative movement between the speaker and microphone(s). However, if the speaker is oriented such that that the axis of its major motion is perpendicular to the direction of the calibration measurement, the speaker may be much less likely to move in the measured direction. The fact that the speaker is typically many times more massive than the microphone(s) and is also typically solidly affixed to a relatively inflexible structure (the speaker enclosure) also makes it much less likely to move than the relatively small and light microphone(s). Thus, when calculating the relative positions of the microphone(s) and the speaker, the movement of the microphone(s) will typically dominate by an order of magnitude or more. In some embodiments, position estimation based on time-delay measurement may be performed, and thus, the virtual beam-formed output may be adjusted to increase its effectiveness. In some embodiments, the time-delay measurement may be made on a continuous or periodic basis. In order to create the "baseline" measurement for the system, a calibration sequence can be conducted with an external speaker and microphone system that is located in a known location in relation to the unit that is being calibrated. This absolute reference calibration may only need to be performed once (at the time of manufacture) or it may also be performed in the case where the unit in question may be required to be serviced. In various embodiments, other methods of calibrating microphones may be used with the microphones in the speakerphone. In some embodiments, the methods may be used, for example, as a result of subtracting the speaker output and/or the difference between the speaker output and the time average of the microphones.

In some embodiments, the system may self diagnose problems with various speakerphone components using drift calculations. For example, if the drift is significant (e.g., greater than a pre-defined threshold), the system may determine that one or more speakerphone components are malfunctioning. For example, the system may determine that the speaker or one or more microphones is damaged. The system may also determine whether there is a problem with a component of the speakerphone circuitry (e.g., a malfunctioning power amplifier). In some embodiments, the speakerphone may communicate the problem to a local user (e.g., by displaying or verbalizing an appropriate message). In some embodiments, the speakerphone may alert a user (or another individual or system) that there is a problem. For example, the speakerphone may send a message over IP (e.g., using traps, email, SMS message, etc.).

Generalized Beam Forming

Figure 20:
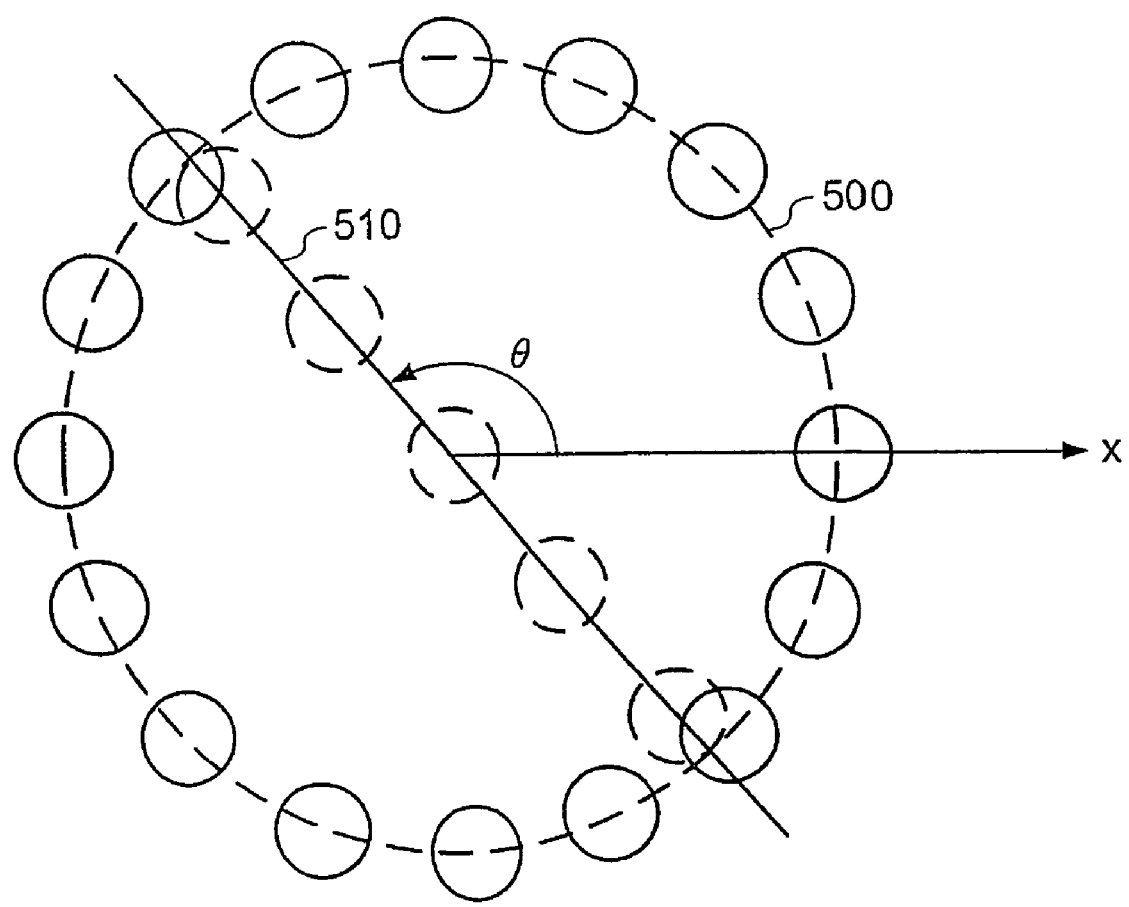
FIG. 20 illustrates a virtual linear array derived from a physical circular array of microphones.

In various embodiments, given a uniform circular array 500 of physical microphones as suggested by FIG. 20 and an arbitrary angle θ, any of various transformations such as the Davies Transformation may be applied to map the uniform circular array to a linear array 510 of virtual microphones oriented at angle θ with respect to a fixed ray which one can think of as the positive x axis. The virtual microphones are illustrated as dashed circles.

Figure 21A:
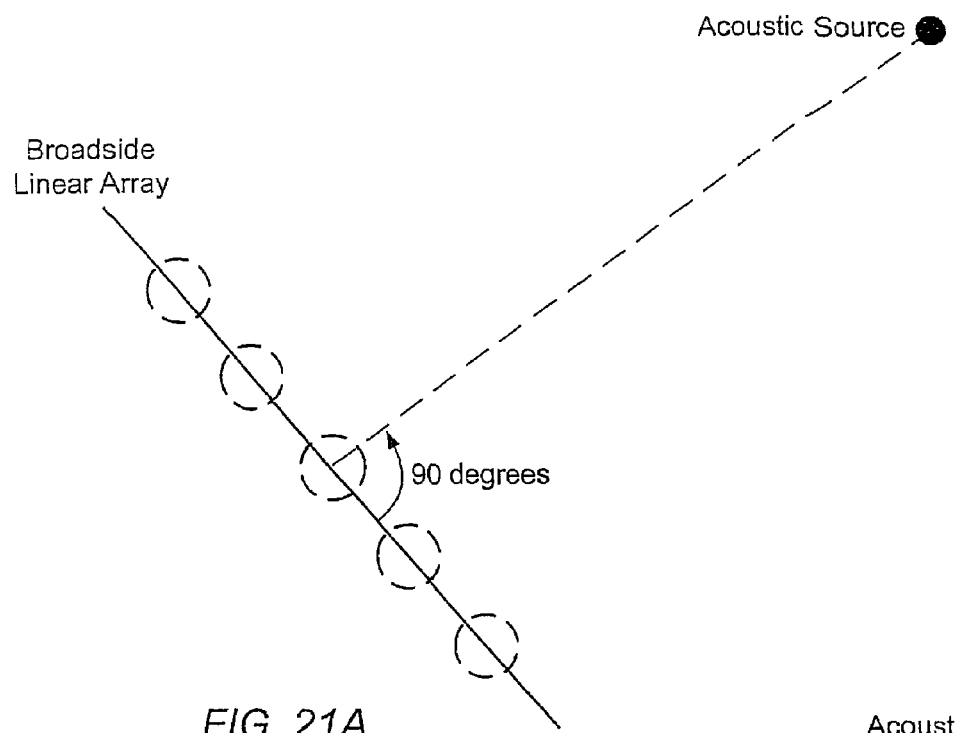
FIG. 21A illustrates a broadside linear array.

The virtual linear array 510 may be used to estimate the direction of arrival (DOA) of an acoustic signal generated by an acoustic source (e.g., a person's voice). It is a mathematical fact that the angular resolution of the DOA estimate from a linear array (physical or virtual) is highest when the DOA is normal to the axis of the linear array as suggested in FIG. 21A. (The axis of the linear array is the line along which the microphones are placed.) A linear array that is oriented so that the direction of arrival is normal to the array axis is said to be broadside to the source.

There exist a number of well-known computational methods that iteratively converge on a high-resolution DOA estimate by one or more applications of the Davies Transform (or some similar spatial frequency warping method) to generate virtual linear arrays from a physical uniform circular array. For example, these methods may involve starting with a initial set of virtual linear arrays oriented at directions spanning the circle, and then, iteratively converging on a linear array that is very close to being a broadside array.

Figure 21B:
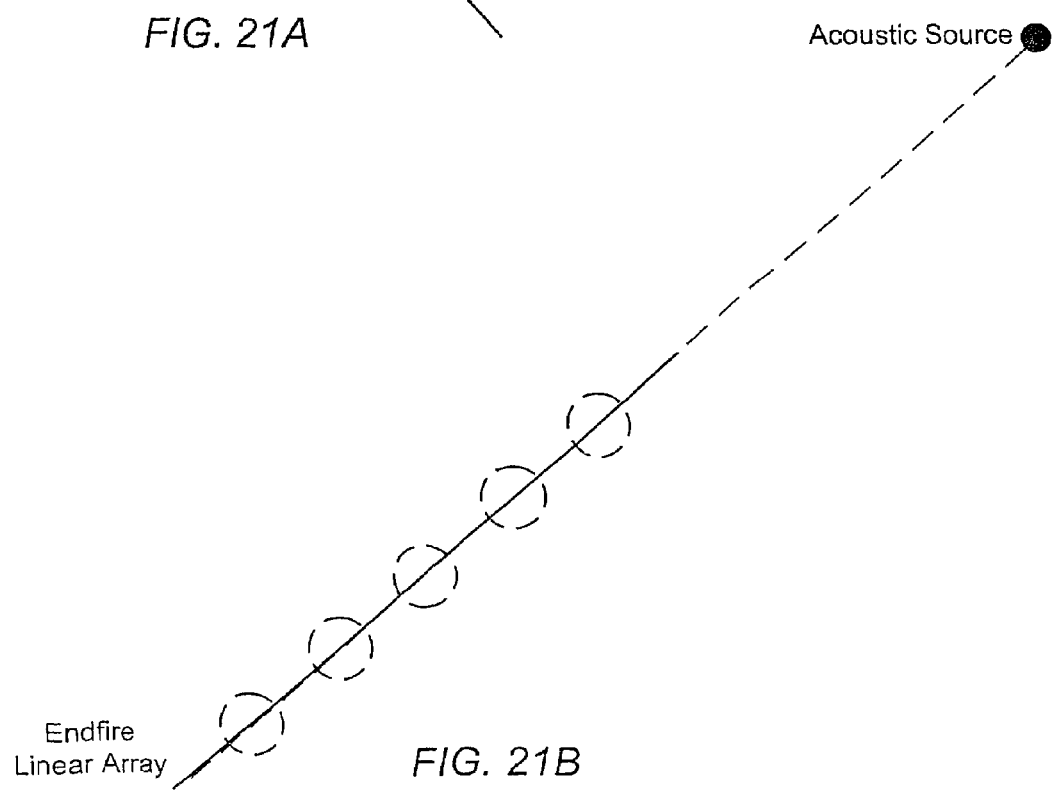
FIG. 21B illustrates an endfire linear array.
Figure 21C:
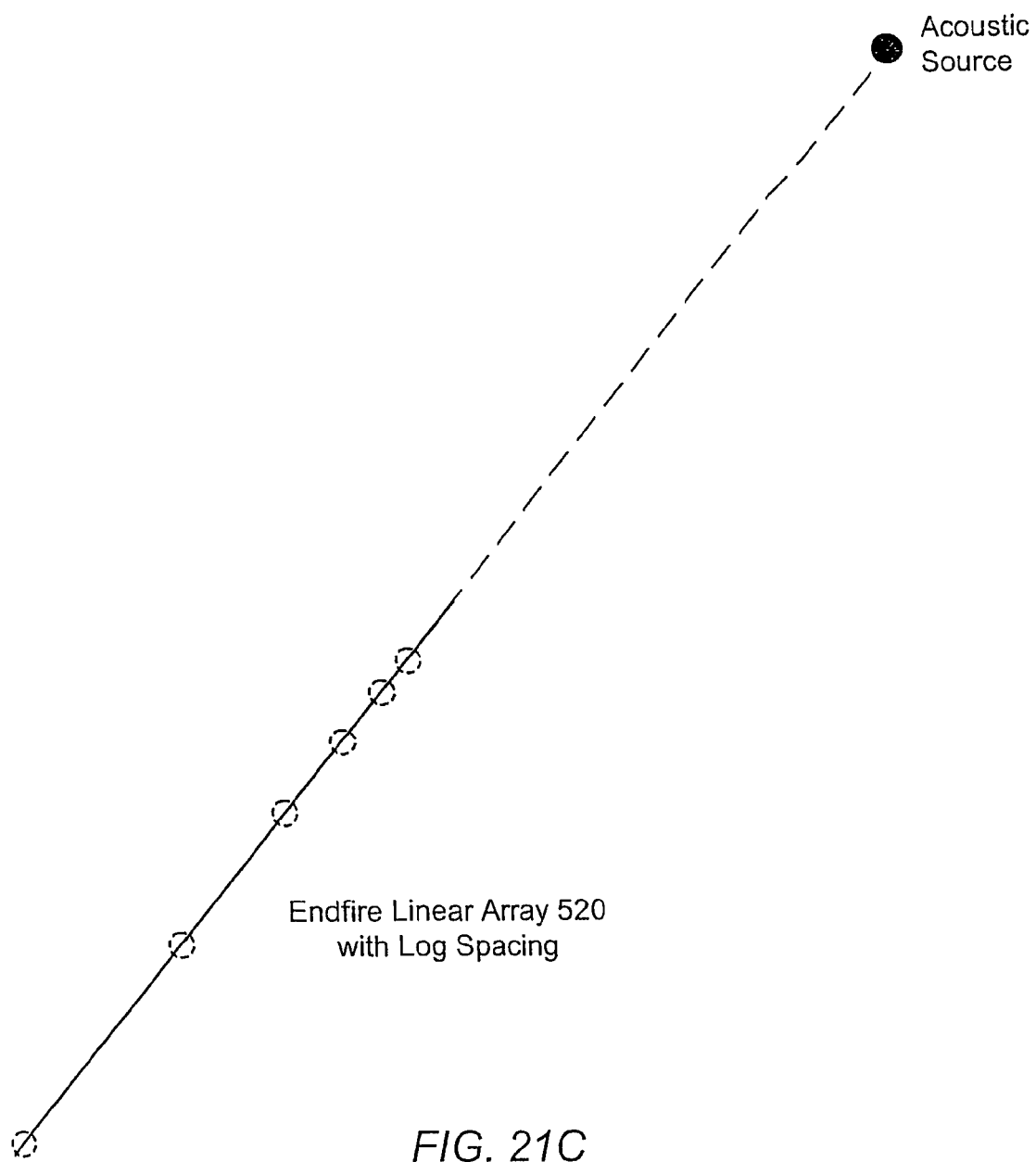
FIG. 21C illustrates a non-uniformly space endfire array.

In some embodiments, once a high resolution DOA estimate has been computed, the high-resolution DOA estimate may be used to construct an endfire array of virtual microphones (again using the Davies Transform). An endfire array is an array whose axis coincides with the direction of arrival as suggested by FIG. 21B. The virtual endfire array may be used to compute an estimate for the range (distance) of the acoustic source. Furthermore, the high resolution DOA estimate and the range estimate may be used to construct an endfire array 520 of virtual microphones having non-uniform spacing (e.g., logarithmic spacing) from the uniform circular array 500 as suggested in FIG. 21C. The range estimate may be used to optimally select the positions of the array elements.

Figure 21D:
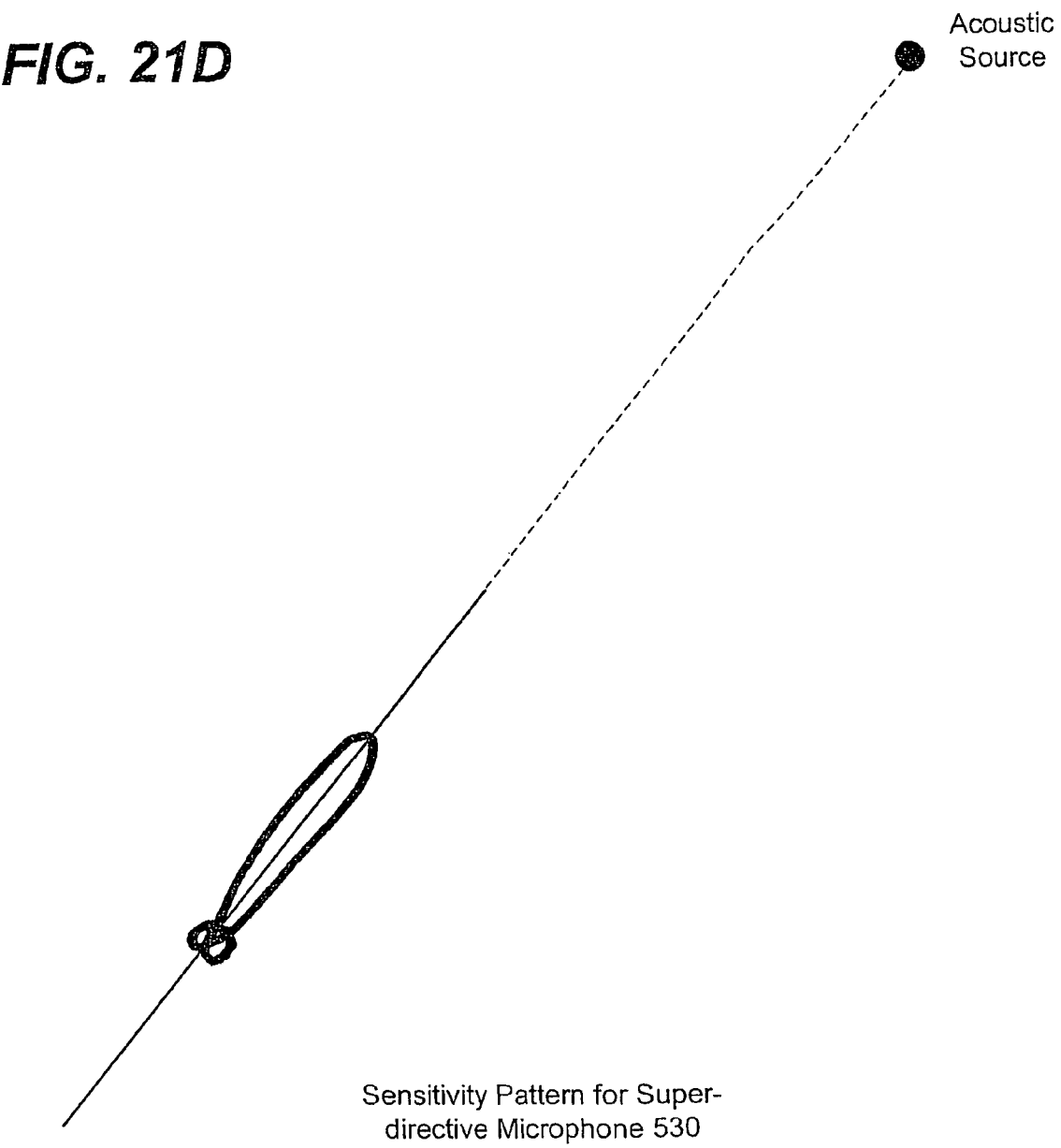
FIG. 21D illustrates the sensitivity pattern of a highly directed virtual microphone.

A single super-directive virtual microphone 530 may be constructed from the logarithmic endfire array 520. The super-directive virtual microphone 530 has a sensitivity pattern which is highly directed toward the acoustic source as suggested by FIG. 21D.

Figure 21E:
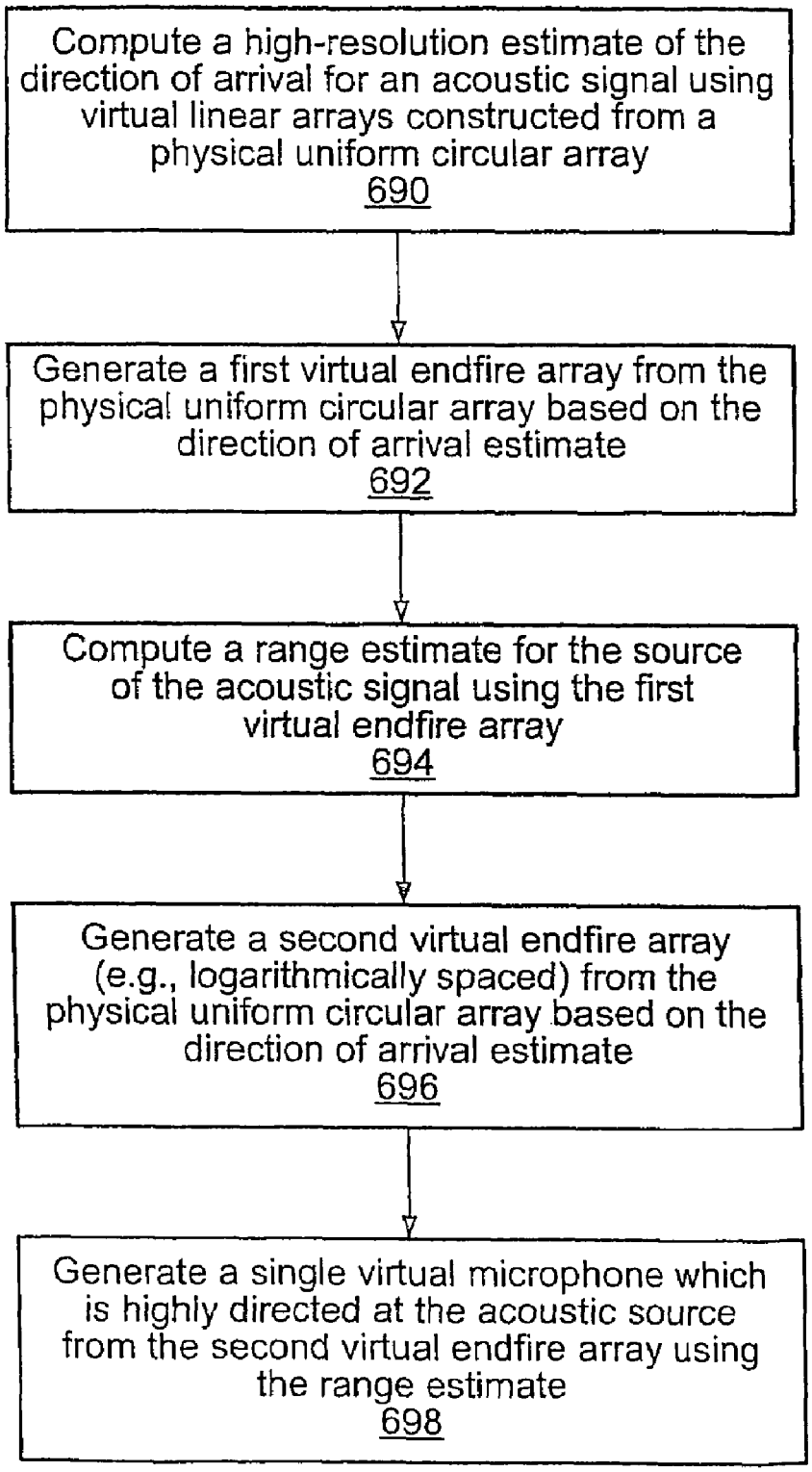
FIG. 21E illustrates one set of embodiments of a method for generating a highly directed virtual microphone pointed at an acoustic source using a uniform circular array of physical microphones.

FIG. 21E illustrates a method for generating a highly directed virtual microphone pointed at an acoustic source using a uniform circular array of physical microphones. This method may be employed in a speakerphone, or, in any device having a uniform circular array of physical microphones. In the case of a speakerphone, it may be used to generate a virtual microphone which is highly directed towards a current talker.

At 690, a processor (operating under the direction of program instructions accessed from a storage medium) may compute a high-resolution estimate of the direction of arrival for an acoustic signal using virtual linear arrays constructed from a physical uniform circular array. In one embodiment, one or more known algorithms may be employed to perform this computation of the high-resolution DOA estimate. (The virtual linear arrays may be uniformly spaced arrays, i.e., arrays having uniform spacing between successive microphone elements.)

At 692, the processor may generate a first virtual endfire array from the physical uniform circular array based on the direction of arrival estimate. The first virtual endfire array may be a uniformly spaced array.

At 694, the processor may compute a range estimate for the source of the acoustic signal using the first virtual endfire array.

At 696, the processor may generate a second virtual endfire array with non-uniform spacing (e.g., with logarithmic spacing) from the physical uniform circular array based on the direction of arrival estimate and the range estimate.

At 698, the processor may generate a single virtual microphone which is highly directed at the acoustic source from the second virtual endfire array using the range estimate.

This method may be repeated (e.g., on a periodic basis) to track a moving source. It is noted that once a source is initially located, successive repetitions of 690 may be performed much more quickly than the initial DOA estimate since the DOA algorithm can immediately start with a virtual linear array that is close to being broadside to the source (under the assumption that the source typically has changed much in angle in the time between repetitions).

High Resolution Distance Estimation for an Unknown Source

In some embodiments, when calculating a value for the range of an arbitrary source (i.e., the distance from an unknown source to the receiving microphone array), we use the fact that the Direction of Arrival (DOA) of a signal that is propagating in a substantially similar direction as the major axis of the endfire array can be determined with some accuracy. If we combine the DOA estimates for two such arrays that are aligned in slightly different directions, then we can use the intersection of these two DOA estimates to determine the distance of the source from the receiving array with reasonably good accuracy. If we combine a single, highly accurate DOA estimation (such as that which we could get from a broadside array) with a slightly less accurate DOA estimation (such as that which we could obtain from an endfire array which is nearly in line with the source), then we can get a highly accurate estimate of the distance from the source to the two arrays. If, however, the source is in the nearfield for some frequencies and in the far field for other frequencies, then we can use this information to get an accurate estimate for the range of the target at different frequencies and thus, the accuracy of the distance of the source is very highly accurate, since the equations for DOA estimation for the nearfield and the farfield case are different.

In some embodiments, a method for correcting for imperfections in microphones of a microphone array in a device such as a speakerphone (or videoconferencing unit) may involve: (a) measuring responses of array microphones to a noise burst for different speaker positions; (b) measuring responses of embedded golden microphones to the noise burst for the same speaker positions, where the embedded golden microphones are embedded in a second speakerphone; (c) computing microphone transfer functions for each speaker position from the responses measured in (a) and (b); storing the microphone transfer functions in memory of the device for later use to correct received signals from the microphone array.

In some embodiments, a method for correcting for acoustic shadowing of microphones in a microphone array in a device such as a speakerphone (or videoconferencing unit) may involve: (a) measuring responses of golden microphones to a noise burst for different speaker positions, where the golden microphones are embedded in a speakerphone; (b) measuring responses of free golden microphones to the noise burst for the same speaker positions; computing shadowing transfer functions for each speaker position from the responses measured in (a) and (b); adjusting the parameters of a virtual beam corresponding to a first frequency range and a first target direction using a values of the shadowing transfer function corresponding to the first frequency range and the first target direction.

In some embodiments, a method for tracking the drift in the response of a microphone in a speakerphone may involve: (a) measuring a signal from the microphone; (b) storing a plurality of signal measurements from the microphone; (b) averaging at least a portion of the stored plurality of signal measurements over time; (c) subtracting a speaker output from the averaged signal measurement; and (d) adjusting a transfer function (e.g., a transfer function of the microphone) using the difference between the speaker output and the averaged signal measurement.

In some embodiments, a method of forming a highly directive virtual microphone from a circular array of microphones in a device (such as a speakerphone or a videoconferencing unit) may involve: determining a direction of arrival of a source signal from analysis of signals gathered from the microphones of the circular array; generating a first virtual endfire array pointed at the acoustic source using the direction of arrival; estimating distance to the source from signals provided by the first virtual endfire array; generating a second virtual endfire array that is nonuniformly spaced and pointed at the acoustic source using the range estimate and the direction of arrival; combining signals from the second virtual end fire array to obtain a resultant signal corresponding to a highly directive virtual microphone.

Microphone/Speaker Calibration Processes

A stimulus signal may be transmitted by the speaker. The returned signal (i.e., the signal sensed by the microphone array) may be used to perform calibration. This returned signal may include four basic signal categories (arranged in order of decreasing expected signal strength as seen by the microphone):

1) internal audio
   a: structure-borne vibration and/or radiated audio
   b: structure-generated audio (i.e., buzzes and rattles)
2) first arrival (i.e., direct air-path) radiated audio
3) room-related audio
   a: reflections
   b: resonances
4) measurement noise
   a: microphone self-noise
   b: external room noise Each of these four categories can be further broken down into separate constituents. In some embodiments, the second category is measured in order to determine the microphone calibration (and microphone changes).

Measuring Internal Audio

In one set of embodiments, one may start by measuring the first type of response at the factory in a calibration chamber (where audio signals of type 3 or 4 do not exist) and subtracting that response from subsequent measurements. By comparison with a "golden unit", one knows how audio of type 1a) should measure, and one can then measure microphone self-noise (type 4b) by recording data in a silent test chamber, so one can separate the different responses listed above by making a small set of simple measurements in the factory calibration chamber.

It is noted that a "failure" caused by 1b) may dominate the measurements. Furthermore, "failures" caused by 1b) may change dramatically over time, if something happens to the physical structure (e.g., if someone drops the unit or if it is damaged in shipping or if it is not well-assembled and something in the internal structure shifts as a result of normal handling and/or operation).

Fortunately, in a well-put together unit, the buzzes and rattles are usually only excited by a limited band of frequencies (e.g., those where the structure has a natural set of resonances). One can previously determine these "dangerous frequencies" by experiment and by measuring the "golden unit(s)". One removes these signals from the stimulus before making the measurement by means of a very sharp notch in the frequency response of signals that are transmitted to the speaker amp.

In one embodiment, these frequencies may be determined by running a small amplitude swept-sine stimulus through the unit's speaker and measure the harmonic distortion of the resulting raw signal that shows up in the microphones. In the calibration chamber, one can measure the distortion of the speaker itself (using an external reference microphone) so one can know even the smallest levels of distortion caused by the speaker as a reference. If the swept sine is kept small enough, then one knows a-priori that the loudspeaker should not typically be the major contributor to the distortion.

If the calibration procedure is repeated in the field, and if there is distortion showing up at the microphones, and if it is equal over all of the microphones, then one knows that the loudspeaker has been damaged. If the microphone signals show non-equal distortion, then one may be confident that it is something else (typically an internal mechanical problem) that is causing this distortion. Since the speaker may be the only internal element which is equidistant from all microphones, one can determine if there is something else mechanical that is causing the distortions by examining the relative level (and phase delay, in some cases) of the distortion components that show up in each of the raw microphone signals.

So, one can analyze the distortion versus frequency for all of the microphones separately and determine where the buzzing and/or rattling component is located and then use this information to make manufacturing improvements. For example, one can determine, through analysis of the raw data, whether a plastic piece that is located between microphones 3 and 4 is not properly glued in before the unit leaves the factory floor. As another example, one can also determine if a screw is coming loose over time. Due to the differences in the measured distortion and/or frequency response seen at each of the mics, one can also determine the difference between one of the above failures and one that is caused by a mic wire that has come loose from its captive mounting, since the anomalies caused by that problem have a very different characteristic than the others.

Measurement Noise

One can determine the baseline microphone self-noise in a factory calibration chamber. In the field, however, it may be difficult to separate out the measurement of the microphone's self-noise and the room noise unless one does a lot of averaging. Even then, if the room noise is constant (in amplitude), one cannot completely remove it from the measurement. However, one can wait for the point where the overall noise level is at a minimum (for example if the unit wakes up at 2:30 am and "listens" to see if there is anyone in the room or if the HVAC fan is on, etc.) and then minimize the amount of room noise that one will see in the overall microphone self noise measurement.

Another strategy is if the room has anisotropic noise (i.e., if the noise in the room has some directional characteristic). Then one can perform beam-forming on the mic array, find the direction that the noise is strongest, measure its amplitude and then measure the noise sound field (i.e., its spatial characteristic) and then use that to come up with an estimate of how large a contribution that the noise field will make at each microphone's location. One then subtracts that value from the measured microphone noise level in order to separate the room noise from the self-noise of the mic itself.

Room-Related Audio Measurement

There are two components of the signal seen at each mic that are due to the interactions of the speaker stimulus signal and the room in which the speaker is located: reflections and resonances. One can use the mic array to determine the approximate dimensions of the room by sending a stimulus out of the loudspeaker and then measuring the first time of reflection from all directions. That will effectively tell one where the walls and ceiling are in relation to the speakerphone. From this information, one can effectively remove the contribution of the reflections to the calibration procedure by "gating" the data acquisition from the measured data sets from each of the mics. This gating process means that one only looks at the measured data during specific time intervals (when one knows that there has not been enough time for a reflection to have occurred).

The second form of room related audio measurement may be factored in as well. Room-geometry related resonances are peaks and nulls in the frequency response as measured at the microphone caused by positive and negative interference of audio waveforms due to physical objects in the room and due to the room dimensions themselves. Since one is gating the measurement based on the room dimensions, then one can get rid of the latter of the two (so-called standing waves). However, one may still need to factor out the resonances that are caused by objects in the room that are closer to the phone than the walls (for example, if the phone is sitting on a wooden table that resonates at certain frequencies). One can deal with these issues much in the same way that one deals with the problematic frequencies in the structure of the phone itself; by adding sharp notches in the stimulus signal such that these resonances are not excited. The goal is to differentiate between these kinds of resonances and similar resonances that occur in the structure of the phone itself. Three methods for doing this are as follows: 1) one knows a-priori where these resonances typically occur in the phone itself, 2) external resonances tend to be lower in frequency than internal resonances and 3) one knows that these external object related resonances only occur after a certain time (i.e., if one measures the resonance effects at the earliest time of arrival of the stimulus signal, then it will be different than the resonance behavior after the signal has had time to reflect off of the external resonator).

So, after one factors in all of the adjustments described above, one then can isolate the first arrival (i.e., direct airpath) radiated audio signal from the rest of the contributions to the mic signal. That is how one can perform accurate offline (and potentially online) mic and speaker calibration.

Any or all of the method embodiments described herein may be implemented in terms of program instructions (executable by one or more processors) and stored on a memory medium. A memory medium may include any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network. In some embodiments, a carrier medium may be used. A carrier medium may include a memory medium as described above, as well as signals such as electrical, electromagnetic, or digital signals, conveyed via a communication medium such as a bus, network and/or a wireless link.

The memory medium may comprise an electrically erasable programmable read-only memory (EEPROM), various types of flash memory, etc. which store software programs (e.g., firmware) that are executable to perform the methods described herein. In some embodiments, field programmable gate arrays may be used. Various embodiments further include receiving or storing instructions and/or data implemented in accordance with the foregoing description upon a carrier medium.

Conclusion

Various embodiments may further include receiving, sending or storing program instructions and/or data implemented in accordance with the foregoing description upon a computer-accessible medium. Generally speaking, a computer-accessible medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method comprising:
    (a) outputting a stimulus signal for transmission from a speaker;
    (b) receiving an input signal from a microphone, wherein the input signal corresponds to the stimulus signal;
    (c) computing a midrange sensitivity and a lowpass sensitivity for a transfer function $H(\omega)$ derived from a spectrum of the input signal and a spectrum of the stimulus signal;
    (d) subtracting the midrange sensitivity from the lowpass sensitivity to obtain a speaker-related sensitivity;
    (e) performing an iterative search for current values of parameters of an input-output model of the speaker using the input signal spectrum, the stimulus signal spectrum, the speaker-related sensitivity; and
    (f) updating averages of the parameters of the speaker input-output model using the current parameter values.

2. The method of claim 1, wherein the parameter averages of the speaker input-output model are usable to perform echo cancellation on second input signals from the microphone.

3. The method of claim 1, wherein the input-output model of the speaker is a nonlinear model.

4. The method of claim 3, wherein the nonlinear model is a Volterra series model.

5. The method of claim 1, wherein the stimulus signal is a noise signal.

6. The method of claim 5, wherein the noise signal is maximum length sequence noise.

7. The method of claim 1 further comprising:
    applying one or more notch filters to the stimulus signal prior to transmission from the speaker in order to remove one or more frequencies from the stimulus signal, wherein the one or more frequencies are known to induce resonance in one or more physical structures.

8. The method of claim 1 further comprising:
    performing an iterative search for a current transfer function of the microphone using the input signal spectrum, the spectrum of the stimulus signal, and the current parameter values;
    updating an average microphone transfer function using the current transfer function;
    wherein the average transfer function is usable to perform said echo cancellation.

9. The method of claim 1 further comprising monitoring average signal power from the microphone, wherein said outputting of the stimulus signal is performed in response to a determination that the average signal power from the microphone has remained less than a power threshold for a predetermined amount of time.

10. The method of claim 1, wherein (a) through (f) are performed by one or more processors in a speakerphone.

11. A computer-readable memory medium configured to stored program instructions, wherein the program instructions are executable to implement:
    (a) receiving an input signal from a microphone, wherein the input signal corresponds to a transmission of a stimulus signal from a speaker;
    (b) computing a midrange sensitivity and a lowpass sensitivity for a transfer function $H(\omega)$ derived from a spectrum of the input signal and a spectrum of the stimulus signal;
    (c) subtracting the midrange sensitivity from the lowpass sensitivity to obtain a speaker-related sensitivity;
    (d) performing an iterative search for current values of parameters of an input-output model of the speaker using the input signal spectrum, the stimulus signal spectrum, the speaker-related sensitivity; and
    (e) updating averages of the parameters of the speaker input-output model using the current parameter values.

12. The method of claim 11, wherein the parameter averages of the speaker input-output model are usable to perform echo cancellation on second input signals received from the microphone.

13. The method of claim 11, wherein the input-output model of the speaker is a nonlinear model.

14. The method of claim 13, wherein the nonlinear model is a Volterra series model.

15. The method of claim 11, wherein the stimulus signal is a noise signal.

16. The method of claim 11 further comprising:
    applying one or more notch filters to the stimulus signal prior to transmission from the speaker in order to remove one or more frequencies from the stimulus signal, wherein the one or more frequencies are known to induce resonance in one or more physical structures.

17. The method of claim 11 further comprising:
    performing an iterative search for a current transfer function of the microphone using the input signal spectrum, the spectrum of the stimulus signal, and the current parameter values;
    updating an average microphone transfer function using the current transfer function;
    wherein the average transfer function is usable to perform said echo cancellation.

18. The memory medium of claim 11, wherein the program instructions are further executable to implement: monitoring average signal power from the microphone, wherein said outputting of the stimulus signal is performed in response to a determination that the average signal power from the microphone has remained less than a power threshold for a predetermined amount of time.

19. A system comprising:

a memory configured to store program instructions;

a processor configured to read and execute the program instructions from the memory, wherein the program instructions are executable by the processor to implement:

(a) receiving an input signal from a microphone, wherein the input signal corresponds to a transmission of a stimulus signal from a speaker;

(b) computing a midrange sensitivity and a lowpass sensitivity for a transfer function $H(\omega)$ derived from a spectrum of the input signal and a spectrum of the stimulus signal;

(c) subtracting the midrange sensitivity from the lowpass sensitivity to obtain a speaker-related sensitivity;

(d) performing an iterative search for current values of parameters of an input-output model of the speaker using the input signal spectrum, the stimulus signal spectrum, the speaker-related sensitivity; and (e) updating averages of the parameters of the speaker input-output model using the current parameter values.

20. The system of claim 19 further comprising the speaker and the microphone.

* * * * *